Jan. 6, 1970    L. L. AZURE, JR., ET AL    3,487,561
TEST GRADING AND MARKING METHOD AND APPARATUS
Filed March 7, 1967    20 Sheets-Sheet 2
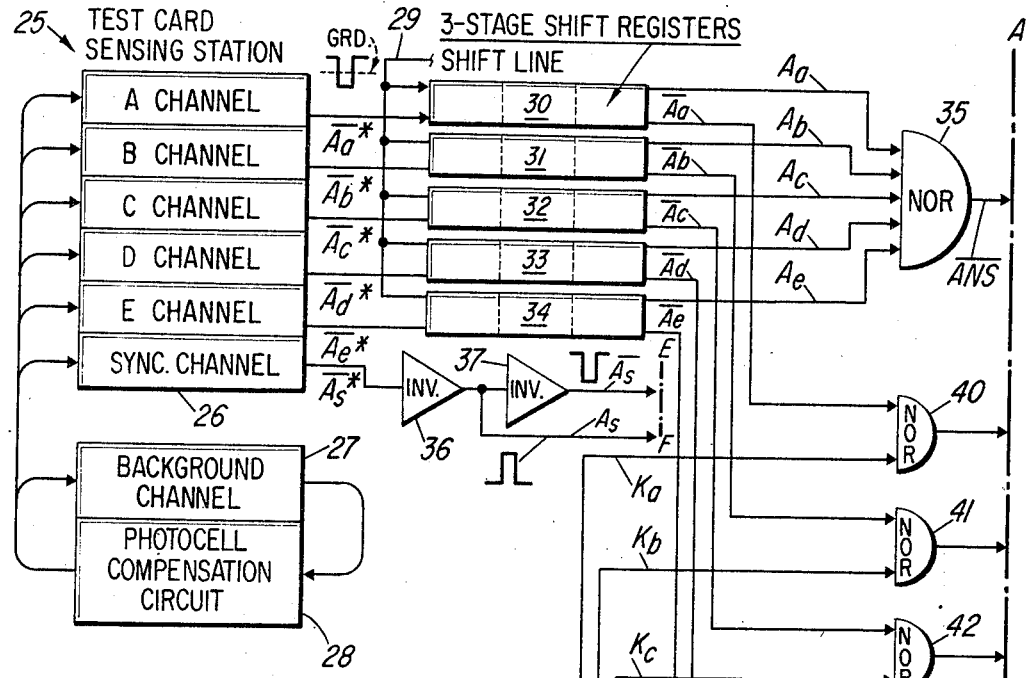
FIG. 2A
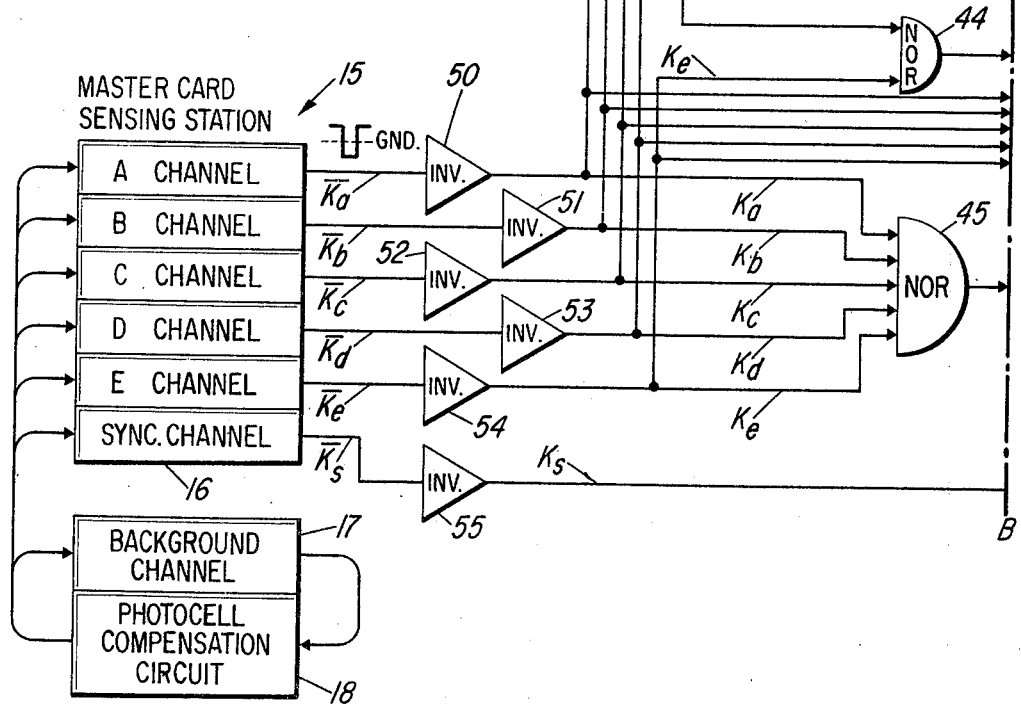

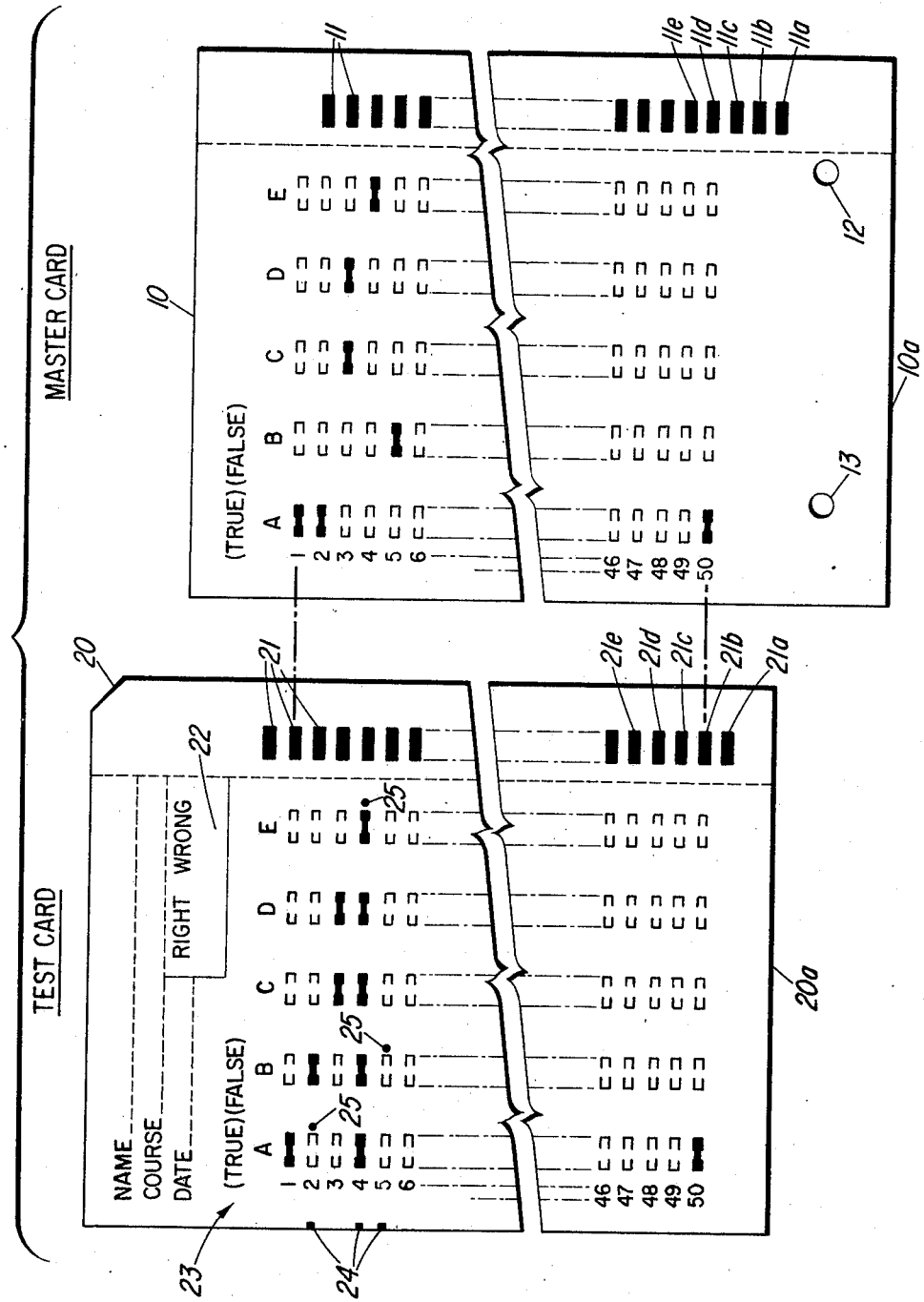

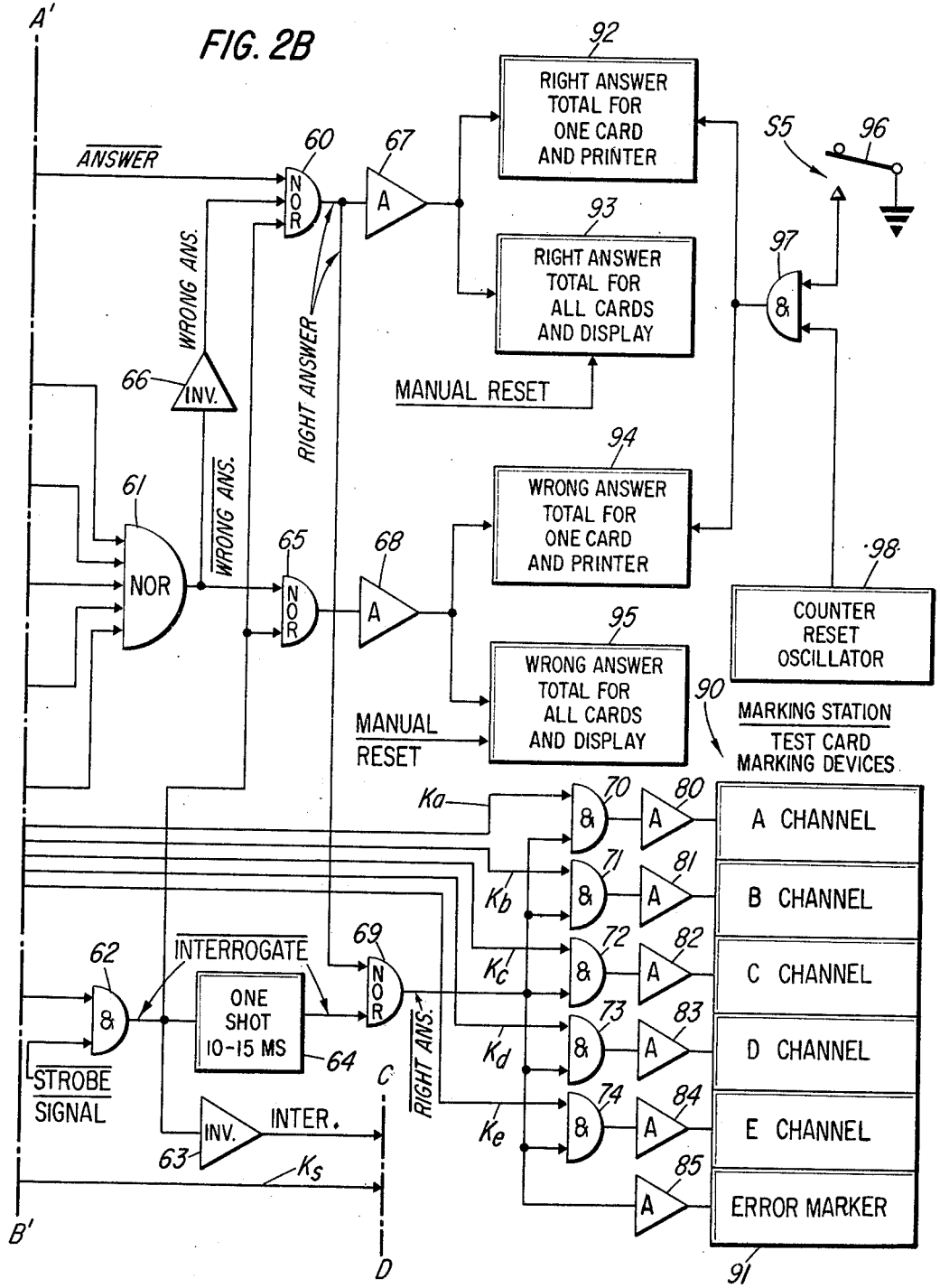

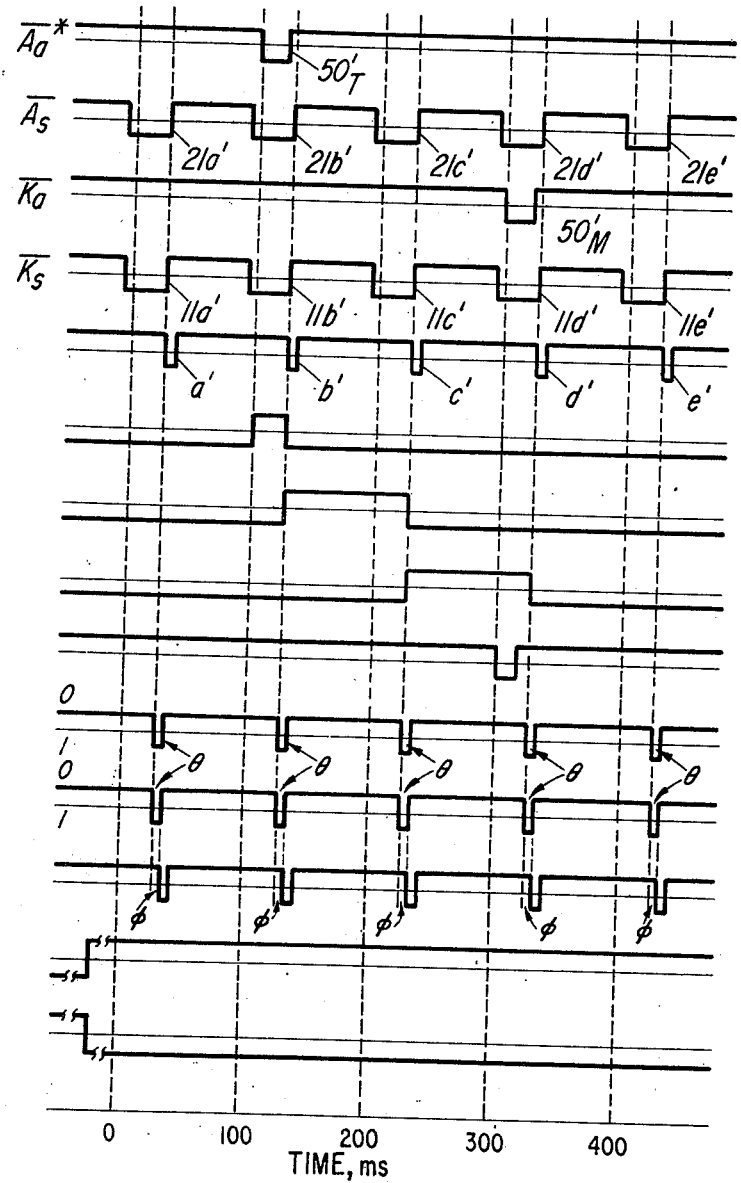

Jan. 6, 1970    L. L. AZURE, JR., ET AL    3,487,561
TEST GRADING AND MARKING METHOD AND APPARATUS
Filed March 7, 1967    20 Sheets-Sheet 6

FIG. 3B
TIME CHART, SYNCHRONIZATION WITH MASTER CARD LEADING

TEST CARD
ANSWER INDICIA PULSE(S) $\overline{A_a}$*
SYNC. PULSES $\overline{A_s}$ MASTER CARD
ANSWER INDICIA PULSE(S) $\overline{K_a}$
SYNC. PULSES $\overline{K_s}$

SHIFT PULSES
SHIFT REGISTER-CHANNEL A
   1ST STAGE
   2ND STAGE
   3RD STAGE

INTERROGATE PULSE(S)

ANS. SYNC. F.F. (AT 101)

KEY SYNC. F.F. (AT 106)

RESET-1 PULSES

RESET-2 PULSE(S)

STROBE PULSE(S)

TIME, ms
($\phi$ = 5 ms DELAY FROM SHIFT PULSE)
($\theta$ = 5 ms)

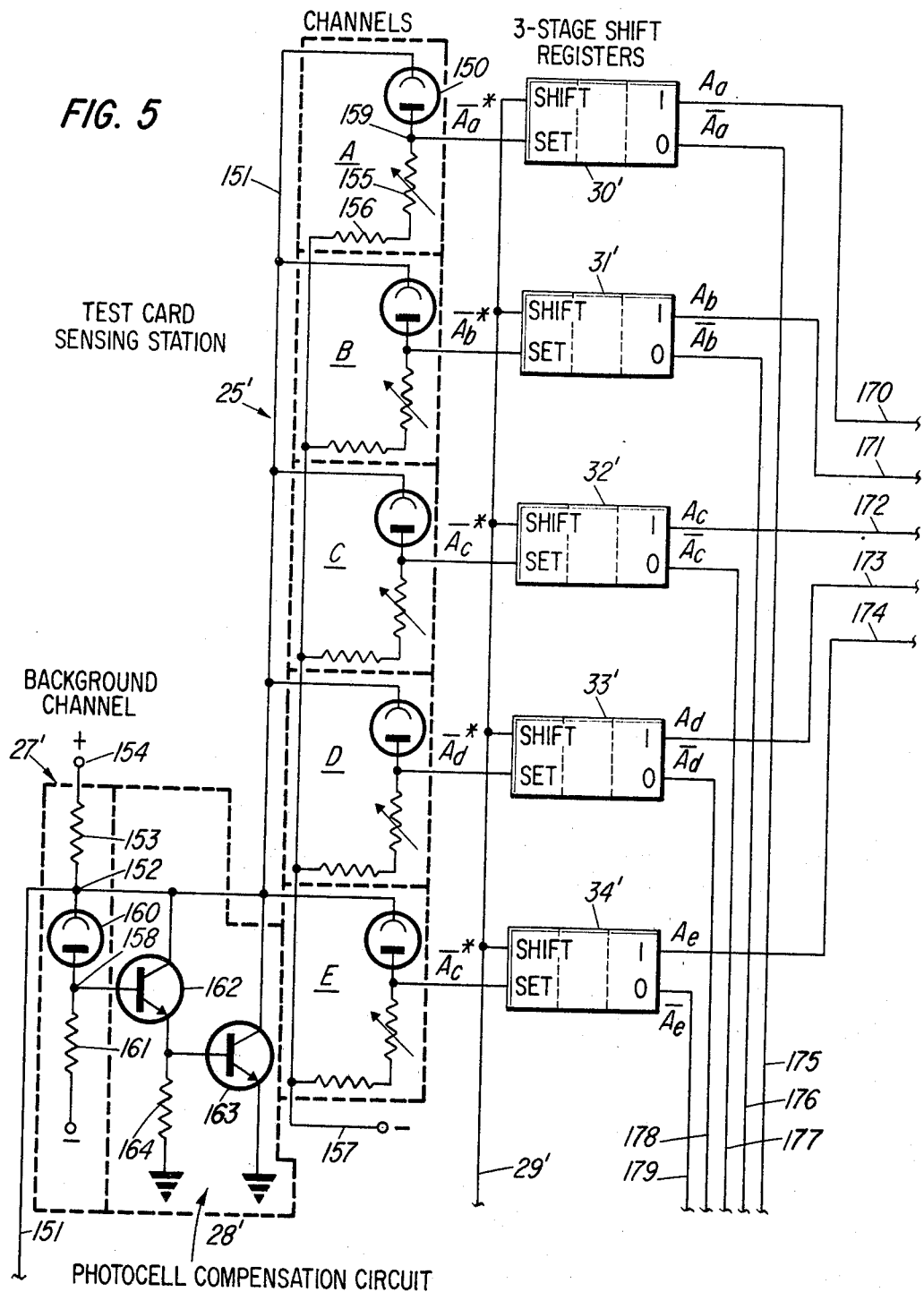

FIG. 12

Jan. 6, 1970    L. L. AZURE, JR., ET AL    3,487,561
TEST GRADING AND MARKING METHOD AND APPARATUS
Filed March 7, 1967    20 Sheets-Sheet 16

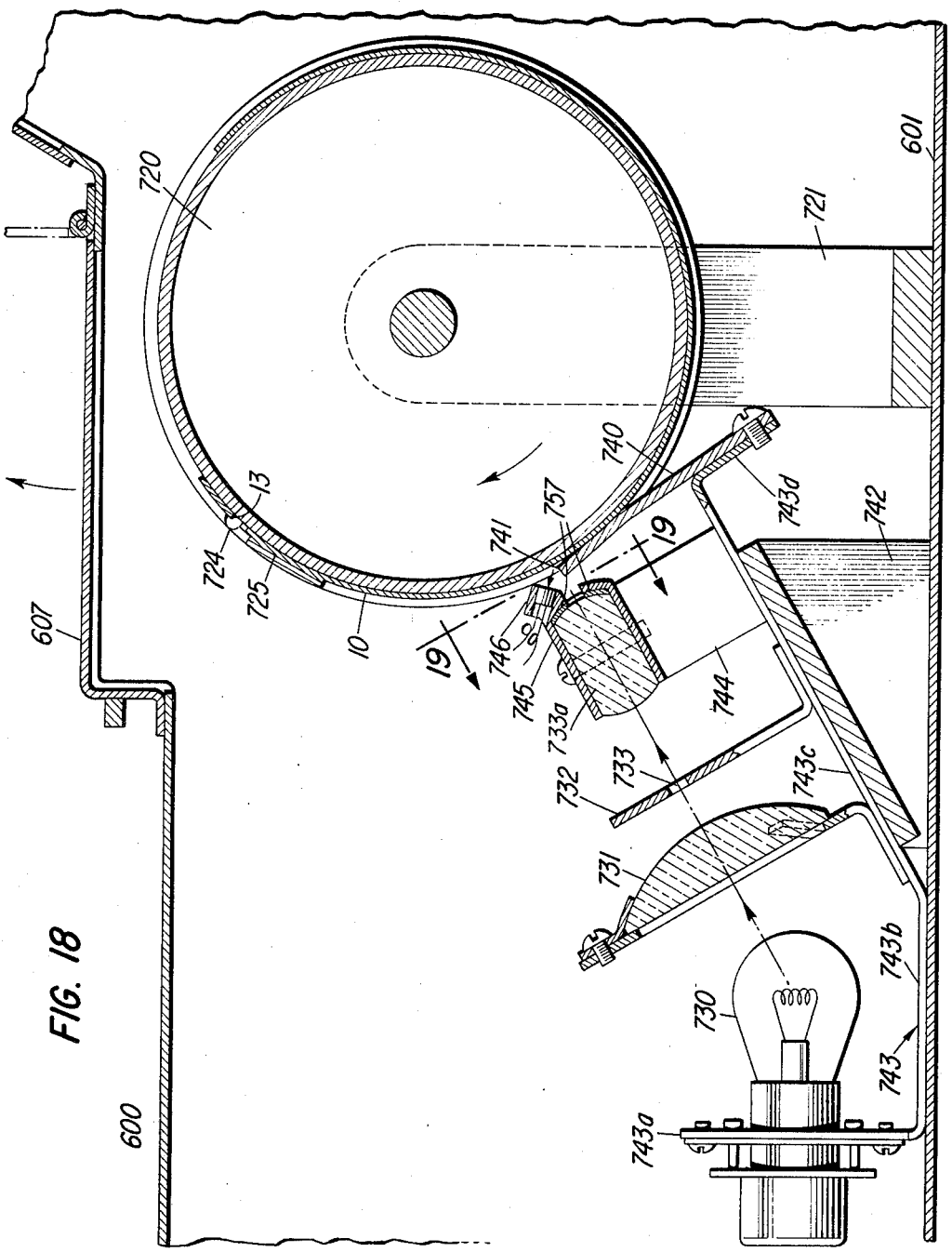

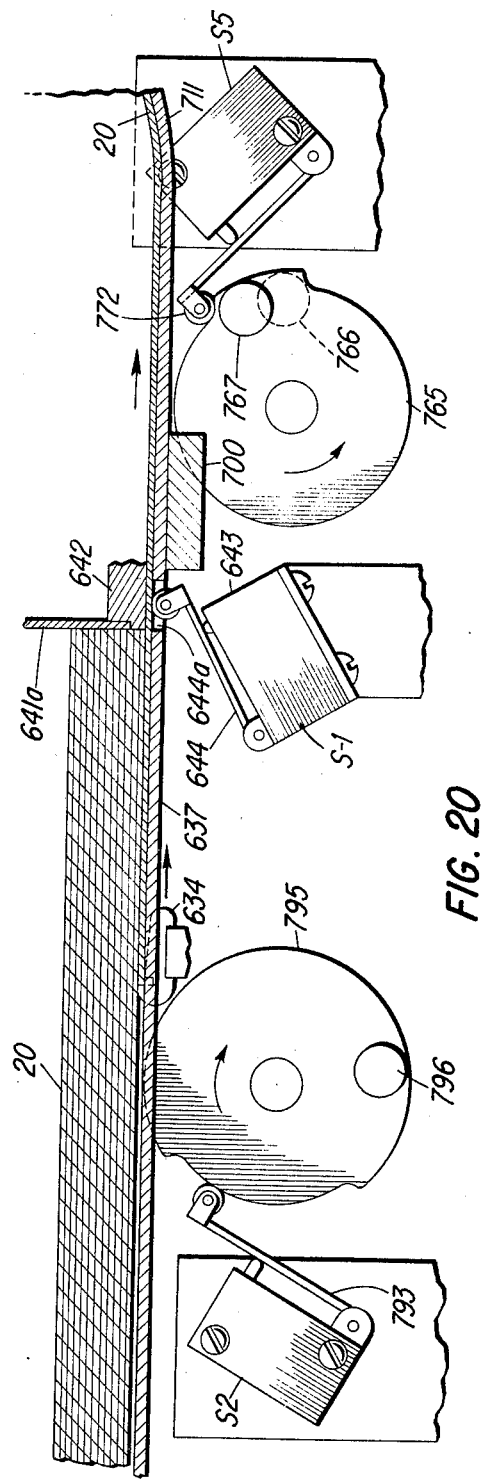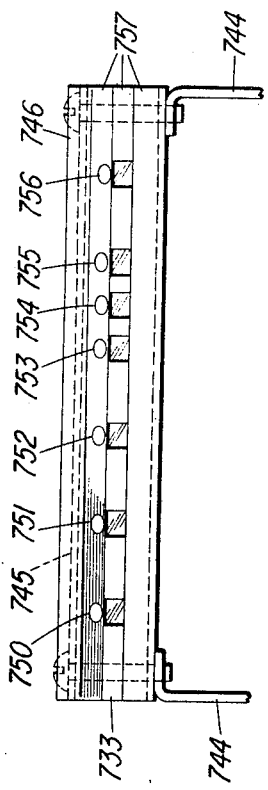

United States Patent Office 3,487,561
Patented Jan. 6, 1970

3,487,561
TEST GRADING AND MARKING METHOD
AND APPARATUS
Leo L. Azure, Jr., Richland, Wash., and Maurice
Edmund Hassfurther, Columbus, Ohio, assignors
to Automata Corporation, Richland, Wash., a corporation of Washington
Filed Mar. 7, 1967, Ser. No. 621,747
Int. Cl. G09b 7/10
U.S. Cl. 35—48                                35 Claims

ABSTRACT OF THE DISCLOSURE

An apparatus and a method of operation for grading and marking test cards having indicia applied thereto representing answers to problems of the multiple choice type. For each incorrectly answered problem, a mark is made adjacent an answer indication area on the test card corresponding to the correct answer for that problem, and a further mark is made in a corresponding position of a marking region adjacent an edge of the test card. By stacking the graded and marked test cards with the marking positions of the marking regions aligned for corresponding problems and the edges of the cards incrementally displaced to expose the marking regions, qualitative evaluation of the frequency of error in answering specific problems may be obtained. The counts of total right and total wrong answers are printed on each test card, and total right and wrong counts for any desired number of test cards is also automatically accumulated and displayed.

BACKGROUND OF THE INVENTION

Field of the invention

This invention relates to a test grading and marking apparatus and method for automatically grading and marking test cards bearing indicia representing answers or responses to problems of the multiple choice answer type, and, more particularly, to such an apparatus and method of operation for indicating on each test card the correct answer for each incorrect answer for problems represented on the test cards, the total correct and incorrect answers, and for qualitatively evaluating the frequency of error with which a specific problem is answered on a plurality of test cards.

State of the prior art

Machines for grading and marking test cards to which are applied indicia representing answers to problems of the multiple choice answer type are well known in the prior art. An example of a prior art machine for accomplishing such grading and marking functions is set forth in U.S. Patent No. 3,284,929 of Leo L. Azure, Jr., entitled "Test Grading Machine" and assigned to the assignee of the present invention.

The test grading machine disclosed therein performs a number of unique functions in correcting test cards of the described type, in an automatic manner and without the necessity of skilled operating personnel. The test cards include a group of answer indication areas equal in number to the number of answer choices for each problem of a test. An indicia is applied to the answer indication area for each problem corresponding to the answer choice believed to be correct for that problem. Correct answers to the problems on the test are registered in a master storage means. Test card and master storage sensing stations are provided for sensing the answer indications thus provided on the test cards, and the answer indications in the master storage means, respectively. A group of test cards, such as those prepared by a class of students, are placed in the machine and passed successively, or in sequence, through the test card scanning station. The correct answers provided in the storage means are scanned in timed sequence with the scanning of each test card. Comparison means, including logic circuits, compare the answers derived from the test card scanning station with the correct answers derived from the master storage sensing station for each problem in sequence.

Marking solenoids are positioned in alignment with the columns of answer indication areas on the test cards. The marking solenoids are arranged to be energized in accordance with the correct answer information from the master storage means. In the event that an incorrect answer has been provided on the test card for any given problem, the marking solenoid associated with the answer indication area corresponding to the correct answer for that problem is energized and accordingly marks the test card adjacent this answer indication area. Conversely, for each problem answered correctly, the marking solenoids are inhibited from marking the test card. The system operation permits great flexibility and versatility in the type and the format of the problems, including both the number of answer choices and the number of correct answers for any given total number of answer choices for each problem. These variations do not require any adjustment of the apparatus, but are effected through the simple expedient of providing the appropriate correct answer information in the master storage systems. In addition to its simplicity and versatility of operation, the apparatus is fool-proof in operation. For example, if two or more, or all, answer indication areas are marked for a given problem, whereby the answer indication are representing the correct answer, in addition to one or more areas representing incorrect answers, have been marked, the apparatus will automatically grade and mark the problem as one answered incorrectly The machine of the referenced patent may also include additional apparatus such as totalizing counters which print the total number of correct and the total number of incorrect answers on each test card, and totalizing counters for providing indications of the total number of correct and the total number of incorrect responses for an entire group of test cards, such as those prepared by all students of a class taking the same examination. Peripheral or auxiliary apparatus may also be associated with the test grading machine to provide read-out to computers or central storage systems and the like.

SUMMARY OF THE INVENTION

The test grading and marking apparatus and method of the present invention is for use with test cards on which answer indicia are applied to represent answer responses to problems of the multiple choice type, and comprises an improvement of the test grading and marking apparatus of the above-cited U.S. Letters Patent 3,284,929 issued to Leo L. Azure, Jr., for Test Grading Machine and assigned to the assignee of the present invention. In accordance with the present invention, there are provided novel synchronization techniques assuring completely accurate and reliable, trouble-free operation. The master storage of correct answer information is provided on a master card having a similar format to the test cards, facilitating the rapid changing of the programmed correct answer information in the machine for grading different groups of test cards representing different examinations. Disclosed herein is a novel marking method and apparatus providing a qualitative indication of the frequency of error in answer responses to each of the plurality of problems of an entire group of test cards, which invention also comprises an improvement of the invention disclosed and claimed in the above-cited U.S. Letters Patent 3,284,929, and which invention is disclosed and claimed in the copending patent application of Maurice Edmund Hassfurther and James T. Gates, entitled Test Grading and Marking Method and Apparatus, filed concurrently herewith and assigned to the assignee of the present invention.

Examinations of the multiple choice answer type have been proven to provide very accurate indications of proficiency and knowledge in numerous areas and their use has been increasing rapidly in the past several years. The use of test cards providing only answer indication areas is very convenient, and, for example, permits use of the same written examination problems by numerous examinees.

The ability to rapidly and automatically correct test cards of this type is of great importance to educators who must handle an ever increasing number of students. The apparatus of the invention is not limited to academic examinations but also is useful for processing and analyzing any type of response, or choice information which may be represented by selection of multiple choice responses. The apparatus of the invention renders this task far easier, due to its versatile and automatic operation, its speed and accuracy, and the convenient compilation of results which it provides. The apparatus may be operated by unskilled individuals who merely supervise the machine operation, the programmed answer selections, representing, for example, correct answer information having already been provided on the master card by the individual who prepared the examination.

The test grading and marking machine of the invention employs test cards on which are provided a plurality of groups of answer indication areas, each such group corresponding to a problem of the examination and the answer indication areas of each group corresponding to the number of answer choices for the problem. For practical purposes, the same number of answer indication areas are provided in each group, the plurality of groups being vertically displaced and numbered in accordance with corresponding problems and the indication areas of each group extending laterally with corresponding indication areas of the plurality of groups longitudinally aligned. A master card is provided having a substantially identical array of answer indication areas. Each of the master and test cards includes a longitudinal column of marks, a major proportion of which are aligned with corresponding, laterally extending groups of answer indication areas, and which control the synchronous detection or sensing of answer indicia applied to the cards.

The apparatus includes a master card sensing station which may comprise a drum about which the master card is wound and by which it is successively moved through a sensing station. There is further provided a test card sensing station through which test cards are moved in sequence and in synchronization with the motion of the master card through the master card sensing station.

Scanning means are provided at each of the master card and test card sensing stations and preferably comprise optical scanning means positioned to scan the columns of answer indication areas and timing marks. Optical scanning means are also provided to scan the background of the cards and thereby provide compensation both for changes in card texture and color and for variation in intensity of illumination projected into the scanning regions.

There is further provided a marking station including marking devices aligned with corresponding columns of answer indication areas of the test card. The marking devices are positioned such that, when energized each will produce a mark adjacent an answer indication area adjacent its corresponding column of answer indication areas. A further marking device is positioned such that, when energized it will produce a mark in the marking region of the card adjacent the selected longitudinal edge.

Logic circuits are provided for comparing the answers represented by indicia applied to the answer indication areas of the test card with the correct answer information for the corresponding problem of the master card, thereby to determine whether a correct or an incorrect response has been provided for each problem. The aforedescribed marking devices are adapted to be energized in accordance with the correct answer information for each problem, as provided on the master card, and thus the marking device adjacent the answer indication area of the column corresponding to the correct answer may be energized to mark this area. However, where a correct answer is provided on the test card, the energization circuits for the marking devices are inhibited, and thus the test card is not marked.

An incorrect response comprises the application of an indicia to the area corresponding to an incorrect answer and also the application of indicia to more than one answer indication area whether or not including the correct answer indication area. An omitted response comprises the total omission of answer indicia for a given problem. In the cease of either an omitted or an incorrect response, each marking device corresponding to a correct answer for the problem is energized and the test card is correspondingly marked. Simultaneously, the marking device associated with the marking region is energized and applies a mark in the marking region.

A correct response comprises the application of an indicia to an answer indication area representing a correct answer in accordance with the program of the master card. When a correct response has been provided, all of the marking devices are inhibited.

Printing counters accumulate the number of correct and incorrect responses on each test card and automatically print these accumulated counts on the individual test cards upon completion of the grading and marking. The printing counters are thereupon automatically reset. The printing counters do not accumulate omitted responses, and the number of which is apparent by simple addition of the total correct and incorrect responses and subtraction from the total number of problems for which responses are to be provided. The capability of weighted scoring of incorrect versus omitted answers is thereby provided; the correct answer area, however, is also marked for omitted responses, as noted above. Totalizing counters accumulate the correct and incorrect responses for any desired number of test cards and are reset manually thereby permitting determination of average response information and the like.

The timing marks provided on the master and test cards assure synchronized movement of the master and test cards through their respective sensing stations. The positions of the timing marks on the master and test cards differ, however, relatively to the groups of answer indication areas, thereby providing a novel solution to a problem frequently encountered in sensing and marking apparatus. It will be appreciated that each group of indication areas on a test card must be both scanned, and following the logic comparison, be positioned for marking by the marking devices. Particularly where it is desired that both the scanning and the marking on the test cards be performed from a single side of the test card, there results the possibility of physical interference of the marking and scanning systems. In accordance with the invention, this difficulty is overcome by delaying the comparison of the information derived by scanning the test card a predetermined period of time prior to sensing of the corresponding correct answer information from the master card and the marking of the test card in accordance with the results of the comparison of the answer responses and the correct answers. The sensing and marking devices for the test cards may thereby be physically displaced by a distance which is a function of, or related to the required time duration of the delay, the speed of movement of the test cards, and the spacing of the groups of answer indication areas on the test card.

The delay means comprises a plural stage storage device. Registered information is advanced through successive stages in response to the sensing of successive, corresponding pairs of timing marks of the test and master cards. The storage capability of the delay devices also permits a relatively large degree of inexact synchronization in the relative positions of the master and test cards as the latter move through their respective scanning stations. Alarms means is actuated upon a departure of the relative card motion from the allowable degree and automatically disables the apparatus to a standby condition, thereby preventing erroneous grading and marking.

These and other advantages and features of the test grading and marking apparatus of the invention will become apparent, and be more fully understood, from the following detailed description.

DETAILED DESCRIPTION OF THE INVENTION

In the drawings:

FIG. 1 shows, in partial portion, a master card and a test card suitable for use with the test grading and marking apparatus of the invention;

FIGS. 2a, 2b, and 2c comprise a logic diagram of the test grading and marking machine of the invention;

FIGS. 3a and 3b are timing charts representing operation of the apparatus under exact and inexact synchronization, respectively;

Figure 4:
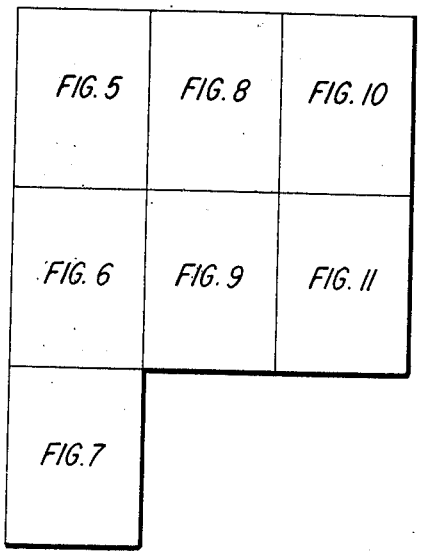
FIG. 4 is a chart representing the approximate relationship of the following FIGS. 5–11 to assist in understanding the interconnection of the portions of the circuit schematics contained in FIGS. 5–11.

FIGS. 5–11, when assembled as suggested in FIG. 4, comprise a substantially complete circuit schematic of the logic and control systems of the test grading and marking apparatus of the invention;

Figure 12:
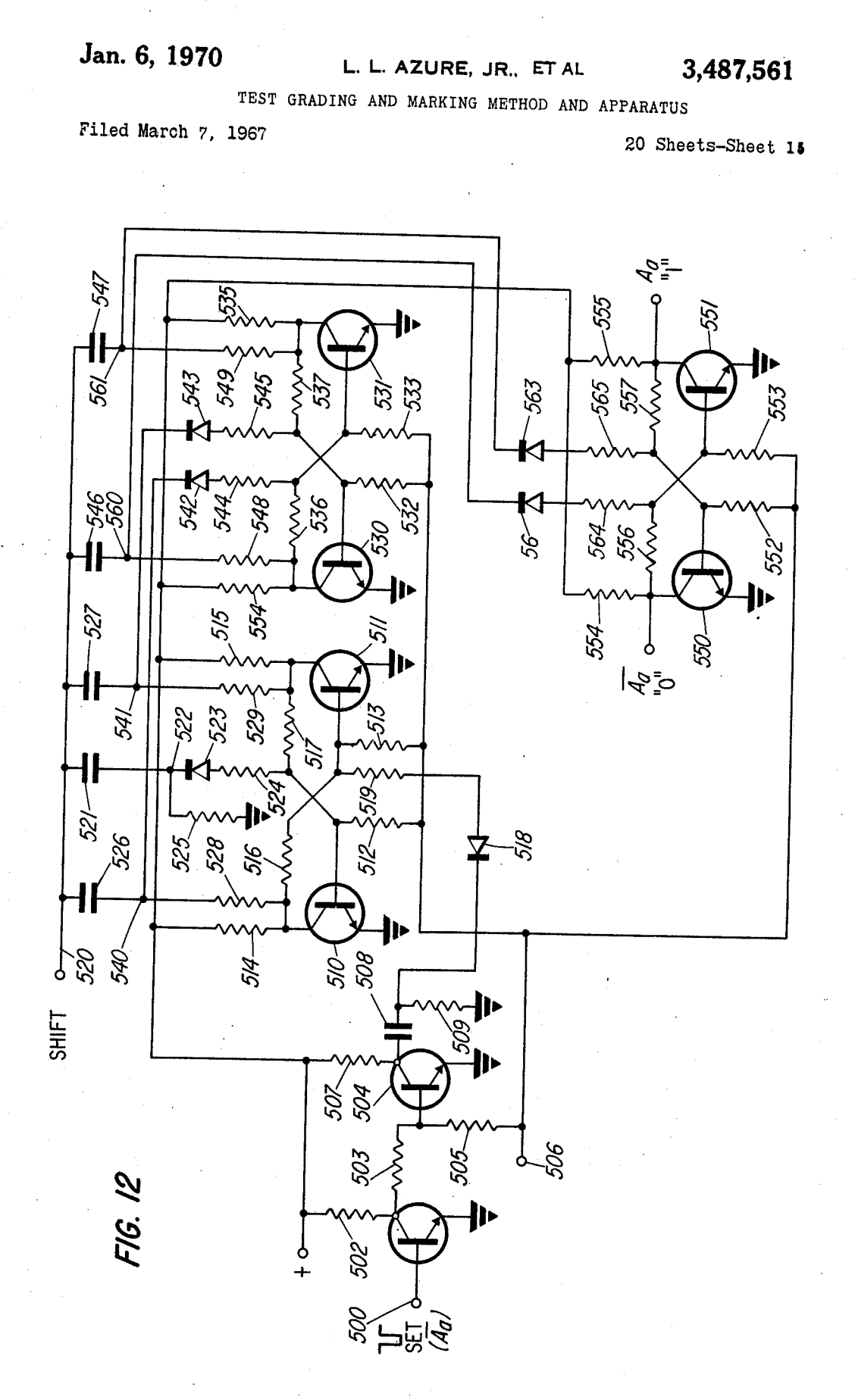

FIG. 12 comprises a schematic of a shift register, a plurality of which are indicated in block diagram form in FIGS. 2a and 5.

Figure 13:
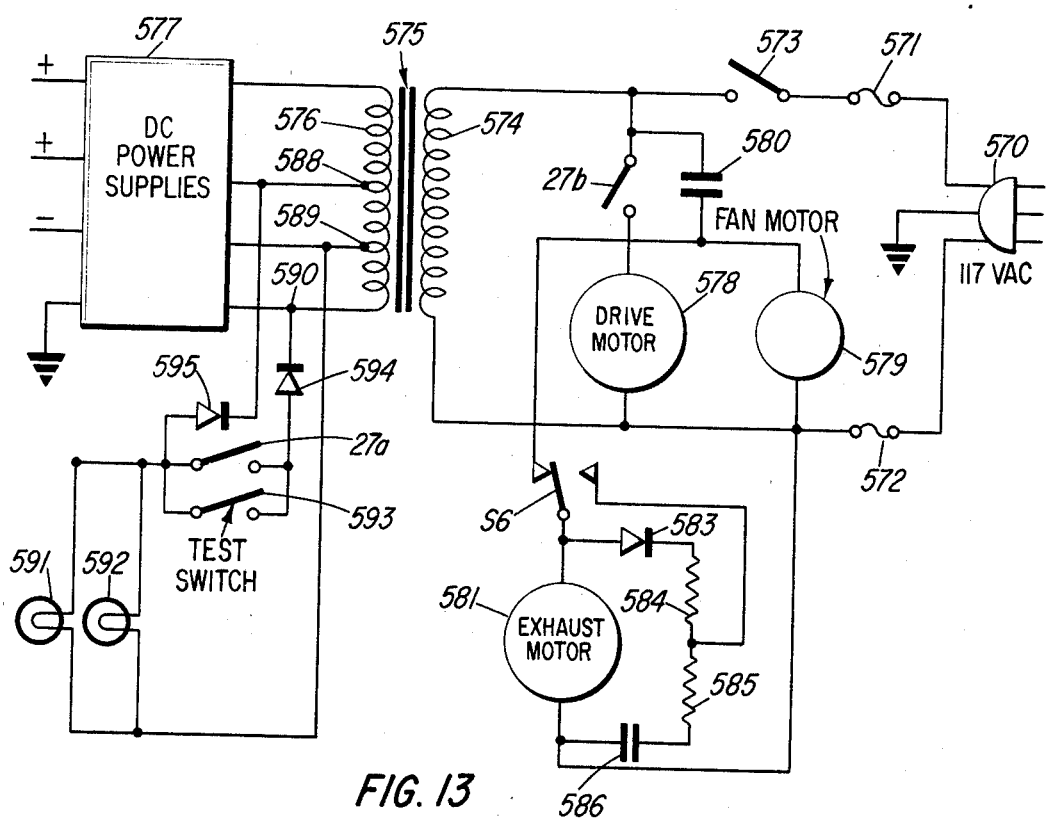
Figure 14:
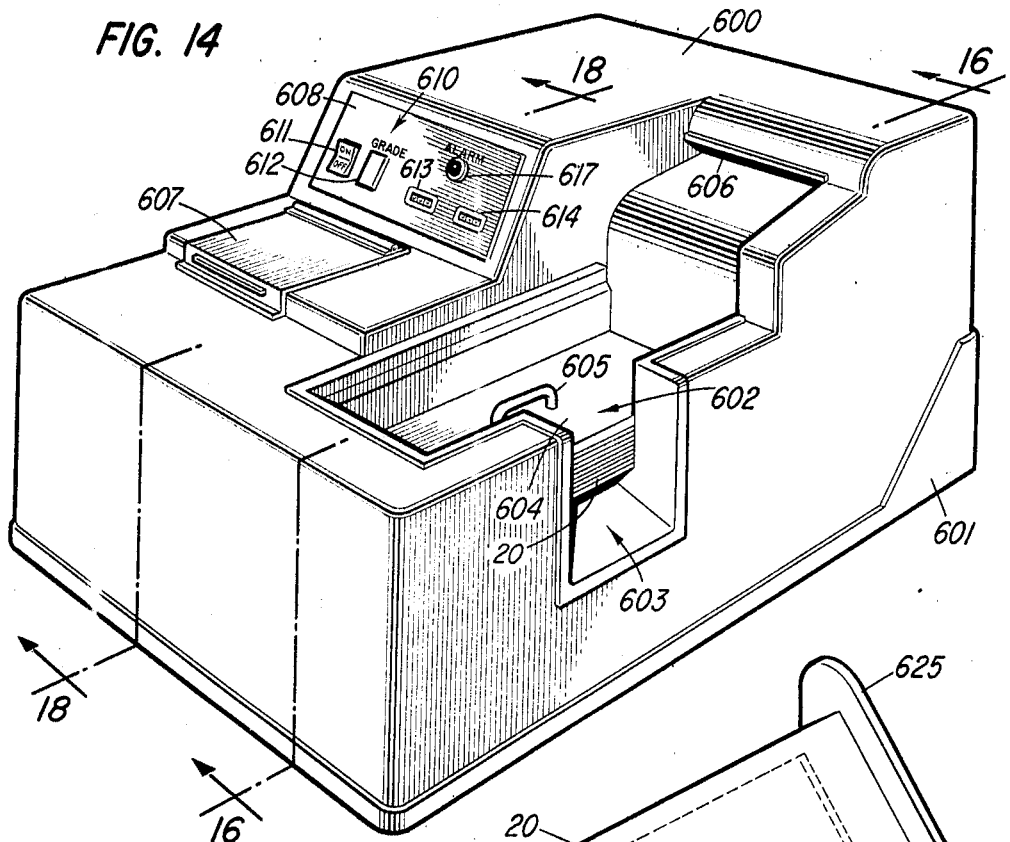
Figure 15:
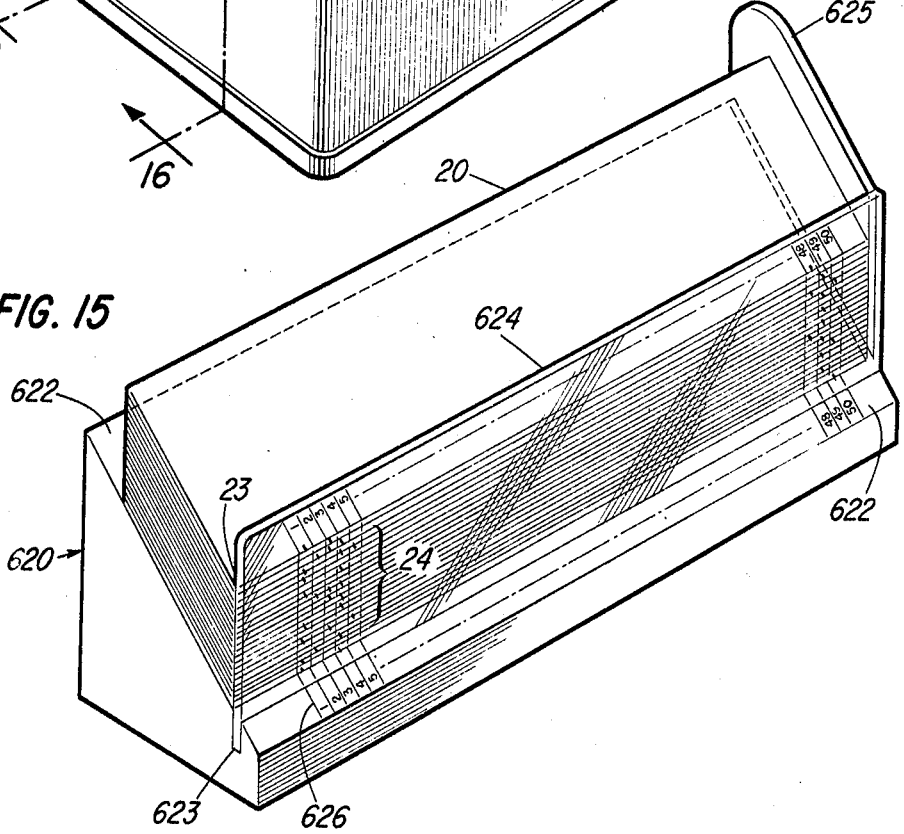
Figure 16:
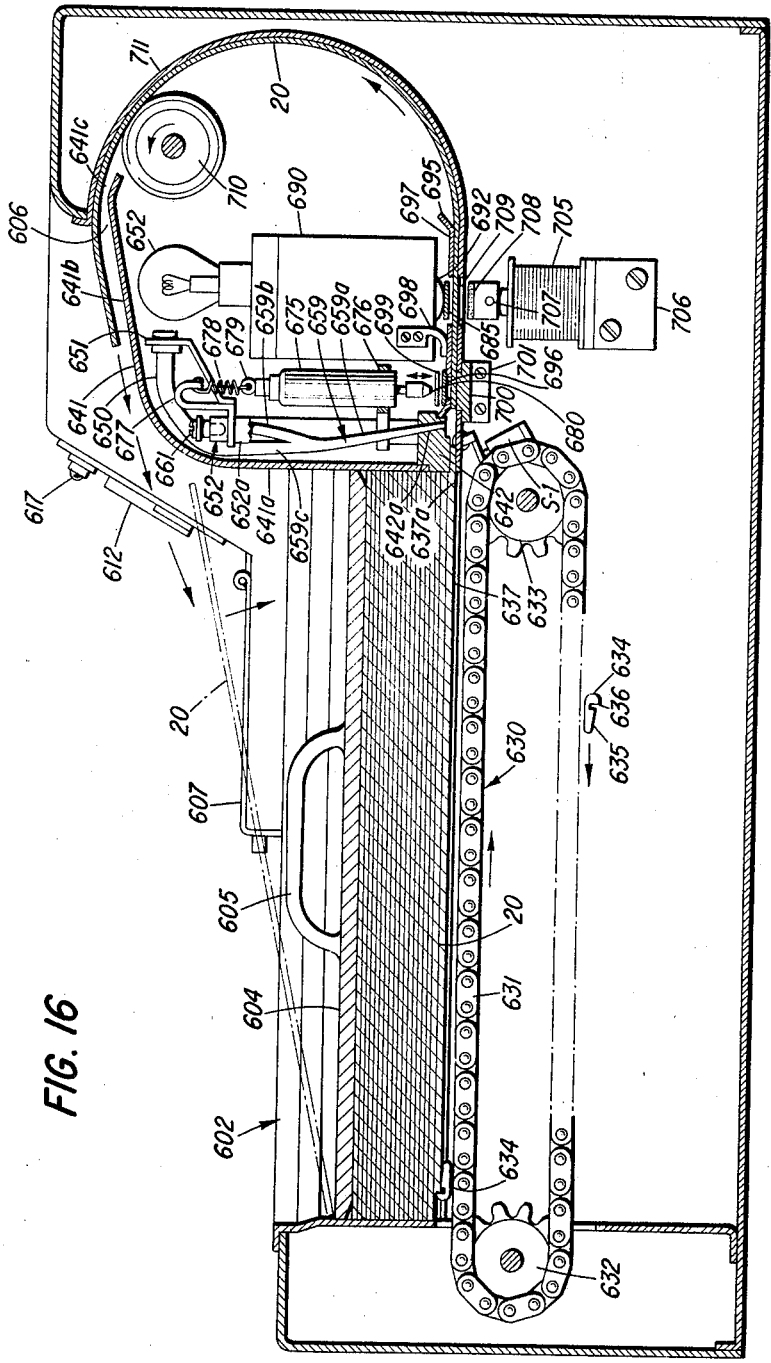
Figure 17:
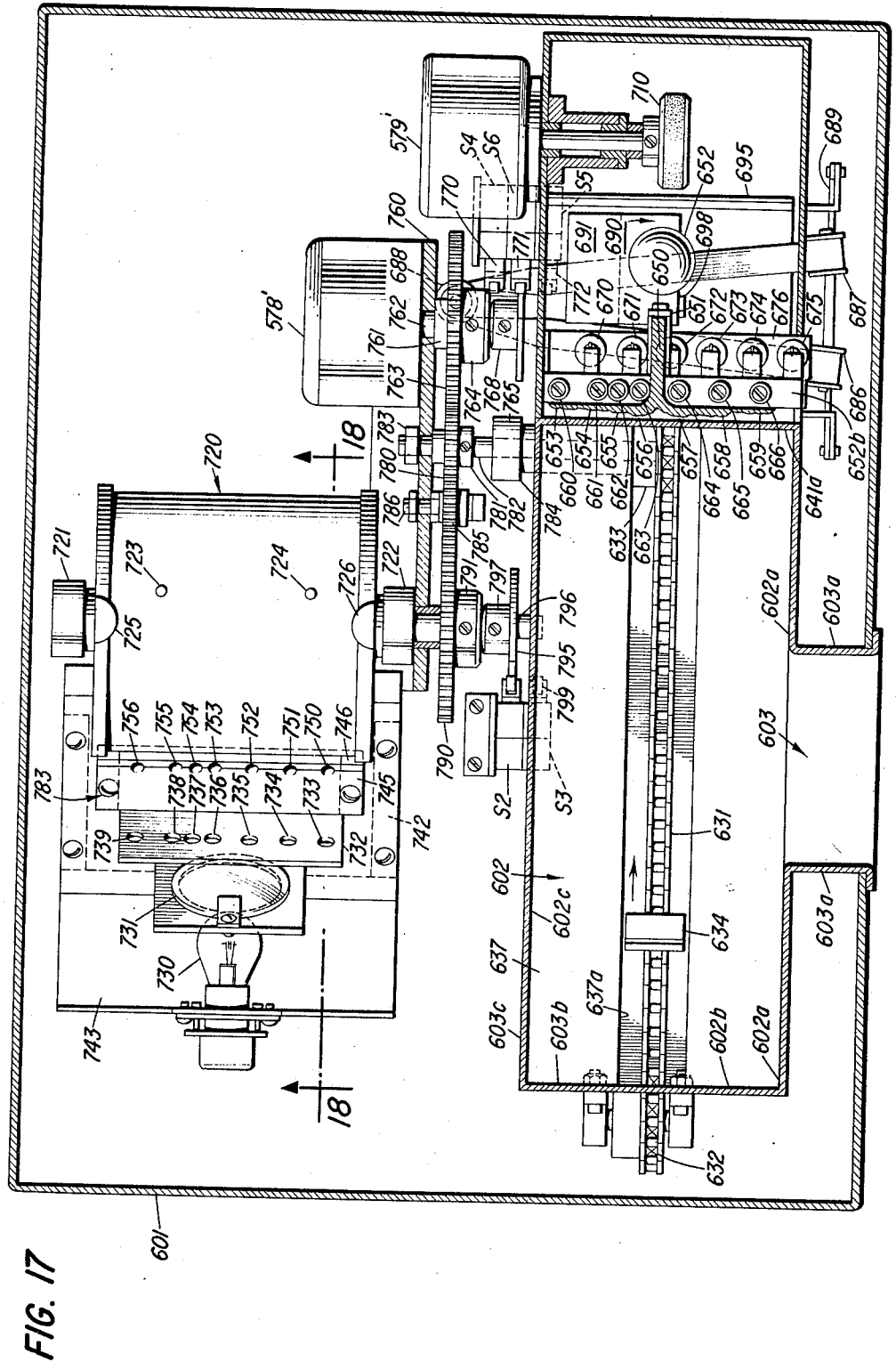

FIG. 13 is a schematic of the power supply system of the test grading and marking apparatus of the invention, including control means responsive to the operation of the apparatus for controlling the power supply system;

FIG. 14 is a perspective view of the test grading and marking apparatus of the invention, as assembled in a suitable housing;

FIG. 15 is a perspective view of a test card holder and evaluator facilitating the qualitative evaluation of test cards when graded and marked by the apparatus of the invention;

FIGS. 16 and 18 are cross-sectional, interior views of the test grading and marking machine of the invention, taken along the lines 16—16 and 18—18, respectively, of FIG. 14, as shown in the apparatus associated with the test card sensing and marking station and the master card sensing station respectively;

FIG. 17 is a plan view of the test grading and marking apparatus of the invention as assembled for enclosure within the housing of FIG. 14 but with the housing shroud removed, showing primarily the transport mechanism, sensing station and grading and marking station for test cards, and the drum transport mechanism and sensing station for a master card;

FIG. 19 is an enlarged view of a portion of the master card scanning station apparatus, taken along the section line 19—19 of FIG. 18; and FIG. 20 is an enlarged view of various timing and synchronization control mechanisms, also shown in FIG. 17.

In FIG. 1 there is shown a master card 10 and a test card 20, suitable for use in the test grading and marking apparatus of the invention. Each of the cards 10 and 20 includes a plurality of answer indication areas arranged in vertical or longitudinally aligned columns A through E and aligned laterally in groups numbered, for example, 1 through 50. The group numbering may correspond to the numbering of a plurality of problems of a test or examination with which the cards 10 and 20 are employed.

The problems of this type of examination are of the multiple choice answer type and typically may have two or more such multiple choice answers for each problem. The answer indication areas of the columns A through E of each group correspond to such multiple choice answers. The test may include problems requiring true or false answers which may be understood to comprise a choice of one out of two possible answer choices. Columns A and B may be employed for all problems having true or false responses, and are so labelled. Any two columns, as desired, may be so employed.

Each answer indication area of the cards 10 and 20 is defined by a set of brackets within which the answer indicia is to be applied in approximate conformity therewith. The height of each area thus defined, in the longitudinal dimension of the cards, is less than that corresponding height of the timing marks, and the answer indication areas and corresponding timing mark for each problem are aligned along a common lateral axis, with the axes displaced in equal amounts for successive problems. Ideally the answer indicia is confined to the area defined by the brackets. To satisfy the requirements of operation of the apparatus of the invention, however, it is only necessary that at least some portion of the answer indicia overlap, in a longitudinal direction, either the upper or lower edge of the corresponding timing mark.

The top portion of the test card 20 includes suitably labelled spaces for identification purposes, and a score area 22 in which the total right and total wrong responses are automatically printed upon completion of grading and marking of the test card. An error mark 24 is applied to a marking region 23 of the test card 20, adjacent the left longitudinal edge thereof, for each problem for which the response is incorrect or omitted. For these same problems, a correct answer mark 25 is applied to the test card 20 adjacent the answer indication area representing a correct response. The marks 24 provide a qualitative evaluation of the frequency of error in responses to given problems for an entire group of test cards, and also immediately indicate the problems answered erroneously on each test card. The marks 25 indicate the correct answers for each problem having incorrect or omitted responses.

In explanation of the significance of indicia applied to the master card 10 and the test card 20 of FIG. 1, it first is assumed that problems 1 and 2 are true-false problems. The answer indicia placed in column A for problem 1 of the test card 20 corresponds to the correct answer indicia applied to column A of master card 10 for problem 1, and thus represents a correct answer. Conversely, problem 2 is answered incorrectly on the test card 20, since the answer indicia in column B does not correspond to the correct answer indicia in column A of the master card 10. An error mark 24 and a correct answer mark 25 adjacent the answer area of column A are therefore made on the test card for problem 2.

In the alternative, problems 1 and 2 may be multiple choice problems for which two or more, or all, of the columns A–E correspond to answer choices, but only a single one of which corresponds to the correct answer. In this case, problem 1 is answered correctly and problem 2 is answered incorrectly on the test card 20, since the answer indicia respectively correspond to and do not correspond to those provided on the master card 10. For problem 3, either answer C or D, or both, may be provided as correct responses on the master card 10; an answer indicia in either column C or D, or both C and D as is indicated in FIG. 1, for problem 3 on the test card 20 will be graded as a correct response.

For problem 4 a single correct answer is indicated on the master card 10 by the indicia in column E. On the test card 20 the answer indicia in column E is correct; however, indicia have also been applied to the answer indication areas of columns A–D. As explained above, problem 4 therefore is graded as incorrectly answered, and the appropriate correct answer mark 25 adjacent column E and the wrong answer mark 24 are made on the test card 20.

For problem 5, the correct answer indicia is applied to column B of the master card 10, but no answer indicia is provided on the test card 20. Problem 5 is graded as an unanswered problem or an omitted response, thereby to distinguish it from one answered incorrectly. The grading comprises the marking of column B for problem 5 with a right answer mark 25 and marking the error mark 24 corresponding to problem 5 in the marking region 23 of the error mark 24. The omitted response to problem 5, however, is not accumulated either as a right or a wrong count. Thus, it is possible to distinguish total right, total wrong, and total omitted answers, and permits weighted scoring of wrong versus omitted answers for discouraging guessing on the part of those taking the examination.

As explained hereafter, the absence of any answer indicia on the master card 10 causes the apparatus to ignore any answer indicia provided for that problem on a test card 20, both as to effecting any marking on the test card 20 and as to accumulating any score, either right or wrong, for that problem. This capability is extremely desirable since it permits ignoring a problem where, after the test has been given and before the test cards have been marked and graded, it is determined that the answer for that problem is either not meaningful or that no appropriate answer choices were provided and thus that the problem should not be graded at all.

This technique is also desirable where it is desired to give a test having fewer problems than the total number for which answers may be provided on the test card. The test cards typically are of standard size and provide for a predetermined number of problems; for example, fifty problems may be answered on the illustrated cards 10 and 20.

An examination of ten problems would require only the ten horizontal rows of answer indication areas. By leaving blank all areas A–E of problems 11–50, the cards may be graded for only ten problems, the responses to which are provided in the numbered rows 1 to 10. Thereafter the test cards 20 may be employed again for additional examinations by using the remaining ones of the previously unused answer indication areas from 11 to 50. A master card 10 containing correct answer indicia in the proper columns of only these newly selected rows then is employed for the grading and marking.

The master card 10 includes a plurality of timing marks 11 which, for the most part, are aligned with corresponding groups of answer indication areas. For a reason to be explained later, three timing marks 11a, 11b, and 11c extend below the timing mark 11d aligned with the answer indication areas of problem 50. The test card 20 includes a plurality of timing marks 21 which, for the most part, similarly to the timing marks 11 are aligned with corresponding answer indication areas of the problems 1 through 50. On the test card 20, however, a single timing mark 21a extends below the timing mark 21b aligned with problem 50. The number of timing marks 11 on the master card 10 equals the number of timing marks 21 of the test card 20.

The master card 10 and the student card 20 are passed longitudinally through their respective sensing stations with their bottom edges 10a and 20a, respectively, leading. The answer indication areas of problem 50 therefore, are the first, and those of problem 1 are the last to pass through the respective sensing stations. Holes 12 and 13 are provided in the master card 10 to permit mounting the latter on a drum which rotates to successively pass the master card through the master card sensing station.

The synchronization of the movement of cards 10 and 20 through their respective sensing stations is described in detail hereafter. Ideally, the cards 10 and 20 are synchronized in their movements so that the corresponding timing marks 11a and 21a, 11b and 21b, . . . are scanned substantially simultaneously. This exact synchronization is not necessary to proper operation, however. Generally, the permissible limits of the range of inexact synchronization are that following detection of a timing mark of one card, such as mark 11a of card 10, and prior to detection of the subsequent timing mark of the same card, such as mark 11b, the corresponding timing mark of the other card, such as mark 21a of card 20, is detected.

Figure 2C:
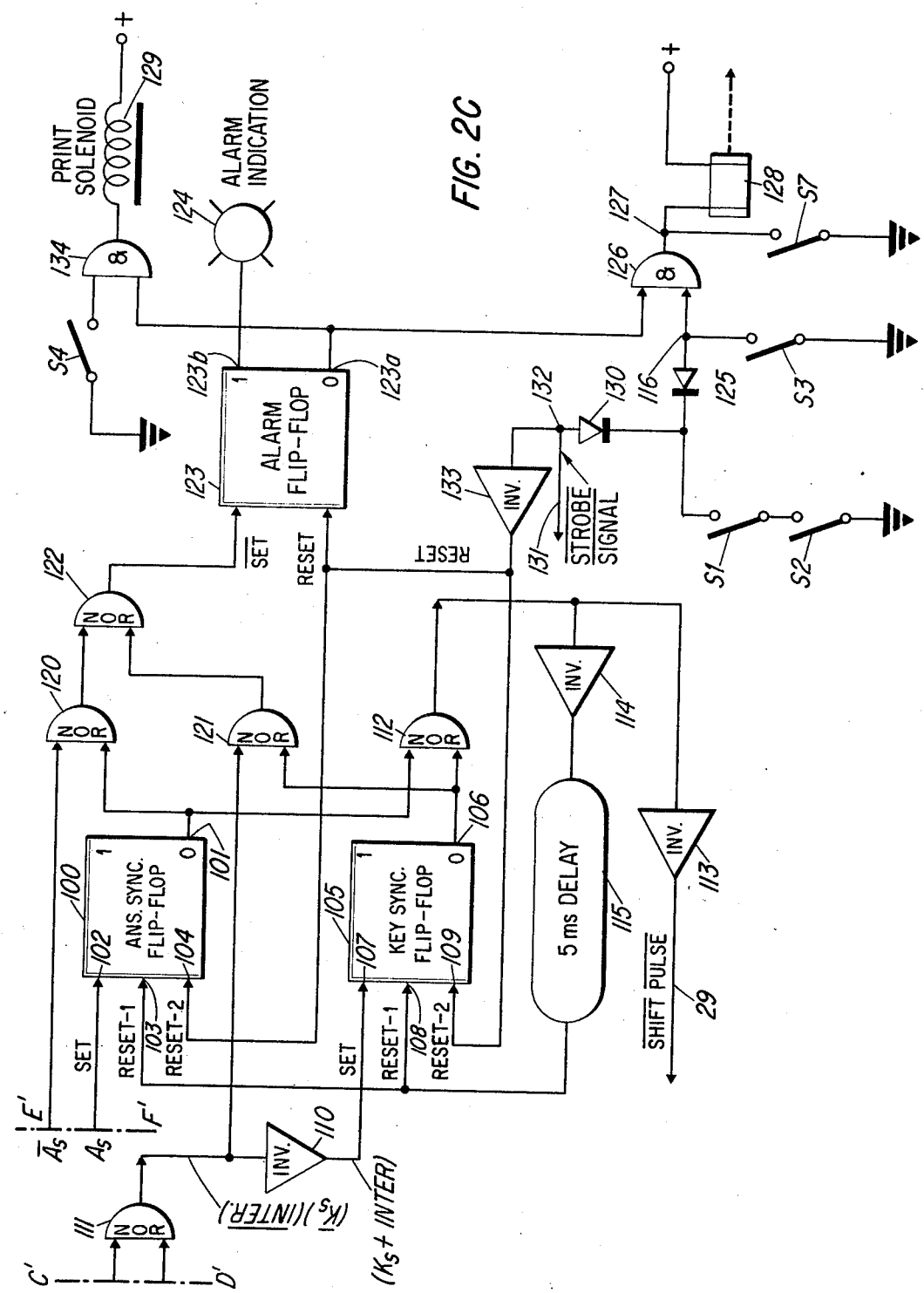

LOGIC DIAGRAMS—FIGS. 2a, 2b, AND 2c

FIGS. 2a, 2b, and 2c, in the composite, comprise a logic system diagram of the test grading and marking machine of the invention. The interconnection of the portions of the logic system shown in FIGS. 2a, 2b, and 2c is indicated by the terminations of leads on the corresponding lines A–B and A'–B' . . . E–F and E'–F' of these figures.

In FIG. 2a, the master card sensing station 15 and the test card sensing station 25 each comprise a plurality of channels. Channels A through E of stations 15 and 25 correspond to the columns of answer indication areas A through E of master card 10 and test card 20, respectively. The sensing stations 15 and 25 further include synchronization (sync) channels 16 and 26 corresponding to the columns of timing marks 11 and 21 of the master card 10 and test card 20, respectively, and background channels 17 and 27 associated with compensation circuits 18 and 28 in the sensing stations 15 and 25, respectively. The background channels and associated compensation circuits adjust the response of the sensing elements of corresponding channels A through E.

Various forms of sensing devices may be utilized for sensing the indicia and timing marks on each of the cards 10 and 20. In accordance with a preferred embodiment of the invention, the sensing is accomplished by light sensitive scanning devices, the electrical conduction characteristics of which are responsive to illumination reflected from the surfaces of the cards 10 and 20. Thus, the answer indicia conveniently may comprise dark pencil marks which are readily distinguishable by the light responsive scanning devices from the generally lighter color of the background of the cards 10 and 20. Various types of solid state devices, known as photocells, are commercially available and are suitable for use as the scanning elements.

Variations in the illumination level reflected from the background of the cards 10 and 20, however, may occur. For example, it may be desired to alter the card background color every given number of rows of answer indication areas to reduce confusion and facilitate visual alignment of the rows with the problem numbers. Inadvertent soiling of the cards may occur during application of the answer indicia. To assure accurate sensing of answer indicia, it is therefore necessary that the photocells do not respond merely to such an alternating background level of the cards. The photocells of the background channels reproduce these background variations as electrical signals. The photocell compensation circuits respond to these signals to adjust the sensitivity of the photocells of the sensing channels A through E, and thus assure accurate sensing of the indicia applied to the cards.

In FIG. 2a, each of the background channels 17 and 27 provides a control input to the corresponding photocell compensation circuits 18 and 28. The outputs of circuits 18 and 28 are applied as inputs to each of the corresponding sensing channels A through E and sync channels. As described hereafter, the photocells of the background channels 17 and 27 may scan the background of the cards 10 and 20, respectively, at some selected position for the entire longitudinal length of the cards.

The outputs of the sensing channels A through E and sync channel 16 of the master card sensing station 15 are identified generally by the labels $\overline{K}a$ through $\overline{K}e$ and $\overline{K}s$, respectively. The outputs of sensing channels A through E and of the sync channel 26 of the test card sensing station 25 are identified by the labels $\overline{A}a^*$ through $\overline{A}e^*$ and $\overline{A}s^*$, respectively.

In each case, the labels are in accord with conventional logic notation, wherein ($\overline{A}a^*$) would be read as (not A$s^*$). Further, if a condition $\overline{A}a^*$ is false, the condition A$a^*$ is true, and for A$a^*$ false, $\overline{A}a^*$ is true. The convention is adopted throughout that a condition, such as $\overline{A}a^*$, if false, corresponds to an electrical signal at a negative or ground level potential and that, if true, corresponds to an electrical signal at a positive, or above ground level, potential. Thus, as indicated in FIG. 2a, if an answer indicia is sensed in column A of a test card being scanned, the condition $\overline{A}a^*$ is false, producing a negative going pulse and representing the truth of the condition A$a$, namely, that the answer indicia A was detected. Opposite polarity conditions may be employed if desired.

The outputs $\overline{A}a^*$ through A$e^*$ of channels A through E, respectively of the test card sensing station 25 are applied to respectively associated, three stage shift registers 30 through 34. The information represented by $\overline{A}a^*$ through $\overline{A}e^*$ is successively advanced through each stage of the shift registers 30 through 34 by shift pulses produced in response to the sensing of the corresponding timing marks of both the test and the master cards. The shift pulses are applied simultaneously through line 29 to all of the shift registers 30 to 34. Each shift pulse advances the information in a given stage to the next succeeding stage, and clears the first stage of each shift register. The shift registers 30 through 34 provide as outputs a first set of signals in accordance with the conditions A$a$ through A$e$, which outputs A$a$–A$e$ are applied to separate inputs of a NOR gate 35. A second set of output signals, in accordance with the conditions $\overline{A}a$ through $\overline{A}e$, are applied individually to the first input of corresponding ones of a plurality of NOR gates 40 through 44. The shift register outputs $\overline{A}a$ . . . $\overline{A}e$ present the same information and, as electrical signals, are of the same polarity as the outputs $\overline{A}a^*$ . . . $\overline{A}e^*$, respectively, of the sensing channels A through E. The primary difference between them is the duration of the pulses, $\overline{A}a^*$ through $\overline{A}e^*$ being a function of the height of the corresponding, sensed indicia and the speed of transport of the test card through the sensing station, while the duration of $\overline{A}a$ through $\overline{A}e$ is determined by the repetition rate of the shift pulses.

The output $\overline{A}s$ of sync channel 26 is applied to an inverter 36 which produces output signals corresponding to the condition A$s$. For a false condition $\overline{A}s$ at the output of sync channel 26, and thus a negative pulse, inverter 36 produces a positive pulse corresponding to the truth of the condition A$s$. The output A$s$ of inverter 36 is applied to the input of inverter 37 which inverts A$s$ to produce the opposite or inverted signal condition $\overline{A}s$. The false condition $\overline{A}s$, correspondng to detection of a timing mark is represented as a negative pulse, identical in its polarity and logic value to the output $\overline{A}s$ from the sync channel 26. Inverters 36 and 37 also operate to produce more uniform pulses than those available from the photocell sensing circuits, and thus contribute to more stable operation. The outputs $\overline{A}s$ and A$s$ of inverters 37 and 36, respectively, are applied to logic systems of FIG. 2c, as shown by lines E–F of FIG. 2a and E′–F′ of FIG. 2c. The function of the sync signals $\overline{A}s$ and A$s$ is described hereafter.

The outputs of the channels of the master card sensing station 15 are of the same polarity, or sense, as those of the channels of the test card sensing station 25 and are represented in logic notation by$\overline{K}a$ through $\overline{K}s$, corresponding to the outputs of channels A through E and the sync channel 16. The outputs $\overline{K}a$ through $\overline{K}s$ are applied to corresponding ones of a plurality of inverters 50 to 55 at the outputs of which inverted, positive signals for the truth of conditions K$a$ through K$s$ are obtained, corresponding to the negative pulses for the false conditions $\overline{K}a$ through $\overline{K}s$. Inverters 50 to 55 also provide a stabilizing effect, similarly to inverters 36 and 37. The output signal conditions K$a$ through K$e$ are applied to a second input of the plurality of NOR gates 40 through 44, respectively, and to corresponding inputs of NOR gate 45.

Referring concurrently to FIGS. 2a and 2b, the output of NOR gate 35 labelled $\overline{ANS}$. ($\overline{ANSWER}$) is applied to a first input of NOR gate 60. The outputs of NOR gates 40 through 44 of FIG. 2a are applied to corresponding inputs of NOR gate 61 of FIG. 2b, and the output of NOR gate 45 is applied to a first input of AND gate 62. The outputs K$a$ through K$e$ of inverters 50 to 55 are also applied to first inputs of corresponding AND gates 70 to 74.

NOR gate 61 produces a true output, for the condition $\overline{WRONG}$ $\overline{ANSWER}$, representing that no wrong answer was detected, only for the condition that each input thereto is false. In FIG. 2a, each of the NOR gates 40 through 44 produces a false output for the conditions that a true output is applied to either one or both of the two input terminals. By contrast, NOR gate 61 produces a false output if one or more of the inputs is true. A true input to NOR gate 61 therefore cause a determination that an incorrect response has been provided on the test card.

The first input to NOR gate 60 is false for the condition $\overline{ANSWER}$ when a response on a test card has in fact been detected, and is true when no answer is detected on the test card. The second input to NOR gate 60, WRONG ANSWER, produced by inverter 66 from the $\overline{WRONG}$ $\overline{ANSWER}$ output of NOR gate 61. The condition, WRONG ANSWER, is true when the logic system determines that the thus detected answer response from the test card is in fact incorrect, and is false when the detected answer response is correct or omitted.

Thus, for a given problem, and as to NOR gate 41, for example, if $\overline{A}a$ is true and K$a$ is either false or true, the output of NOR gate 40 is false. Similarly, if $\overline{A}b$ through $\overline{A}e$ are also all true, which exists only in the case where no answer indicia is provided for the given problem, then regardless of whether K$b$ through K$e$ are either true or false, NOR gates 41 through 44 produce false outputs. NOR gate 61 then produces a true output for the $\overline{WRONG}$ $\overline{ANSWER}$ condition, indicating that no wrong answer, or incorrect response, has been detected. Inverter 66 produces a true output for the WRONG ANSWER condition input to NOR gate 60. The $\overline{ANSWER}$ condition is also true. This condition accurately represents the fact that a total omission of responses exists for this problem. The effect on count accumulation will be demonstrated hereafter.

Assume that in the foregoing example in which the correct answer is represented by a true condition K$a$, that an answer indicia in column B of the test card has been detected. The condition $\overline{A}b$ is therefore false; the condition K$b$ is also false and thus NOR gate 41 produces a true output. As a result, NOR gate 61 produces a false output, correctly indicating that a wrong answer or incorrect response has been detected.

To demonstrate the response of the logic system to a correct response, assume that an answer indicia in column A is detected, whereby the condition $\overline{A}a$ is false. Assume further that this is the correct answer, whereby the condition K$a$ is true. NOR gate 40 therefore produces a false output. If K$a$ represents the only correct response, K$b$ through K$e$ are all false. Further, if an answer indicia occurs only in column A, $\overline{A}b$ through $\overline{A}e$ are all true. Each of the NOR gates 40 through 44 therefore produces a false output and NOR gate 61 produces a true output for the condition $\overline{WRONG}$ $\overline{ANSWER}$.

Further assume that column B also represents a correct answer, in additon to column A. K$b$ therefore would be true. If an indicia is also applied in column B of the test card, the condition $\overline{A}b$ is false and NOR gate 41 produces a false output. Alternatively, if no indicia appears in column B, $\overline{Ab}$ is true and since $Kb$ is also true, NOR gate 41 again produces a false output.

Thus, where every detected answer response is not incorrect, the output of NOR gate 61 is true. Conversely, where one or more detected answer responses is incorrect, regardless of whether a correct answer response is provided, the output of NOR gate 61 is false.

The $\overline{\text{WRONG ANSWER}}$ output of NOR gate 61 is applied directly to a first input of NOR gate 65. The third input of NOR gate 60 and the second input of NOR gate 65 is supplied from the output of AND gate 62 in accordance with the condition $\overline{\text{INTERROGATE}}$. NOR gates 60 and 65 produce true or false outputs for the same conditions of the inputs to their respective input terminals, as described for NOR gate 61.

NOR gates 60 and 65 control the operation of amplifiers 67 and 68 and, for a false output, disable the amplifiers and, for a true output, enable the amplifiers. NOR gates 60 and 65 produce true outputs only for false conditions at each input. The logic comparison described above has no effects on the count accumulation therefore until one or the other of NOR gates 60 and 65 is enabled to produce a true output.

AND gate 62 is enabled to produce a false output only upon the simultaneous presence of false inputs at each of its input terminals. The first input of AND gate 62 is connected to the output of NOR gate 45 of FIG. 2a. A false output is produced by NOR gate 45 only when one of the input conditions $Ka$–$Ke$ is true, and thus only when at least one correct answer indicia is detected on the master card.

Enabling of AND gate 62 further requires that the $\overline{\text{STROBE SIGNAL}}$ condition on line 131' at the second input thereof be false, and thus the strobe signal exists. The generation of the strobe signal is described in relation to FIG. 2c. Generally, the strobe signal is produced only when the information containing portions of both the master and test cards are advanced into their respective sensing stations. In the absence of the strobe signal, the condition $\overline{\text{STROBE SIGNAL}}$ is true, and AND gate 62 therefore is normally disabled. When AND gate 62 is disabled, the condition $\overline{\text{STROBE SIGNAL}}$ is true, and thus NOR gates 60 and 65 maintain amplifiers 67 and 68 disabled. As a result, spurious signals from the channels of the master and test card sensing stations, caused, for example, by detection of the leading edge of the cards or of miscellaneous indicia other than answer indicia on the cards, are prevented from producing meaningless and erroneous logic comparison results. The strobe signal may be applied continuously, and thus $\overline{\text{STROBE SIGNAL}}$ is false, while the information containing portions of the cards are being scanned.

AND gate 62 is enabled, however, only in response to the detection of an answer indicia from the master card. When enabled, the output of AND gate 62 is false for the $\overline{\text{INTERROGATE}}$ condition and thus represents a demand to interrogate. Only at this time do the results of the logic comparison system for a given problem produce the count accumulation and marking of the test card. Thus, at this time a false condition is maintained at the third input of NOR gate 60 and the second input of NOR gate 65, satisfying one requirement for the production of a true output condition at their respective outputs.

Thus, during the interrogate operation, if $\overline{\text{ANSWER}}$ is false, and thus a response has been detected on a test card, and WRONG ANSWER is false, indicating that the answer thus detected is true, NOR gate 60 produces a true output and enables amplifier 67. Conversely, $\overline{\text{WRONG ANSWER}}$ is true and NOR gate 65 produces a false output maintaining amplifier 68 disabled.

Where the detected answer indicia from the test card represents an incorrect response, WRONG ANSWER is true and NOR gate 60 produces a false output, disabling amplifier 67. Conversely, $\overline{\text{WRONG ANSWER}}$ is false and NOR gate 65 produces a true output enabling amplifier 68.

In the case of an omitted answer, $\overline{\text{ANSWER}}$ is true and NOR gate 60 produces a false output disabling amplifier 67. Similarly, $\overline{\text{WRONG ANSWER}}$ is true and NOR gate 65 produces a false output disabling amplifier 68.

Amplifier 67 receives an input signal and produces an amplified output signal only when the logic system determines that a correct response has been provided on the test card for a given problem. More specifically, when NOR gate 60 is enabled and produces a true output, amplifier 67 is enabled. The output of amplifier 69 comprises a positive pulse which is applied to a printing counter 92 and to a display counter 93, actuating them to accumulate a single count for each correct response provided on the test card 20. Following grading and marking of all problems of the given test, the counter 92 prints the total number of right answers in the box 22 of the test card 20. The display counter 93 accumulates and displays the total number of correct answers presented on all test cards of a selected group of test cards such as those of an entire class. The total count thus displayed may readily be divided by the total number of test cards corrected, to determine the class average, for example. A manual reset of the display counter 93 is provided for clearing the count accumulation prior to correcting a new group of test cards.

Amplifier 68 receives an input signal and produces an amplified output signal only when the logic system determines that an incorrect response has been provided. More specifically, when NOR gate 65 is enabled and produces a true output, amplifier 68 is enabled. The output of amplifier 68 comprises a positive pulse which is applied to a wrong answer counter and printer 94 and to a wrong answer display counter 95. The units 94 and 95 function in the identical manner as the units 92 and 93, but in response to incorrect response determinations. A manual reset is provided for the wrong answer display counter 95.

The test grading and marking machine of the invention is fully automatic in operation and therefore must be capable of grading and marking successive ones of a plurality of test cards 20 without requiring the constant attention of an attendant. Therefore, the printing counters 92 and 94 which accumulate the total counts of right and wrong answers, respectively, for each individual test card must be automatically reset prior to the grading of a succeeding test card 20. For this purpose, there is provided a switch S5 which is normally in the open position indicated. Upon termination of the grading of a given test card, switch S5 closes, completing a circuit to ground and providing a first input to AND gate 97. A counter reset oscillator 98 continuously applies a train of reset pulses as a second input to the AND gate 97. When a given test card has been completely graded, the right and wrong answer total counts are printed thereon by the printing counters 92 and 94, respectively. Thereafter, switch S5 closes and AND gate 97 is enabled to apply the train of reset pulses generated by oscillator 98 to each of the counters 92 and 94. The reset pulse train returns, or advances, as desired, the count accumulating mechanisms of the counters 92 and 94 to a "0" count. Switch S5 is thereafter opened automatically, and counters 92 and 94 are prepared for accumulating the counts of the next successive test card to be graded by the machine.

An important feature of the test grading and marking apparatus of the invention is the capability of marking the test card adjacent the answer indication area representing a correct response in the event that either an incorrect response or no response has been provided for any given problem. In the portion of the logic diagram shown in FIG. 2b, this marking feature is accomplished by the marking station 90 having a plurality of channels A through E corresponding to the longitudinal columns of answer indication areas A through E of the test card 20 in FIG. 1. These channels each comprise a marking device suitably energized by the correct answer information derived from the master card and represented in FIG. 2b by the inputs Ka through Ke to the AND gates 70 through 74. Since the marking devices are not to be energized in the event that a correct answer has been provided, however, inhibit means are provided to inhibit energization of these marking devices.

A further important feature of the invention is the provision of the wrong answer marks 24 in the marking region 23 of the test card 20 in the event that an incorrect response or no response has been provided for a given problem. The inhibit means for channels A through E also controls the operation of the error marker device 91 which provides the error marks 24.

AND gates 70 to 74 are enabled in response to a true input condition at each of the two input terminals thereof and produce a true output, when thus enabled. Amplifiers 80 to 84 respond to a true output from their respectively associated AND gates 70 to 74 to selectively actuate the marking devices of the corresponding channels A to E.

The selective actuation of the marking devices of channels A to E is in accordance with the correct answer information derived from the master card for each problem, and represented by one or more of the conditions Ka to Ke being true. As shown, the leads on which appear the condition Ka to Ke are connected to a first input terminal of the AND gates 70 to 74, respectively. Thus, for each of the true conditions Ka to Ke, a first enabling input to the corresponding AND gates 80 to 84 is established.

As previously discussed, the interrogate demand, or the false condition $\overline{\text{INTERROGATE}}$, determines the time of performance of the logic comparison for determining the correctness or incorrectness of a detected answer response. This demand also determines the operation of the right answer marking devices of station 90 and, in fact, satisfies the second condition for which AND gates 70 to 74 are enabled. The AND gates 70 to 74 are thus normally enabled during the false condition $\overline{\text{INTERROGATE}}$. NOR gate 69, however, performs an inhibit function to maintain the AND gates 80 to 84, and thus their corresponding amplifiers 80 to 84, and the edge marker amplifier 85 disabled when the logic system determines that a detected response for a given problem is correct. In particular, NOR gate 69 produces a false output for the condition RIGHT ANSWER to achieve the inhibit function.

A first input of NOR gate 69 is supplied from the output of NOR gate 60, and a second input comprises the $\overline{\text{INTERROGATE}}$ condition. The output of NOR gate 69 will be false if either input is true, and true only if both inputs are false. Except when the system is in the interrogate mode, $\overline{\text{INTERROGATE}}$ is true and thus NOR gate 69 produces a false output. This is merely consistent with the fact that no marking should be occurring at this time. The inhibit function of NOR gate 69 becomes significant during an actual interrogate mode. Here, $\overline{\text{INTERROGATE}}$ is false, and thus a first condition for NOR gate 69 to produce a true output is satisfied.

The RIGHT ANSWER condition normally is false, and becomes true only when, during an interrogate mode, the logic system determines that a detected answer response is correct.

More particularly, when the $\overline{\text{INTERROGATE}}$ condition and the RIGHT ANSWER condition are both false, NOR gate 69 produces a true output. One or more of the conditions Ka–Ke will also be true and represent the correct answer information. Thus the AND gate or gates corresponding to the correct answer information will be enabled, enabling the corresponding ones of the amplifiers 80 to 84 to actuate the marking devices of the channels A through E to apply the correct answer mark 25 to the test card for that problem. Amplifier 85 is also enabled and error marker 91 actuated to apply the wrong answer mark 24 to the marking region 23 of the test card 20 for that problem.

The $\overline{\text{INTERROGATE}}$ condition applied to the second input of NOR gate 69 is produced by a one shot multivibrator 64. The multivibrator 64 produces a pulse of an adjustable 10–15 ms. duration having the identical logic or information content of the $\overline{\text{INTERROGATE}}$ condition applied at the input of the multivibrator 64 from AND gate 62. The ability to precisely control the duration of the interrogate pulse is desirable since it assures precise actuation of the marking devices and limits the actuation thereof to only the necessary duration for applying the marks to the test card.

To be prevented from producing a true output, the RIGHT ANSWER condition output of NOR gate 60 must be true. If this is true, the NOR gate 69 produces a false output condition $\overline{\text{RIGHT ANSWER}}$, representing the determination of the logic system that the detected answer response is correct, or right. The false output of NOR gate 69 inhibits the operation of the marking devices of marking station 90, as is desired when the response for a given problem is correct.

The master control, synchronization, and alarm systems of the apparatus of the invention are shown in the logic diagram of FIG. 2c. Answer sync flip-flop 100 and key flip-flop 105 assure that the master and test cards 10 and 20 proceed through their respective sensing stations in proper synchronization and thus that the answer information derived from the test card and compared with answer information derived from the master card corresponds to the same problem.

The flip-flops 100 and 105 are normally in a "0" state, producing a true output condition at their respective output terminals 101 and 106. The flip-flops are set to a "1" state in response to set pulses applied at their input terminals 102 and 107, whereupon false output conditions are established at their respective output terminals 101 and 106. A set pulse to answer sync flip-flop 100 corresponds to the condition As being true, and thus to detection of a timing mark on the test card. A set pulse to key sync flip-flop 105 corresponds to the condition (Ks+INTER.) being true, corresponding to the detection of either or both of a timing mark and an answer indicia on the master card for a given problem. The set pulse is derived from inverter 110 in response to the output of NOR gate 111. The set pulse is thus consistent with the condition (Ks) (INTER.) being false.

NOR gate 111 produces a false output when either of its inputs is true. As indicated by the corresponding lines C–D of FIG. 2b and C'–D' of FIG. 2c, the inputs to NOR gate 111 comprise the output of inverter 63, the condition INTERROGATE, and the output of inverter 55 from sync channel 16 (FIG. 2a), the condition Ks. For either of the conditions that interrogate is true or that Ks is true, NOR gate 111 will produce a false output and inverter 110 will produce a true output for their respective logic conditions, resulting in a set pulse being applied to key sync flip-flop 105.

NOR gate 112 produces a true output only when each of its inputs is false, and thus only when both of the answer and key sync flip-flops 100 and 105 are set in the "1" state. The true output of NOR gate 112 is applied to inverter 113 and the latter develops the shift pulse signal at its output line 29. The true condition at the output of NOR gate 112 comprises a positive pulse and thus the shift pulses produced on output line 29 of inverter 113 are negative going pulses.

Inverter 114 similarly produces a negative pulse in response to each occurrence of a true condition at the output of NOR gate 112. These negative pulses are each delayed by delay circuit 115. The delay period is selected to be of 5 ms. duration although any suitable period of delay may be used. The thus delayed negative pulses are applied as reset-1 pulses to the input terminals 103 and 108 of the answer and key sync flip-flops 100 and 105 respectively. The answer and key sync flip-flops 100 and 105 are thereby reset to the "0" state and NOR gate 112 receives a true input at each of its input terminals and thus produces a false output until the flip-flops are again set.

As noted previously, a failure of synchronization occurs when two timing marks of a given card are detected prior to the detection of the corresponding timing marks from the other card. This function is performed by NOR gates 120, 121, and 122 for actuating alarm flip-flop 123. Alarm flip-flop 123 is normally in its "0" state on a non-alarm condition and is set to the "1" state under alarm conditions resulting from failure of synchronization. The setting of alarm flip-flop 123 corresponds to the $\overline{\text{SET}}$ condition being false, the truth or falsity of this condition being determined by NOR gate 122. Under proper synchronization, therefore, NOR gate 122 must produce a true output and therefore must receive false condition inputs at each of its input terminals. A false condition from each of NOR gates 120 and 121 requires that a true condition exist at one or the other or both of their corresponding input terminals.

For example, upon receipt of a set pulse to answer sync flip-flop 100, the condition $As$ is true and the condition $\overline{A}s$ is false. Prior to being set however, the condition at output terminal 101 is true and NOR gate 120 produces a false output. These same conditions exist for key sync flip-flop 105 and its corresponding NOR gate 121. Thus NOR gate 122 receives two false condition inputs, producing a true condition output for the condition $\overline{\text{SET}}$ and alarm flip-flop 123 is not set.

During an allowable inexact synchronization operation, one of the answer or key sync flip-flops 100 and 105 may be set prior to the other. Under this condition, or even prior to any setting of either of the flip-flops 100 and 105, the NOR gates 120 and 121 still maintain a false output. For example, prior to setting of flip-flop 105, the condition at output terminal 106 is true and, regardless of the condition at the other input terminal to NOR gate 121, the true condition causes NOR gate 121 to produce a false output. If flip-flop 100 is already set, the subsequent setting of flip-flop 105 does not change this condition. For example, the occurrence of a set pulse and thus the condition $(\overline{K}s)(\overline{\text{INTER.}})$ becoming false does not cause NOR gate 121 to produce a false output since the key sync flip-flop 105, as well as the answer sync flip-flop 100 are not set to the "1" state unitl the trailing edge of the respective set pulses. When set, therefore, and thus when the condition at output terminal 106 correspondingly becomes false, the condition $(\overline{K}s)(\overline{\text{INTER.}})$ is again true and NOR gate 121 continues to produce a false condition at its output.

However, should a set signal be received by either of the flip-flops while that flip-flop is still set from a preceding set pulse, the corresponding one of the NOR gates 120 and 121 will receive two inputs, each of which is false and thus produces a true condition at its output. For example, flip-flop 100 produces a false condition at its output 101, when set. A subsequent set pulse renders the condition $\overline{A}s$ false and thus NOR gate 120 produces a true output condition. NOR gate 122 thereupon produces a false output condition $\overline{\text{SET}}$ and alarm flip-flop 123 is set.

The synchronized movement of the test and master cards requires that the latter are properly positioned within the machine and that suitable marking and grading means initiate their movement and the marking and grading operations. This function is performed in accordance with actuation of switches S1 through S4 shown diagrammatically as simple single pole single throw switches. Switch S1 is a trip switch actuated upon engagement thereof by a test card as the latter is transported into the test card sensing station, and particularly as the information containing portion thereof reaches the scanning position. Switch S2 is actuated in accordance with movement of the master card into appropriate position within the master card scanning station at which scanning is to be initiated.

In the preferred embodiment of the invention, described in detail hereafter, the master card is mounted on a drum which repeatedly rotates the master card through the sensing station. A cam is fixedly mounted on the rotating drum shaft to rotate in fixed relative position with the drum. This cam closes the switch S2 for the duration of passage of the information containing portion of the master card through the sensing station. Switch S3 may be termed a load position switch and similarly is operated by a second, appropriately contoured cam mounted on the drum shaft and rotating in fixed relation with the drum. The second cam opens switch S3 when the drum has rotated to a position whereby the attachment means for mounting the master card on the drum are readily accessible. As the drum rotates and carries the master card past the loading position, switch S3 closes.

Switch S7 is termed the grade switch. When a desired group of test cards have been placed within receiving means on the apparatus and the master card has been appropriately mounted on the drum, the operator closes switch S7 manually and thereby initiates the grading and marking functions. The series connected switches S1 and S2 are connected through diode 125 to terminal 116 at a first input of AND gate 126. The load position switch S3 is connected between terminal 116 and ground. A second input of AND gate 126 is connected to the "0" state output 123a of alarm flip-flop 123. The output terminal of AND gate 126 is connected, at junction 127, in circuit with a relay winding 128 to a positive power supply terminal 129. The grade switch S7 is connected between the junction 127 and ground.

The relay 128 performs various operations, when energized, including the completion of an energizing circuit for the drive motor which actuates the transport mechanisms of the machine. Energization of relay 128 also completes circuits for increasing the illumination level of the lamps at the sensing station, when the latter includes light responsive sensing devices. This permits the machine to be turned on but to remain in a standby condition with the lamps energized at a low level, increasing their useful life.

When grading and marking is to be initiated, the grade switch S7 is closed by the operator. Switch S7 completes a circuit to ground for energizing relay 128, and thus the drive motor is energized to advance the test and master cards through their respective sensing stations and the lamps are energized at their operating illumination level. Rotation of the drum causes its associated cams to close switch S3 as the master card advances past the load position and also to close switch S2 when the drum has rotated sufficiently to introduce the information containing portion of the master card into the sensing station. When the test card transport mechanism has advanced a test card sufficiently to introduce its information containing portion into the test card sensing station, switch S1 is closed.

A momentary closure of grade switch S7 is sufficient to effect closure of switch S3 whereby, assuming alarm flip-flop 123 to be in its "0" state, AND gate 126 is enabled and relay 128 remains energized. It will be apparent that should the alarm flip-flop 123 be set to its "1" state, no output from the output terminal 123a will be applied to the second input terminal of AND gate 126 and the latter will be disabled. Thus, upon failure of synchronization, relay 128 is de-energized and the machine operations are terminated.

The subsequent closure of switches S1 and S2 completes a circuit through diode 125 to continue the enabling of AND gate 126. When the drum completes a revolution and reaches the load position, switch S3 opens. However, at this point in time the test card and the master card are still within their respective sensing stations and switches S1 and S2 remain closed. The drum therefore continues to revolve whereupon switch S3 again closes; switch S3 maintains energization of relay 128 as switches S1 and S2 open upon passage of the test and master cards from their respective sensing stations. Upon completion of grading of all test cards, switch S1 opens and remains open. Switch S3, however, remains closed until the drum rotation returns it to the load position at which time switch S3 opens. Since switch S1 is now open, the opening of switch S3 disables AND gate 126 and the relay 128 is de-energized. The machine thereby reverts to a standby condition in which the drive motor is no longer energized and the illumination lamps are energized at the standby, low illumination level.

Switches S1 and S2 perform additional control functions, as follows: Diode 130 is connected in circuit with the series connected switches S1 and S2. The diode cathode is connected to ground when the switches S1 and S2 are closed, producing a strobe signal on line 131 connected at junction 132 to the anode terminal of diode 130.

The strobe signal generated on line 131 when switches S1 and S2 are closed is applied to the input of AND gate 62 in FIG. 2b. This grounds the line 131, corresponding to the false condition $\overline{\text{STROBE SIGNAL}}$. The strobe signal permits AND gate 62 to be enabled during the scanning of the information containing portions of the master and test cards. Thus, outputs derived from the channels of a master card sensing station such as due to scanning of the leading or trailing edges of the master card or any indicia thereon other than the answer indicia applied to the answer indication areas is prevented. The strobe signal is thus determinative of the generation of interrogate signals. Particularly, the $\overline{\text{INTERROGATE}}$ condition at the output of AND gate 62 is false only when $\overline{\text{STROBE SIGNAL}}$ is also false. The interrogate signal therefore is generated only for each problem on the master card for which an answer indicia is provided and detected and only during the existence of a strobe signal. As described in detail above, the interrogate signal controls NOR gates 60 and 65, and, through multivibrator 64, NOR gate 69 to, in turn, control the performance of the logic comparison operation, the marking functions, and the totalizing of correct and incorrect answers.

Switches S1 and S2 and diode 130 are connected in circuit at junction 132 with the input of an inverter 133. When switches S1 and S2 are opened, and thus applying no input signal, inverter 133 inverts the absence of an input signal to produce an output signal providing a reset function. This reset signal is applied as a second reset input, [reset]-2 to each of the answer and key sync flip-flops 100 and 105. The [reset]-2 inputs hold the answer and key sync flip-flops 100 and 105 in their reset or "0" state regardless of any extraneous signals which may inadvertently occur at the [set] input terminals 102 and 107 thereof. This function is very desirable and assures that the answer and key sync flip-flops 100 and 105 are in the "0" states as the grading and marking of each test card is initiated. Switches S1 and S2, of course, are open only during the time in which the information containing portions of the test and master cards are not within their respective sensing stations. Upon closure thereof the ground signal applied through diode 130 to the input of inverter 133 causes the latter to terminate its production of the [reset]-2 signal, until subsequent opening of switches S1 and S2. The output of inverter 133 also serves to reset alarm flip-flop 123 to its normal "0" state when a failure of synchronization has caused the latter to be set to its "1" state during intervals in which switches S1 and S2 are open.

Upon completion of grading and marking of each test card 20, the test card continues its motion for a short period in timed relation to the drum rotation. A further cam is provided on the drum shaft for fixed rotation with the drum and causes actuation of switch S4. This further cam actuates switch S4 when the right and wrong total print area 22 of the test card 20 is disposed physically beneath the printing counters 92 and 94 (FIG. 2b). Closure of switch S4 and a continued "0" state of the alarm flip-flop 123 provide the required two enabling inputs to AND gate 134 for energization of print solenoid 129. Print solenoid 129 when energized, actuates means to cause the printing counters 92 and 94 to print out the right and wrong totals in the indicated areas of box 22 of the test card 20. Switch S4 is closed only momentarily by the cam, whereby AND gate 134 is enabled only for the time required for the printing operation, and then is disabled.

TIMING CHARTS—FIGS. 3a AND 3b

FIG. 3a comprises a timing chart in which it is assumed that perfect synchronization of the master and test cards exists. FIG. 3b is a timing chart of the same format as that of FIG. 3a, but wherein the master card leads the test card; FIG. 3b is discussed in detail hereafter, and demonstrates the degree to which the master and test cards may be out of exact synchronization without affecting the operation of the apparatus. The labels identifying each waveform are self-explanatory. The speed of movement of the synchronized master and test cards is assumed to be such that the answer indicia to successive problems are sensed in successive periods of 100 ms. duration. Further, as noted previously, the timing marks 11 and 21 are each of identical height in the longitudinal direction of the test and master cards and are of greater height than the associated answer indication areas defined by the brackets.

Upon actuation of the grade switch S7, the master card 10 and a test card 20 are advanced into their respective sensing stations 15 and 25. The cards advance bottom edge first, so that problem 50 is graded first and problem 1 is graded last. Timing mark 21a of the test card 20 and timing mark 11a of the master card 10 are sensed simultaneously. Taking time $t=0$ at the leading, bottom edge of the answer indication areas defined by the brackets for problem 50, the leading edges of the timing marks 21a and 11a are presented to and detected by their corresponding scanning means slightly prior to time $t=0$. Successive ones of the pulses $\overline{A}s$ and $\overline{K}s$ are identified by identical but primed labels 21a' through 21d' and 11a' through 11d', to corresponding to the similarly labelled timing marks. Within the duration of the answer sync pulse 21b' the indicia applied in column A of problem 50 is sensed and produces a pulse $\overline{A}a$ labelled $50'_T$. This pulse $50'_T$ is immediately registered in the first stage of register 30, as indicated.

Since the exact synchronization of the master and test cards is assumed in the timing chart of FIG. 3a, it follows that the corresponding sync pulses $\overline{K}s$ and $\overline{A}s$ occur simultaneously and, due to their derivation from timing marks of identical height, are of identical duration. The sync pulses $\overline{A}s$ are labelled 21a', 21b', . . . to correspond to the timing marks 21a, 21b, . . ., respectively, from which they are produced. Similarly the sync pulses $Ks$ are labelled 11a', 11b', . . . to correspond to the timing marks 11a, 11b, . . ., respectively, of the master card 10. The trailing edges of the sync pulses $\overline{A}s$ and $\overline{K}s$ set their respective flip-flops 100 and 105, and, simultaneously with the concurrent setting of both flip-flops 100 and 105, there is produced a corresponding shift pulse. The setting of the answer and key sync flip-flops is represented in FIG. 3a by negative or ground level potential pulses corresponding to the set or "1" state, and by a positive potential signal level corresponding to the normal or "0" state. The waveforms thus defined correspond to the false and true conditions at the output terminals 101 and 106 of the flip-flops 100 and 105 during the normal and set states thereof, respectively. The shift pulses are shown as a train of negative going pulses of relatively short duration.

A period of 5 ms. following the leading edge of each shift pulse there occurs a reset-1 pulse, the delay of 5 ms. being indicated by the symbol $\theta$. The leading edges of the reset-1 pulses reset the answer and key sync flip-flops simultaneously. Hence, the negative pulses representing the set state of the answer and key sync flip-flops are of only 5 ms. duration, as represented by the symbol $\theta$.

The shift pulses are labelled $a'$, $b'$, $c'$ ... to correspond to the simultaneously sensed and corresponding sync pulses $11a'$ and $21a'$; $11b'$ and $21b'$, ..., respectively. Shift pulse $b'$ simultaneously advances the information stored in the first and second stages to the second and third stages, respectively, of the shift register and clears the first stage.

Pulse $50'_T$, representing the detected answer response indicia of column A for problem 50, is registered upon receipt in the first stage of the shift register and is advanced by shift pulse $b'$ to the second stage. Shift pulse $b'$ also clears the first stage. No further answer indicia is detected from column A of the test card for problem 49, or for problem 48, and therefore no further test card answer pulses $\overline{A}a$ are shown in FIG. 3a. Shift pulse $c'$ then advances the information stored in the second stage to the third stage of the register 30 for channel A, and since the first stage was previously cleared, advances this nonset or cleared state of the first stage to the second stage, thereby clearing the latter. The second period following the detection of the answer indicia in column A for problem 50 of the test card, the indicia applied to column A for problem 50 representing the correct answer information on the master card 10 is sensed. This is shown in FIG. 3a as the pulse $50'_M$ of the waveform labelled master card answer indicia pulse(s) $\overline{K}a$.

The interrogate signal occurs only when an answer is sensed from the master card 10. Thus, no interrogate signal occurs during sensing of the master card timing marks $11a$ through $11c$. However, upon sensing of the answer indicia in column A for problem 50, producing pulse $50'_M$, and thus sensing of the timing mark $11d$, AND gate 62 (FIG. 2b) is enabled and the interrogate pulse represented in FIG. 3a is produced. This interrogate pulse enables the marking and grading operations in the manner previously explained. With reference to the master and test cards 10 and 20 of FIG. 1, the brackets defining the answer indication areas are preferably of shorter height in the longitudinal direction than that of the corresponding timing marks 11 and 21. This encourages the individual marking the cards to confine the indicia within the brackets and thus to assure that at least a portion of the applied indicia and the corresponding timing marks for a given problem are horizontally aligned. Should this alignment not be maintained, the sensing of the correct answer indicia from the master will result in the production of an interrogate pulse shortly following the master sync pulse and the alarm condition will develop. This indicates no malfunction of the machine; however, the alarm condition is produced to prevent inaccurate operation. No timing mark 11 aligned with problem 1 is provided on the master card 10. Problem 1 is the last problem to be graded, and therefore such a timing mark is not necessary for control synchronization. However, an interrogate pulse will be produced if a correct answer indicia is provided for problem 1 on the master card 10.

The trailing edges of the answer and key sync pulses $21d'$ and $11d'$, produce a shift pulse $d'$ which again advances the register and, since the second stage was already cleared, clears the third stage of the register. Again, following the 5 ms. delay of delay network 115, a reset pulse, reset-1, is applied to both the answer and key sync flip-flops 100 and 105 to reset them to the "0" condition.

The strobe signal is a ground level signal generated upon entry of the information containing portions of both the master and test cards into their respective sensing stations. The strobe signal is maintained for the duration of the scanning operation for an individual test card, and thereafter is terminated until a subsequent test card enters the scanning station. The strobe signal therefore is shown in FIG. 3a as a single pulse having a normally positive value corresponding to the true condition $\overline{\text{STROBE SIGNAL}}$, and having a ground level value correspond to the false condition $\overline{\text{STROBE SIGNAL}}$ to permit response of the system to timing and answer response information sensed from the test and master cards. The reset-2 pulse(s) is merely the inverted waveform of the strobe signal and clamps the flip-flops 100, 105, and 123 in their normal "0" states preventing their being set by extraneous signals, until the information sensing operation is initiated.

The timing chart of FIG. 3b represents operation of the apparatus of the invention within a permitted range of inexact synchronization of the relative positions of the master and test cards as they move through their respective sensing stations. In FIG. 3b, it is assumed that the master card is leading the test card. The range of permissible inexact synchronization extends from an extreme leading, to an extreme lagging limit. These limits are best expressed by a specific example. In FIG. 3b, pulse $11b'$ of the master card sync pulses $\overline{K}s$ leads the corresponding pulse $21b'$ of the test card sync pulses $\overline{A}s$. The extreme limit of lead for permissible inexact synchronization is that the leading edge of pulse $11b'$ must follow the trailing edge of pulse $21a'$ by an interval not less than the reset time of the flip-flops, and thus by not less than 5 ms. Pulse $11b'$ in FIG. 3b is illustrated to occur at a time approaching this leading extreme limit. The extreme limit of lag is that the trailing edge of the pulse $11b'$ must occur not less than 5 ms. prior to the leading edge of the pulse $21c'$ by this same interval, and thus by 5 ms. The reset time may be selected to be of any desired value. As long as the thus defined range is not exceeded, it is apparent that the alarm condition will not occur.

In FIG. 3b, the answer indicia pulse $\overline{A}a$ and sync pulses $\overline{A}s$ are identical to those of FIG. 3a. The pulses $\overline{K}s$ of the master card, however, precede the corresponding sync pulses $\overline{A}s$ of the test card by a substantial portion of the 100 ms. periods. In each case, however, the trailing edges of the test card and master card sync pulses set their respective answer and key sync flip-flops. The key sync flip-flop remains set for a substantial period of time and only upon the latter occurring setting of the answer key sync flip-flop is there produced a shift pulse. The reset-1 pulses are generated at a 5 ms. delay from the corresponding shift pulses and the trailing edges thereof reset the answer and key sync flip-flop simultaneously.

The answer indicia pulse $\overline{K}a$, namely $50'_M$, occurs substantially earlier than in FIG. 3a. However, the third stage of the shift register is already set representing the detection of the test card answer response pulse $50'_T$. Upon the occurrence of the interrogate pulse, simultaneously with the occurrence of the master card answer indicia pulse $50'_M$, the logic comparison function immediately proceeds.

It will be appreciated that the shift registers not only provide for physical displacement of the sensing and marking devices of the test card station but also provide for a substantial range of inexact synchronization of the movements of the master and test cards without affecting the accuracy of the results of the grading and marking functions.

CIRCUIT SCHEMATIC—FIGURES 4 TO 13

The schematic of the logic and control systems of the test card and marking apparatus of the invention is set forth in several portions in FIGS. 5 through 11, which generally may be arranged as indicated in FIG. 4 to provide a substantially complete circuit schematic of the sensing stations, logic and control systems, and the marking stations of the apparatus. The shift registers 30 through 34 associated with the test card sensing station 25 have identical circuit schematics and a representative, single schematic is shown in FIG. 12. A power supply system is shown partially in schematic and partially block diagram form in FIG. 13. FIGS. 12 and 13 are discussed hereafter. For convenience and ease of understanding, elements shown in the schematics of FIGS. 5 through 11 which are identical to those of logic diagram of FIGS. 2a through 2c are indicated by identical but primed numerals.

Figure 6:
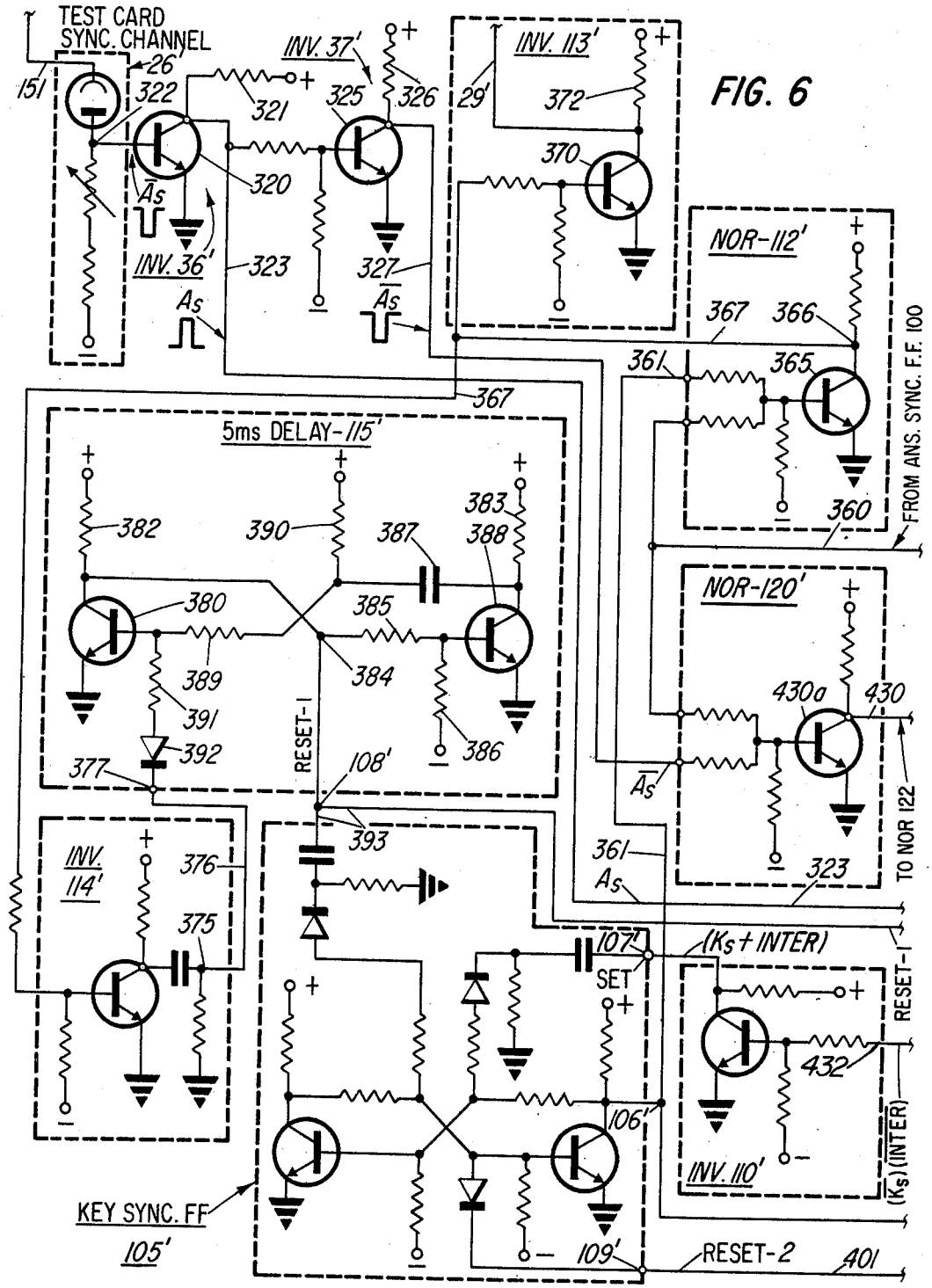

In FIG. 5 is shown the test card sensing station 25' including channels A through E, the background channel 27' and photocell compensation circuit 28'. In FIG. 6 is shown the synchronization channel 16'. Since each of the channels A through E and the synchronization channels 26' are identical in their circuit structure, a detailed explanation will be provided only for channel A. Channel A includes a light sensitive device 150 which may be of any suitable commercially available type; the devices such as 150 are referred to hereafter as photocells. Photocell 150 is connected at its anode through a common lead 151 to a first terminal 152 of a load resistor 153. The other terminal 154 of load resistor 153 is connected to a positive power supply terminal. The cathode of the photocell 150 is connected to a series circuit of a variable resistor 155 and a shift resistor 156 through a common lead 157 to a negative power supply terminal.

Suitable illumination means (not shown in FIG. 5), described hereafter, are provided in the sensing stations to illuminate, and thus scan, the master and test cards. The cards preferably are illuminated by well-defined beams, scanning corresponding ones of the columns of answer indication areas, timing marks, and a selected longitudinal area of the background of the cards. For example, the photocell 150 is positioned to receive light reflected from a test card in a longitudinal region aligned with the column A of answer indication areas. The background of both the master and test cards is preferably relatively light in color, and a relatively high percentage of incident light is reflected therefrom. Answer indicia are preferably relatively dark and may be applied by a pencil; the percentage reflection of incident light from the answer indicia is thus much lower than from the background. A first intensity level of light is reflected from the background of the card causing a first, high level of conduction of photocell 150. As the test card is moved relatively to the photocell, preferably by transporting the test card through the sensing station, the photocell normally responds to light reflected from the card background. The potential at junction 159 at the photocell cathode is normally at a relatively high, positive value. When an answer indicia occurs in an answer indication area of column A, the intensity of the reflected light drops to a second, lower level, and correspondingly the conduction of photocell 150 is thereupon reduced to a second, lower level due to an increase in its internal resistance, and the voltage drop thereacross increases. As a result, a negative pulse is produced at the junction 159 between the cathode of photocell 150 and the variable resistor 155. The duration, or width, of the negative pulse is a direct function of the height of the indicia and the speed of the movement of the test card relative to the photocell. As the test card is transported further through the sensing station, light reflected from the background will again be directed to the photocell 150, causing it to return to its first current conduction level in which the internal resistance is very low. The voltage drop thereacross again decreases to a minimal value, and the voltage level at terminal 159 approaches that on the common lead 151. The magnitude of the proportion of the voltage drops across the photocell 150 relative to that across the series connected resistors 155 and 156 may be adjusted by adjustment of the variable resistor 155. A variable resistor such as 155 is provided in each of the channels A through E and 26' to permit balancing the individual gains of the photocell circuits of the different channels, and thus to obtain substantially the same output potential levels from each channel. Compensation is thus provided for unequal initial response characteristics of the photocells and for variations in the sensitivity of the individual photocells, resultant from aging and the like.

The common lead 151 is connected at junction 152 through the photcell compensation circuit 28' to ground. The associated background channel 27' includes a photocell 150 which preferably is of the same type as that employed in the other channels and which is connected at its anode to the common junction 152 and at its cathode at junction 158 through a resistor 161 to a negative power supply terminal. The photocell 160 continually scans the background of the test card to respond to variations in the reflected illumination due to changes in the reflectivity of the background of the test card. The background channel 27' thus continually adjusts the sensitivity of response of the information sensing photocells in accordance with changes in reflectivity and assists in stabilizing the potential level of the output signals from these channels.

The background compensation is provided through the use of transistors 162 and 163 in the photocell compensation circuit 28'. NPN type transistors are employed throughout the circuit as the active circuit elements. If desired, other forms of transistors or electron tubes, or the like, may be used in the alternative, with corresponding changes in the circuit structure in a manner well known in the art.

Variations in the light level reflected from the card background varies the current conducted by photocell 160 and thus the voltage drop across the load resistor 161. The varying voltage thus produced at junction 158 is applied to the base terminal of transistor 162, causing a corresponding variation in the conduction thereof. The transistor 152 is connected in an emitter follower configuration and variations in its conduction level produce corresponding variations in the same sense in the voltage drop across its associated emitter resistor 164 and thus at its emitter terminal. The emitter terminal of transistor 162 is connected to the base terminal of transistor 163, and the voltage variations thereby control conduction of the latter. Thus, for example, should the light level increase, due to a change in the intensity of the illumination means and thus in the reflected light, or due to a change in the reflectivity of the card background, photocell 160 increases conduction and a positive going signal is developed across resistor 161 and applied to the base of transistor 162. The positive going signal applied to the base of transistor 162 increases its conduction level and produces a positive going signal at its emitter terminal, which thus is applied to the base of transistor 163. The conduction level of transistor 163 thereupon increases. Transistor 163 operates as a variable impedance shunt to ground from the junction 152, the variations in impedance corresponding to variations in its conduction level.

As the transistor 163 increases conduction, its impedance decreases, and the potential at junction 152, which is applied in common to the anodes of the photocells of all channels is correspondingly decreased. The opposite effect obtains for a decrease in the background level of reflected light, whereby a higher anode potential is applied to the information sensing photocells. Thus, the information sensing photocells are rendered more or less sensitive as the level of the reflected light decreases or increases, respectively.

The three-stage stift registers 30' through 34' are shown in block diagram form and are connected at their respective set input terminals to the output terminals of channels A through E. The output terminal of channel A is the junction 159 at the cathode of photocell 150. Junction 159 is normally at a positive potential level. A negative going, or ground level pulse is produced at junction 150 when an answer indicia is sensed in the A column; this corresponds to the false condition $\overline{A}a^*$. The occurrence of such a negative going pulse effects setting of the first stage of the shift register 30'. Registers 31' to 34' are similarly set upon the occurrence of output pulses from thier corresponding sensing channels B to E.

A common shift pulse line 29' is connected to a shift input terminal of each of the registers 30' through 34'. The means for producing the shift pulses are described hereafter. The shift registers are normally in a "0," or unset state. When set, the shift register is switched to a "1" state, corresponding to the detection of an answer indicia in the column of the test card corresponding to that register. The first shift pulse occurring thereafter advances the information to the second stage, clearing the first stage. A second shift pulse advances the information from the second to the third stage. This information is now available at the output terminals of the register, and represents the information originally presented thereto. The outputs of the registers 30' to 34' representing the conditions Aa to Ae are applied to leads 170 to 174, respectively; the outputs representing the conditions $\overline{A}a$ to $\overline{A}e$ are applied to leads 175 to 179.

Figure 8:
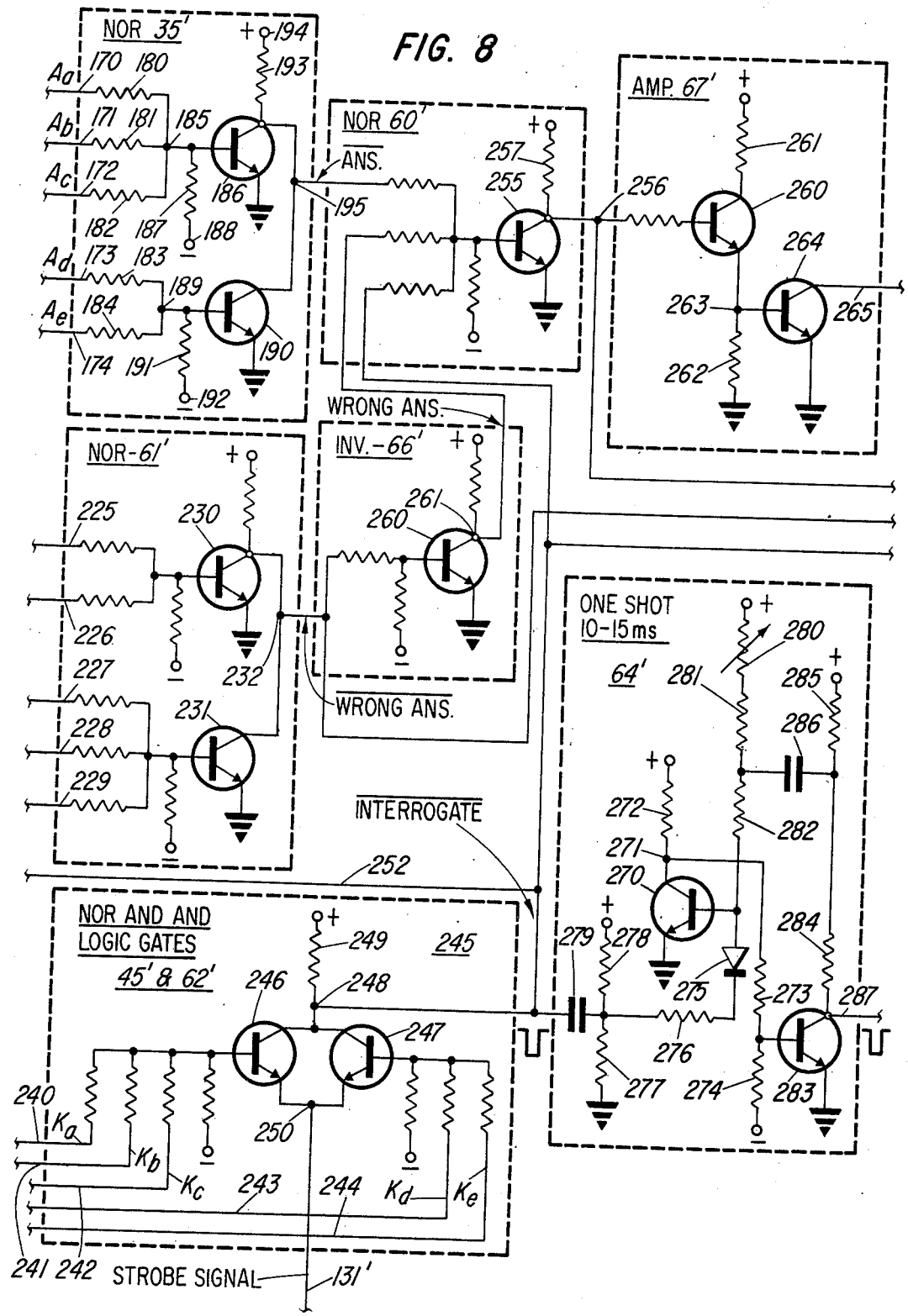

In FIG. 8 leads 170 to 174, corresponding to lines 170 through 174 of FIG. 6, are connected to the input of NOR gate 35 to a conventional matrix arrangement of resistors 180 through 184, respectively. Resistors 180 through 182 are connected at a common junction 185 to the base of a transistor 186, a base biasing circuit including resistor 187 being connected between the junction 185 and a negative power supply terminal 188. Resistors 183 and 184 are connected at a common junction 189 to the base of a further transistor 190, a base biasing circuit including resistor 191 being connected between the common junction 189 and a negative power supply terminal 192. Each of the grounded emitter transistors 186 and 190 is connected at its collector to a common junction 195 and through a common load resistor 193 to a positive power supply terminal 194. Junction 195 comprises the output terminal of NOR gate 35', at which the logic condition $\overline{\text{ANSWER}}$ is presented. In the absence of an answer indicia, Aa to Ae are false, and at ground potential. The base terminals of transistors 186 and 190 are thus clamped at ground and the transistors 186 and 190 are therefore normally non-conducting. The output junction 195 is therefore normally at a positive potential, corresponding to a true condition $\overline{\text{ANSWER}}$. When an answer indicia is detected, a positive signal is produced on the corresponding one of the lines 170 to 174, representing the truth of the corresponding one of the conditions Aa to Ae. A positive signal on any of the input leads 170 to 174 regardless of a concurrent ground level signal on one or more of the remaining leads 170 to 174 will cause the associated one of the transistors 186 and 190 to conduct, and produce a ground level pulse at the output junction 195, correctly corresponding to the $\overline{\text{ANSWER}}$ condition being false.

Figure 7:
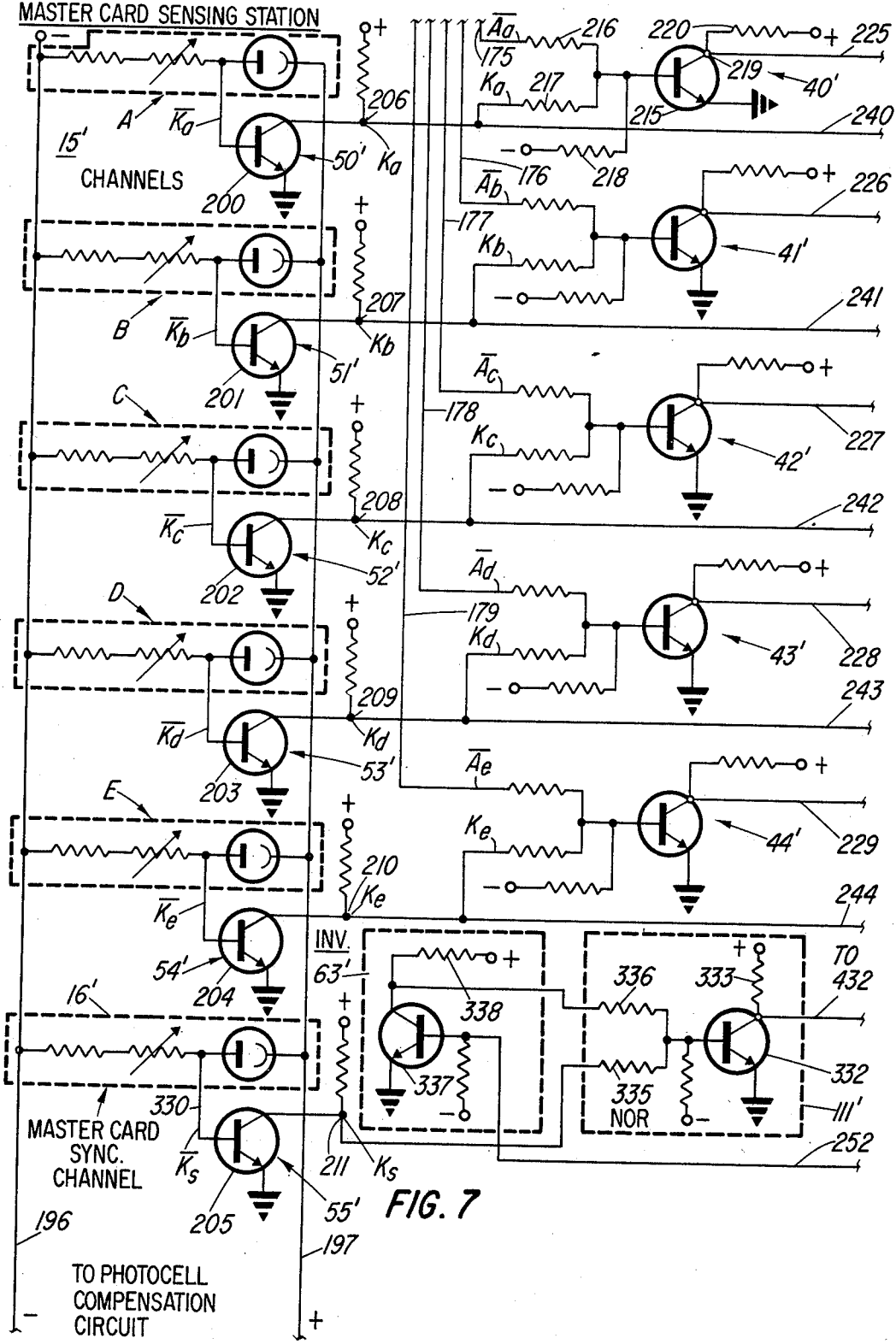
Figure 9:
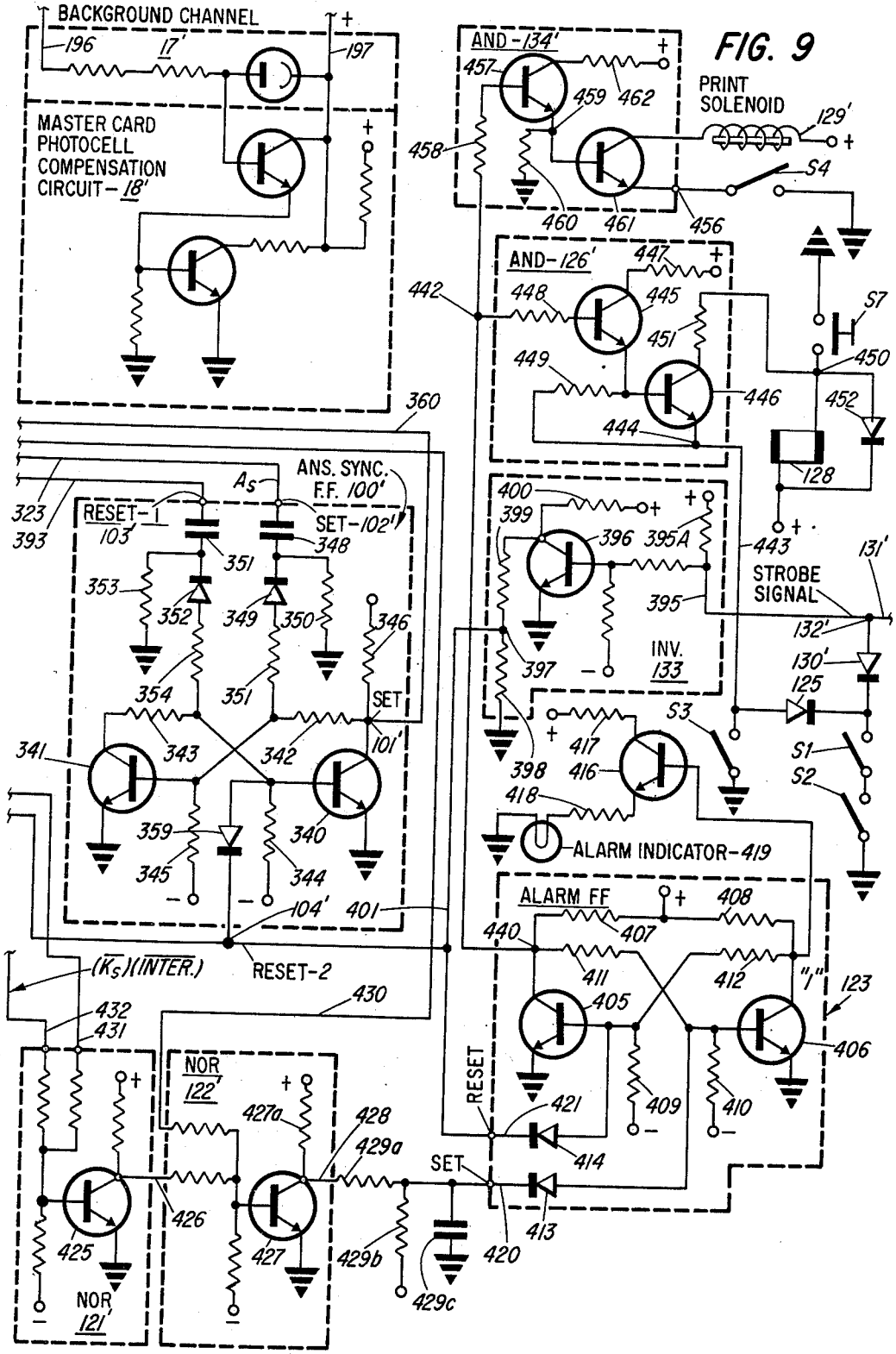

In FIG. 7 there is shown the master card sensing station 15' including information channels A through E and the master card synchronization channel 16'. The master card photocell compensation circuit 18', including the background channel 17', are shown in FIG. 9. These channels are identical to those of the test card sensing station and therefore are not described in detail. Lead 196 is connected to a negative power supply terminal and to the circuits of each of the channels A through E and sync channel 16' in FIG. 7, and to the photocell compensation channel 17' in FIG. 9 of the station 15'. Lead 197 is connected to the output of compensation circuit 18', the latter regulating the value of the positive potential applied to lead 197, and to the photocell compensation channel 17' in FIG. 9 and the channels A to E and the sync channel 16' in FIG. 7 of the station 15'.

In FIG. 7 there are also shown the inverters 50' to 55' to which the outputs of the channels A through E and the sync channel 16', representing the conditions $\overline{K}a$ through $\overline{K}s$, respectively, are applied. The inverters 50' to 55' comprise grounded emitter transistors 200 through 205, the collector terminals of which are connected at output junctions 206 through 211, respectively, through associated load resistors to positive power supply terminals. The outputs of channels A through E and sync channel 16' are applied to the base terminals of transistors 200 to 205, respectively. As described with regard to the test card sensing station 25', the outputs of the channels A through E and 16' of the master card sensing station 15' are normally positive during scanning of the background of a master card, and comprise pulses of negative going potential upon detection of answer indicia or a timing mark on the master card, the latter corresponding to conditions $\overline{K}a$ through $\overline{K}s$ being false. The transistors 200 to 205 are therefore normally conducting, maintaining junctions 206 to 211 at ground potential and are rendered non-conductive upon detection of an answer indicia or a timing mark, producing a positive pulse at the corresponding junctions 206 to 211. The positive signal level and the ground level pulses correctly correspond to the truth or falseness of the conditions Ka through Ks and thus also to the inverted representation of the conditions $\overline{K}a$ through $\overline{K}s$.

The NOR gates 40 through 44 of FIG. 2a are shown as the circuits 40' through 44' respectively of FIG. 7, and, as noted previously, perform the comparison of detected answer indicia from test cards with detected correct answer indicia from a master card.

The signals representing the conditions $\overline{A}a$ through $\overline{A}e$ produced at the output of the shift registers 30' through 34' are applied through leads 175 to 179 to the NOR gates 40' through 44', respectively. The signals representing the conditions Ka through Ke produced at the output junctions 206 to 210 of the inverters 50' to 4' are applied through leads 240 to 244 to NOR gates 40' through 44', respectively.

Each of the NOR gates 40' through 44' is identical in construction, and therefore reference will be had only to NOR gate 40' for a detailed discussion. Transistor 215 is connected in a grounded emitter configuration. A conventional matrix input circuit of resistors 216 and 217 is connected to the base terminal of transistor 215, the base terminal also being connected through resistor 218 to a negative power supply terminal. The collector terminal of transistor 216 is connected at its collector to an output junction 219 and through load resistor 220 to a positive power supply terminal.

Leads 175 and 240 are connected to resistors 216 and 217, respectively, to apply the signals representative of the conditions $\overline{A}a$ and Ka, respectively, to the base of transistor 215. In the absence of scanning indicia on either the test or master cards, $\overline{A}a$ is true and therefore a positive signal exists on line 175, and Ka is false, and therefore a ground level signal exists on line 240. Transistor 215 is maintained normally conductive due to the positive signal on line 175, and therefore the output junction 219 of NOR gate 40' is normally at ground potential, comprising a false output condition. The identical analysis demonstrates that the output junctions of NOR gates 41' to 44' are also normally at ground potential. Output leads 225 to 229 are connected to the output junction of NOR gates 40' to 44', respectively.

As described above, the sensing of an indicia in column A on a test card produces a negative going or ground level pulse at the output terminal 159 of channel A, corresponding to a false $\overline{A}a$ condition. Conversely, if no indicia is sensed from column A, i.e., for a given problem, the potential at output terminal 159 of the sensing device 150 of column A, remains positive, corresponding to a true condition for $\overline{A}a^*$. Similarly, when a correct answer indicia is sensed in column A of the master card, a negative going signal is produced at the output of channel A of the master card sensing station 15', corresponding to the false condition $\overline{K}a$. When no indicia is sensed in column A of the master card for the given problem, the output of the photocell circuit for column A remains positive, corresponding to a true condition $\overline{K}a$.

To explain the logic comparison circuit operation, it will first be assumed that a correct response has been given and that this response is represented by an indicia in column A of both the master and test cards. It further is assumed that the detected answer response information has advanced to the third, output stage of shift register 30′. A ground level potential pulse is produced on line 175, tending to cause transistor 216 of NOR gate 40′ to cease conduction. However, since $\overline{Ka}$ is false, transistor 200 of inverter 50′ is rendered non-conductive, producing a positive pulse at the output junction 206, corresponding to a true condition $Ka$. The positive pulse is applied through resistor 217 to the base of transistor 215, maintaining the latter conductive. A ground level signal is thus maintained on output line 225 connected to the output junction 219 of NOR gate 40′, representing that no incorrect answer indicia was detected in column A of the given problem.

It is next assumed that no answer indicia is made in column A on the test card but that a correct answer indicia in column A is provided on the master card. The conditions $Ka$ and $\overline{Aa}$ are therefore both true, and positive pulses are applied to both leads 175 and 240. Transistor 215 remains conductive, maintaining the output line 225 at ground potential. Thus, this output again represents that no incorrect answer indicia was detected in column A of the test card for the given problem.

It is finally assumed that, for the same problem, an answer indicia exists on the test card in column B, but that none exists on the master card, whereby an incorrect answer response has been provided. Both $\overline{Ab}$ and $Kb$ are false, and thus ground level pulses are applied through leads 176 and 241 to NOR gate 41′, clamping the base of the transistor of NOR gate 41′ to ground potential. The transistor thereupon terminates condition, and a positive pulse is produced on the output line 226, representing that an incorrect answer response indicia has been detected on the test card.

As noted previously, the response to a given problem may be totally ignored by not applying indicia to any of the answer indication areas for that problem on the master card. Regardless of the ensuing logic operations responsive to the conditions $\overline{Aa}$ through $\overline{Ae}$ and $Ka$ through $Ke$, no marking or grading of the problem ensues since no interrogate pulse is produced. The means for producing the interrogate pulse, and the function thereof, is explained in detail hereafter. It is noted, however, that in addition to permitting ignoring answer responses to a given problem, the interrogate pulse also assists in assuring that the logic comparison results correctly correspond to the input signals, prior to the response of the count accumulation and marking systems of the apparatus to the output of the logic comparison circuits.

With reference to FIG. 8 NOR gate 61′ includes transistors 230 and 231, the emitter terminals of which are grounded and the collector terminals of which are connected at a common junction 232 and through a common load resistor to a positive power supply terminal. The circuit of NOR gate 61′ is identical to that of NOR gate 35′ and is not discussed in detail. The output lines 225 through 229 of NOR gates 40′ to 44′ of FIG. 7 are connected through a resistor matrix input to the base terminals of associated ones of the transistors 230 and 231. In the absence of detection of incorrect answer indicia on the test card, there exist ground level signals on the leads 225 to 229, whereby transistors 230 and 231 are normally non-conducting and junction 232 is at a high positive potential. This correctly corresponds to the true condition $\overline{\text{WRONG ANSWER}}$. The occurrence of a positive signal of any of the leads 225 to 229, corresponding to the detection and logic determination of one or more incorrect answer response indicia, drives the associated one of the transistors 230 and 231 into saturated conduction and produces a ground level output pulse at the common junction 232. This correctly corresponds to the false condition $\overline{\text{WRONG ANSWER}}$.

The outputs at output junctions 206 to 210 of inverters 50′ to 55′ of FIG. 7 are also applied through output lines 240 to 244 to a NOR gate 45′ shown in FIG. 8. In FIGS. 2a and 2b, NOR gate 45 and AND gate 62 comprise two separate logic systems; in FIG. 8, these separate logic systems are provided by a single circuit 245 identified additionally as NOR and AND logic gates 45′ and 62′, hereafter referred to as circuit 245. Circuit 245 includes transistors 246 and 247 having their collector terminals connected in common to an output junction 248 and through a load resistor 249 to a positive power supply terminal. The emitter terminals of transistors 246 and 247 are connected to a common junction 250 to which an input lead 131′ is also connected. The strobe signal, discussed in relation to FIG. 2c of the logic diagram, is applied through line 131′ to the junction 250.

The generation of the strobe signal has previously been described in relation to FIG. 2c. The corresponding elements are shown in the circuit schematic of FIG. 9, on which is identified the line 131′ on which the strobe signal is generated. The strobe signal is a ground level signal produced by connecting line 131′ to ground through diode 130′ and switches S1 and S2, when the latter are closed upon the information containing portions of the master and test cards entering the sensing regions of their respective sensing stations. When switches S1 and S2 are open, a relatively high potential signal is applied to lead 131′ by lead 395 connected through resistor 395a to a positive power supply terminal. The application of a positive potential level signal through line 131′ to the junction 250 at the emitters of transistors 246 and 247 prevents conduction of the latter, whereby a positive potential signal level is normally maintained at the output junction 248 of the circuit 245. When switches S1 and S2 are closed, however, the ground level strobe signal grounds the junction 250 and places the transistors 246 and 247 in condition for conduction. The grounding of the emitter junctions thus comprises the AND function of the AND gate 62′, as performed by the circuit 245.

The correct answer information sensed from the master card and comprising the signals representative of the conditions $Ka$ through $Kc$ is applied through lines 240, 241, and 242 respectively through a conventional resistor matrix to the base terminal of transistor 246, and that comprising the signals $Kd$ and $Ke$ is applied through the lines 243 and 244 through a conventional resistor matrix to the base terminal of transistor 247. For each problem for which a correct answer indicia is provided in one or more of the columns A through E of a master card, the corresponding one of the conditions $Ka$ through $Ke$ is true and thus a positive potential pulse is applied through the corresponding one of the leads 240 to 244. If, at the same time, the strobe signal is maintaining the common emitter junction 250 at ground potential, the corresponding one of the transistors 246 and 247 is rendered conductive. The output junction 248 is clamped to ground through the collector-emitter circuit of the thus conducting one of the transistors 246 and 247. The ground level output pulse thus produced correctly corresponds to a false $\overline{\text{INTERROGATE}}$ condition. In accordance with the logic notation, since the ground level pulse is false, the $\overline{\text{INTERROGATE}}$ condition actually comprises a demand to interrogate. Thus, when the strobe signal and one or more of the correct answer indicia signals $Ka$ through $Ke$ exist concurrently, the circuit 245 is operative to generate the interrogate signal, in response to which the count accumulation and marking devices of the apparatus of the invention are enabled to respond to the outputs of the logic comparison circuits. Correspondingly, it is apparent that in the absence of any correct answer indicia for a given problem, all of the signal conditions $Ka$ through $Ke$ are false and no interrogate condition will exist. This is consistent with the capability described above to ignore selected problems or entire sections of the plurality of problems on the test cards.

To summarize the circuit description thus far, NOR gate 35′ produces a ground level pulse at its output junction 195 if one or more answer indicia for a given problem has been detected from the test card. In logic notation, the ground level signal is a false $\overline{\text{ANSWER}}$ condition. The NOR gate 61′ provides a positive pulse at its output junction 232 if no wrong answer has been detected on the test card for a given problem. In logic notation, the positive pulse comprises a false $\overline{\text{WRONG ANSWER}}$ condition. Further, the presence of an answer indicia on the master card causes circuit 245 to produce a ground level output pulse at its output junction 248 for executing the interrogate function. In logic notation, this is a false $\overline{\text{INTERROGATE}}$ condition, and thus a demand to interrogate.

Conversely, if no test card answer indicia is provided, NOR gate 35′ maintains a positive signal at its output junction 195 representing the truth of the condition $\overline{\text{ANSWER}}$. Further, if the logic NOR gates 40′ to 44′ determine that a detected answer response indicia from a test card represents a wrong answer for a given problem, NOR gate 61′ produces a ground level pulse at its output junction 232 representing that the condition $\overline{\text{WRONG ANSWER}}$ is false. If no answer is detected on the master card for a given problem, or if no strobe signal exists, circuit 245 will maintain a positive level signal at its output junction 248 representing the truth of the $\overline{\text{INTERROGATE}}$ condition.

There will now be considered the systems which respond to the outputs of the foregoing logic comparison and circuits.

NOR gate 60′ of FIG. 8 includes a grounded emitter transistor 255, the collector terminal of which is connected to an output lead 256 and through a load resistor 257 to a positive power supply terminal. The output from NOR gate 35′ and circuit 245, representing the conditions $\overline{\text{ANSWER}}$ and $\overline{\text{INTERROGATE}}$, respectively, and an output from an inverter 66′ representing the condition WRONG ANSWER are applied through a resistor matrix to the base of transistor 255. The output of NOR gate 61′ at junction 232, representing the $\overline{\text{WRONG ANSWER}}$ condition, is applied to inverter 66′. Inverter 66′ includes a transistor 260; a signal applied to the base terminal of the transistor is inverted at the collector terminal thereof, connected to output junction 261. Thus the $\overline{\text{WRONG ANSWER}}$ output from NOR gate 61′, when false and comprising a ground level pulse, is inverted to produce a positive pulse representing the truth of the condition WRONG ANSWER at the output junction 261 of inverter 66′. Conversely, a true $\overline{\text{WRONG ANSWER}}$ condition represented by a positive pulse is inverted by inverter 66′ to produce a ground level pulse at its output 261 representing that a false WRONG ANSWER condition and thus that a correct answer has been detected.

Transistor 255 of NOR gate 60′ is normally conducting in a saturated condition whereby the output lead 256 of NOR gate 60′ is clamped to ground level potential through the collector-emitter circuit of transistor 255. Junction 256 is connected to the base of transistor 260 of amplifier 67′. Transistor 260 is connected in an emitter follower configuration through a resistor 261 at its collector terminal to a positive power supply and through a load resistor 262 to its emitter terminal to ground. The junction 263 at the emitter terminal of transistor 260 is connected to the base terminal of transistor 264. Transistor 264 is connected in a grounded emitter configuration, and its collector terminal is connected to an output line through the electrical actuating circuit of counter 92′ (FIG. 10) to a positive power supply terminal. Transistor 264 operates substantially as a switch to clamp the output lead 265 to ground through its collector-emitter circuit, when rendered conductive.

Figure 10:
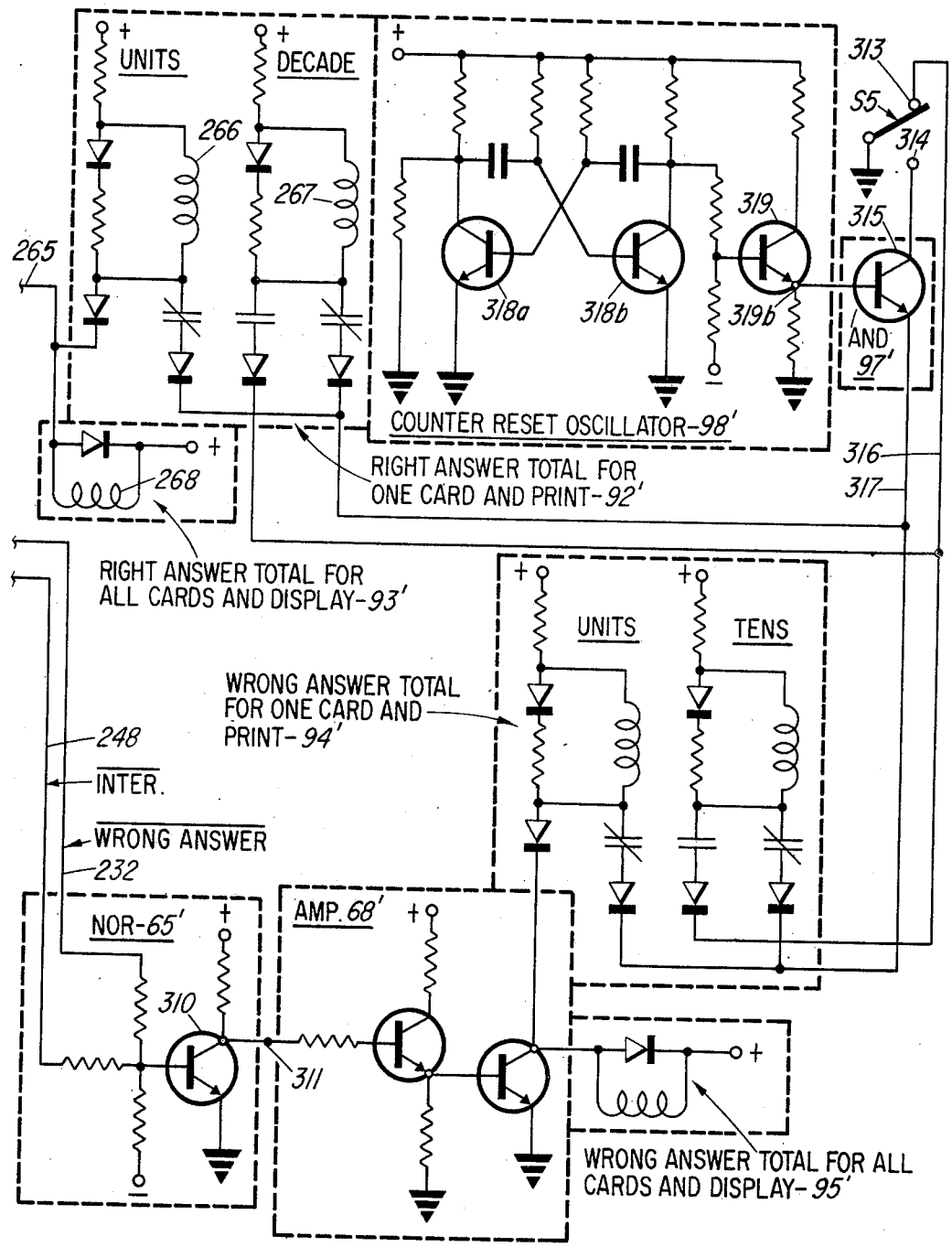

In FIG. 10 there is shown representative circuit schematics of the counter-printer 92′ and the total counter 93′ corresponding to the units 92 and 93 of FIG. 2b. These circuits may be of a conventional type and do not require detailed description. It will be apparent that the switching action of transistor 264 of amplifier 67′, in clamping the lead 265 to ground, is operative to provide an energizing pulse of current for actuating the counters 92′ and 93′. More specifically, in FIG. 10, lead 265′, when grounded, completes a conducting path to ground for the "unit" solenoid coil 266 and the "decade" solenoid coil 267 of counter 92′ and for the solenoid coil 268 of counter 93′. Each of these solenoid coils 266, 267, and 268 is provided with a uni-directionally conducting shunt circuit, as indicated. In operation, each ground level pulse on line 265′ enables the counters 92′ and 93′ to accumulate one count representing a correct answer.

Referring again to FIG. 8, it is apparent that the grounding of lead 265 requires developing a positive potential at junction 263 at the base of transistor 264 and ths a positive signal at the junction 256 connected to the base of the emitter-follower transistor 260. NOR gate 60′ develops a positive output pulse only when the normally conducting transistor 255 is rendered non-conductive. The base of transistor 255 must therefore be clamped to a ground level potential in response to a correct answer logic determination. As noted, detection of an answer produces a ground level signal at junction 195 of NOR gate 35′. This condition is necessary but not sufficient for terminating conduction of transistor 255. A further requirement is that the output of inverter 66′ also be at ground level, which, for the determination that a right answer has been given is, in fact, the case. The final condition is that the third input to NOR gate 60′, in accordance with $\overline{\text{INTERROGATE}}$ condition at the output of circuit 245 also be at ground potential. It has been shown that the existence of an interrogation demand and thus the condition that $\overline{\text{INTERROGATE}}$ is false, also produces a ground level pulse. Thus, the three conditions which must concur for rendering transistor 255 non-conductive are satisfied and the positive pulse output from NOR gate 601 at junction 256 will be operative through amplifier 67′ to effect the accumulation of a correct count in the counters 92′ and 93′ of FIG. 10.

In the case of total omission of answer indicia, the output 195 of NOR gate 35′ will be positive, representing truth of the condition $\overline{\text{ANSWER}}$, and the output 256 of NOR gate 60′ will remain at ground potential. Similarly, if a detected answer indicia represents an incorrect response, the output of NOR gate 61′ is negative. The output of inverter 66′ is therefore positive, representing a true WRONG ANSWER condition, and rendering transistor 255 conductive, thereby clamping the output junction 256 at ground potential. Furthermore, in the absence of an interrogate pulse, and thus where INTERROGATE is true, transistor 255 will remain conductive and the output junction 256 will remain at ground potential. Under any of these conditions, therefore, no right answer count is accumulated.

There will now be considered the circuit operations during a logic determination of an incorrect answer response. In FIG. 8, the output junction 248 of circuit 245 is connected to the input terminal of a one shot multivibrator 64′. The multivibrator 64′ includes a grounded emitter transistor 270. The collector terminal of transistor 270 is connected to junction 271 of a potential divider resistor network 272, 273, and 274 which is connected between positive and negative power supply terminals. The base of transistor 270 is connected through diode 275 and series connected resistors 276 and 277 to ground. The junction of resistors 276 and 277 is connected through resistor 278 to a positive power supply terminal and to one terminal of coupling capacitor 279; the other terminal of the capacitor 279 comprises the input terminal of the multivibrator 64′. An adjustable potential divider network of resistors 280, 281, and 282 is connected in series from positive power supply terminal to the base terminal of transistor 270 and the anode of diode 275. Grounded emitter transistor 283 is connected at its base terminal to the junction of resistors 273 and 274. The collector terminal of transistor 283 is connected through resistors 284 and 285 to a power positive supply terminal, the junction of resistors 284 and 285 being connected through coupling capacitor 286 to the junction of resistors 281 and 282. The output junction 287 of the multivibrator 64' is connected to the collector of transistor 283.

In operation, transistor 270 is normally conducting whereby junction 271 at its collector terminal is normally at ground potential. Resistor 273 connects the junction 271 to the base terminal of transistor 283, and thus latter is maintained normally non-conducting. A ground level pulse from circuit 245 is coupled through capacitor 279 and resistor 276 to the cathode of diode 275, biasing the latter for conduction, and thus clamping the base of transistor 270 to ground potential. Transistor 270 is thereby rendered non-conductive and a positive potential is developed at junction 271. Transistor 283 thereby is rendered conductive, producing a ground level pulse on output lead 287, connected to the collector terminal of transistor 283. During this time, capacitor 286 is charged from the positive power supply terminal through a series circuit including variable resistor 280, resistor 281, and the collector-emitter circuit of transistor 283, to the negative power supply terminal. The rate of charging of the capacitor 286 may be varied by adjustment of variable resistor 280. At a predetermined time, the potential developed across capacitor 286, and applied through resistor 282 to the base of transistor 270, is sufficient to cause the latter to renew conduction. Terminal 271 thereupon is again clamped at ground potential, terminating conduction of transistor 283. The potential on output lead 287 thereupon again becomes positive, terminating the output pulse of the multivibrator 64'.

As will be described, the marking of the test cards to indicate the correct responses to incorrectly answered problems is performed by solenoid actuated marking devices. The time duration of an electrical pulse required for properly energizing the solenoids is preferably of a predetermined, constant amount, but which may vary with the type of solenoid employed. The multivibrator provides such a constant pulse, the duration of which may be selectively adjusted to assure trouble-free operation of the marking devices.

Figure 11:
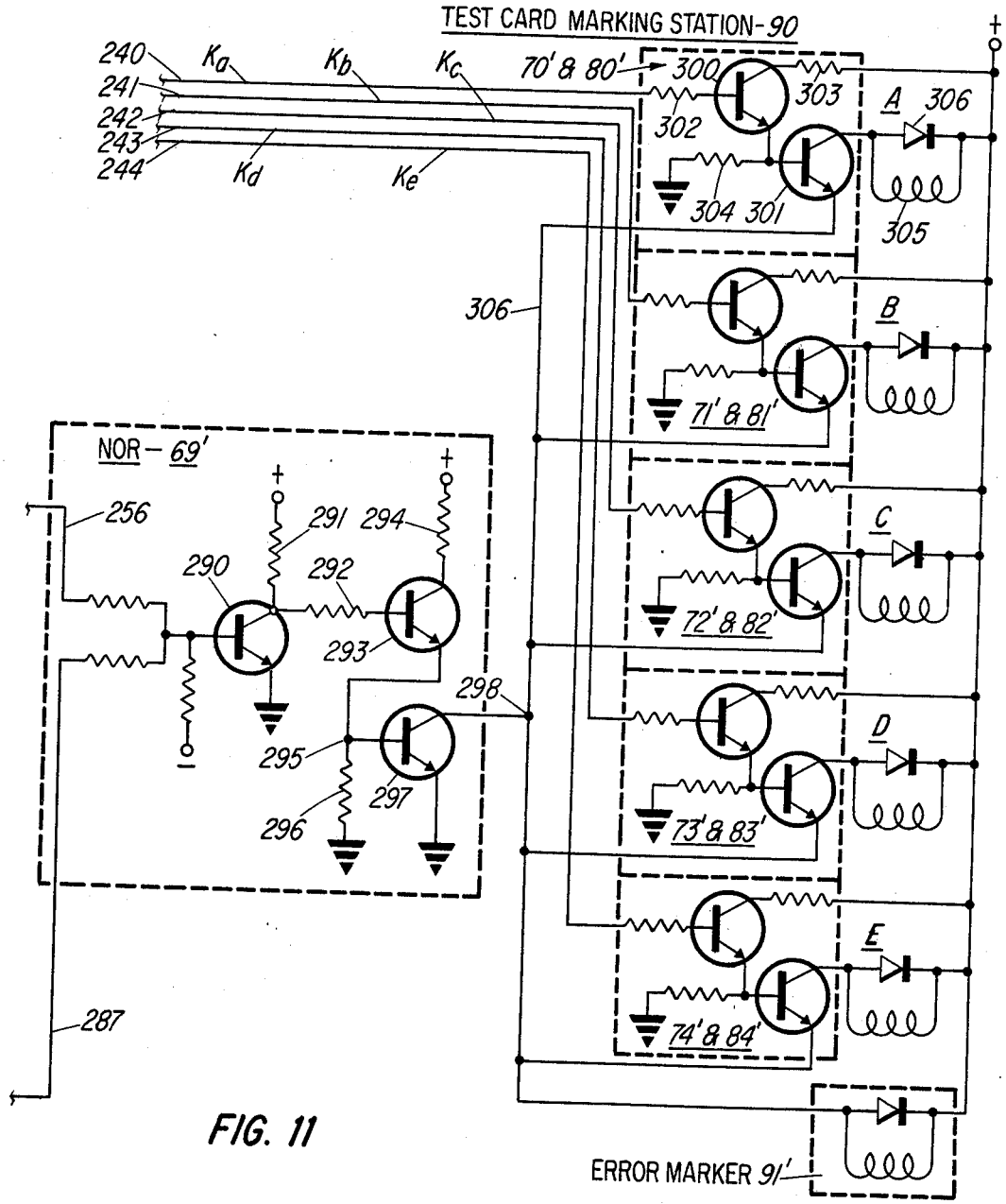

The output lead 287 of multivibrator 64' of FIG. 8 is connected to a first input of NOR gate 69' in FIG. 11. The output lead 256 of NOR gate 60' of FIG. 8 is connected as a second input to NOR gate 69' in FIG. 11. NOR gate 69' includes a first transistor 290, to the base terminal of which the leads 256' and 287 are connected through a conventional resistor matrix. The emitter terminal of transistor 290 is connected to ground and the collector terminal is connected through a resistor 291 to a positive power supply terminal and through a resistor 292 to the base of a further transistor 293. Transistor 293 is operated as an emitter follower; its collector terminal is connected through a resistor 294 to a positive power supply and its emitter terminal is connected to a junction 295 and through a load resistor 296 to ground. An output transistor 297 is operated as a switch; the base terminal thereof is connected to the junction 295 and its collector terminal is connected to output junction 298. The junction 298 is connected through circuits of the marking station 90' to a positive power supply terminal, in a manner to be described.

NOR gate 69 operates to inhibit the operation of the test card marking solenoids of marking station 90' in the event that a correct answer has been provided on the test card. The circuits of each of the channels A through E of the marking station 90' are identical in construction, and therefore a detailed discussion will be provided only for the circuit elements of channel A. The logic function of AND gate 70 and the operation of amplifier 80 of FIG. 2c are provided through the combined effects of transistors 300 and 301.

With reference to channel A, the lead 240 is connected through a resistor 302 to the base of a first transistor 300, the collector terminal of which is connected through resistor 303 to a positive power supply terminal and the emitter terminal of which is connected through a resistor 304 to ground. The collector terminal of a second transistor 301 is connected through solenoid winding 305 to the positive power supply terminal, a conventional diode shunt 306 being provided. The emitter terminal of the second transistor 301 is connected through a common lead 306 to the output junction 298 of NOR gate 69'. Energization of solenoid winding 305 for marking the answer indication area of column A on a test card, when that column represents the correct answer for a problem answered incorrectly, requires that the second transistor 301 be rendered conductive. This conduction requires, as a first condition, that the normally non-conductive first transistor 300 to be rendered conductive.

The correct answer information is provided as positive potential pulses on the leads 240 to 244, representing the truth of the conditions Ka through Ke; the leads 240 to 244 corresponding to channels which do not represent correct answers for a given problem, conversely, are at ground potential, corresponding to false conditions Ka through Ke. In the absence of sensing answer indicia from a master card, and thus when Ka through Ke are all false, all of the leads 240 to 244 are at ground potential. The first transistor in the circuit of each channel A through E is thereby maintained non-conductive. However, where a correct answer indicia is sensed, for example, in column A, the condition Ka is true and thus a positive potential pulse is established on line 240. This positive pulse enables conduction of normally non-conducting, first transistor 300 which, through its emitter follower action, produces a positive pulse at the base terminal of transistor 301, satisfying a first condition for conduction of transistor 301.

In accordance with the intended operation of the machine, however, the marking solenoid of channel A should not be actuated unless the problem has been answered incorrectly, or unless no answer indicia has been provided at all on the test card. NOR gate 69' satisfies these conditions. Transistor 297 is normally non-conductive and thus junction 298 is normally at a positive potential. This positive potential is applied through the common lead 306 to the emitter terminals of the second transistors of the circuits of all channels A through E of the marking station 90'. For transistor 297 to conduct, it is necessary that transistor 293 be rendered conductive and thus that transistor 290 be rendered non-conductive.

Referring again to NOR gate 60' of FIG. 8, the output lead 256 is normally clamped at ground potential, since transistor 255 is normally conducting. A positive pulse is produced on lead 256 only when a correct answer has been provided on a test card. Thus, in FIG. 11, the corresponding line 256 is normally at ground potential satisfying a first condition for rendering transistor 290 non-conductive. Conversely, the output lead 287 of multivibrator 64' is normally at a positive potential level and therefore normally maintains transistor 290 of NOR gate 69' conductive. However, multivibrator 64' produces a ground level pulse on its output lead 287 during an interrogate operation, and at this time, therefore satisfies the second condition for terminating conduction of transistor 290. Thus, assuming a wrong answer to be detected, and upon the occurrence of the output pulse from multivibrator 64', output junction 298 of NOR gate 69' is clamped to ground potential. The second condition for conduction of transistor 301 of channel A of the marking station 90' is thus satisfied. The solenoid 305 thus is energized in a series circuit from the positive power supply terminal and through the series-connected collector-emitter circuits of the now conducting transistors 301 and 297.

Conversely, if a correct answer has been provided, despite the other conditions being satisfied for enabling of the transistors associated with the marking channel, a positive pulse is presented on the lead 256 at the input to NOR gate 69', overriding the effect of the ground level pulse on lead 287, and mantaining conduction of transistor 290. Thus, where a correct answer has been provided, the marking function is inhibited.

The inhibit-enable operation of transistor 297 has an identical effect on each of the channels of the marking station 90', including the error marker 91'. The error marker is energized whenever any of the channels A through E is energized. Further, it is apparent that where two or more correct answers are provided, and the problem is incorrectly answered on the test card, each marking solenoid corresponding to a correct answer will be energized for marking the test card—i.e., the marking solenoid of each channel for which its corresponding condition K$a$ through K$e$ is true, will be energized.

Concurrently with marking the correct answer indication area on the test card, a wrong answer count is accumulated by the wrong answer counting and printing mechanisms 94 and 95 of FIG. 2a, these mechanisms being represented in FIG. 10 by the circuit schematics 94' and 95'. NOR gate 65' and amplifier 68' operate to control the mechanisms 94' and 95' in a manner directly analogous to that described for the right answer accumulation means. The circuits 65', 68', 94', and 95' are therefore discussed only briefly.

The leads 232 and 248, on which signals representing the conditions $\overline{\text{WRONG ANSWER}}$ and $\overline{\text{INTERROGATE}}$, respectively, are presented, are connected through a conventional resistor matrix to the base of transistor 310 of NOR gate 65'. These conditions are both normally true, and thus positive signals normally are applied to the base of transistor 310, rendering it normally conductive. As long as either of these conditions is true, transistor 310 remains conductive. Thus, where $\overline{\text{WRONG ANSWER}}$ is true, representing that no wrong answer was detected from the test card the output junction 311 of NOR gate 65', connected to the collector terminal of transistor 310, is clamped to ground potential. Amplifier 68' is thereby disabled and no wrong count is accumulated. It is noted that the condition $\overline{\text{WRONG ANSWER}}$ is satisfied either where a total omission of responses occurs, or where all detected answer responses are correct.

Conversely, where a negative pulse occurs on lead 232, and thus $\overline{\text{WRONG ANSWER}}$ is false, and during the interrogate operation wherein a negative pulse occurs on lead 248 for the false condition $\overline{\text{INTERROGATE}}$, transistor 310 terminates conduction. A positive potential signal is thereby produced at output junction 311 and amplifier 68' is enabled and energizes the marking solenoids of the mechanisms 94' and 95'.

Upon completion of grading and marking of a given test card, including printing on the test card of the accumulated counts of the printing counters 92' and 94', the latter are automatically reset. The reset is accomplished by a pulse train produced by counter reset oscillotor 98', under the control of AND gate 97' in response to actuation of switch S5, shown in FIG. 10.

Switch S5 is actuated to the position shown, in contact with contact terminal 313, in response to movement of a test card into position for, and during, the grading and marking operation. The fixed terminal of switch S5 is grounded. In the position shown, switch S5 completes a circuit to ground from contact 313 and thus from each of the counters 92' and 94' through common lead 316 to permit the count accumulation operation of counters 92' and 94'. Switch S5 is moved to the opposite position to engage contact 313 upon completion of the grading and marking operation, including printing on the test card of the score accumulation of counters 92' and 94'. In this position, switch S5 enables AND gate 97' to apply reset pulses to the counters over common reset line 317.

AND gate 97' includes a transistor 315, the emitter terminal of which is connected to contact 314 of switch S5 and the collector terminal of which is connected to a common reset lead 317. The base terminal of transistor 315 is connected to the output of the counter reset oscillator 98'.

Counter reset oscillator 98' includes a pair of transistors 318a and 318b connected in a conventional circuit configuration to operate as a free running multivibrator producing an output pulse train of a suitable repetition rate to provide reset of the counters 92' and 94'. Transistor 319b is connected in an emitter follower circuit configuration, the pulse train being applied as an input at its base terminal. The output junction 319b of oscillator 98' is connected to the emitter terminal of transistor 319a, the latter being connected through a lead resistor to ground. The output junction 319b is connected to the base of the transistor 315 of AND gate 97.

Transistor 315 of AND gate 97' operates as a switch, when enabled, to clamp the reset line 317 to ground during each reset pulse. A first enabling input to AND gate 97' comprises that of switch S5 engaging contact 314, thereby to connect the emitter terminal of transistor 315 to ground. Transistor 315 is thereupon rendered conductive during each reset pulse applied to its base terminal from the output junction 319b of reset oscillator 98'. A train of ground level potential reset pulses are thereby produced on lead 317, transistor 315 clamping the lead 317 to ground through its collector-emitter circuit in response to each positive reset pulse from oscillator 98'. The oscillator frequency of oscillator 98', in relation to the time duration in which switch S5 engages contact 314 to enable AND gate 97', is such that the number of reset pulses on lead 317 is at least sufficient to reset the counters 92' and 94' from a maximum possible count. Switch S5 is actuated by a successive test card, and moved to engage contact 313 in the position shown and to disable AND gate 97'. Counters 92' and 94' thus are prepared for count accumulation for a successive test card.

The portions of the circuit schematic corresponding to the synchronizing system shown in the logic diagram of FIG. 2c will now be discussed. The synchronizing channel 26' of the test card sensing station 25' is shown in FIG. 6. The common power supply leads 151 and 157 of FIG. 5 are connected to the circuit of channel 26' of station 25' whereby the latter is energized by a potential compensated for variations in the intensity of illumination, as are the channels A to E of FIG. 5. The photocell circuit includes an output junction 322; junction 322 is maintained at a positive potential level during scanning of the card background. A negative going pulse is produced at junction 322 for each timing mark detected from a test card. The negative sync pulse corresponds to the condition $\overline{A}s$ being false.

Inverter 37' comprises a transistor 320 connected at its emitter terminal to ground and at its collector terminal through resistor 321 to a positive power supply terminal. The base terminal of transistor 320 is connected to the output junction 322 of the photocell circuit. The negative going sync pulses cause transistor 320 to cease conduction and thus invert the negative going test card sync pulses to produce test card sync pulses of positive potential on the output lead 323 connected to the collector terminal of transistor 320. The positive potential test card sync pulses correspond to the condition A$s$ on lead 323 being true.

Inverter 37' includes a transistor 325 connected in a grounded emitter configuration with the collector terminal connected through resistor 326 to a positive power supply terminal and the base terminal connected through a resistor to lead 323. The positive sync pulses on lead 323 thereby are applied to the base of the transistor 325 and are inverted thereby to produce ground level test card sync pulses $\overline{As}$ at the collector terminal thereof, and thus on output lead 327. It will be appreciated that, since transistor 325 conducts in saturation, the pulses on lead 327 are at ground potential, whereas those at output junction 322 of the photocell circuit may be negative going pulses which may have a minimum, positive potential value, or a ground or negative potential.

Referring to FIG. 7, the master card sync channel 16' of the master card sensing station 15', in a substantially similar manner, produces negative going master card sync pulses on output lead 330 of the photocell circuit, corresponding to the false condition $\overline{Ks}$. Transistor 205 of inverter 55' inverts the negative sync pulses to produce positive sync pulses on the output lead pulses connected to output junction 211 at its collector terminal, corresponding to the true condition $Ks$.

NOR gate 111' includes a transistor 332 connected in a grounded emitter configuration with the collector terminal connected through a load resistor 333 to a positive power supply terminal. Output lead 334 is connected to the collector terminal of transistor 332 of NOR gate 111'. A conventional resistor matrix providing first and second inputs of the NOR gate 111' is connected to the base of transistor 332.

The inputs to NOR gate 111' comprise signals representative of the conditions $Ks$ and INTERROGATE, and thus positive potential master sync pulses and positive potential interrogate pulses, respectively. The positive sync pulses are produced by inverter 55' at its output junction 211, corresponding to the true condition $Ks$. Output junction 211 is connected to the first resistor 335, and thus the positive sync pulses are applied to the base terminal of transistor 332 of NOR gate 111' and render the latter conductive.

The positive interrogate pulses are produced by inverter 63' at its output junction 338 in response to negative interrogate pulses corresponding to the false condition $\overline{INTERROGATE}$ on lead 252. Lead 252 is connected to the base terminal of transistor 337 of the inverter 63', the emitter terminal being connected to ground and the collector terminal to the output junction 338 and through a load resistor to a positive power supply terminal. Transistor 337 is normally conducting, and the negative interrogate pulses render is non-conducting, whereby positive interrogate pulses are produced at the output junction 338. Output junction 338 is connected to resistor 336, and thus positive interrogate pulses are applied to the base of transistor 332 of NOR gate 111'.

Transistor 332 of NOR gate 111' is normally conducting and thus output lead 334 connected to the collector of transistor 332 is normally at ground potential. To render the transistor 332 non-conducting, both of the first and second inputs must be at ground potential. During the existence of either or both of a positive interrogate pulse and a positive master sync pulse, transistor 332 will remain conducting. Only during the concurrent absence of both of these pulses will the transistor 332 become non-conducting, at which time a positive potential pulse is produced on the output lead 334. This is consistent with the truth of the logic conditions $(\overline{Ks})(\overline{INTERROGATE})$.

In the foregoing, the circuit which produce the signals representing the conditions $\overline{As}$, $As$, and $(\overline{Ks})(\overline{INTERROGATE})$ have been explained. These logic conditions comprise the primary inputs to the synchronizing system shown in logic diagram form in FIG. 2c. There will now be considered the positions of the circuit schematics shown in FIGS. 5 to 11 which correspond to the portion of the logic diagram of FIG. 2c.

In FIG. 9, answer sync flip-flop 100' includes a set input terminal 102', reset-1 and reset-2 input terminals 103' and 104', and an output terminal 101', all corresponding to FIG. 2c. The set signals applied to set terminal 102' comprise the positive sync pulses produced on the output line 323 of inverter 36' in FIG. 6. Flip-flop 100' includes a first transistor 340 which is normally non-conducting and at the collector terminal of which is provided the output terminal 101' of the flip-flop 100', and a second normally conducting transistor 341. In the normal or "0" state, a positive potential output is maintained at the output terminal 101' of the flip-flop 100'.

Transistors 340 and 341 are interconnected between the collector and base terminals thereof in a flip-flop configuration by resistors 342 and 343, respectively, base bias resistors 344 and 345 also being provided. The collectors of transistors 340 and 341 are connected through load resistors 346 and 347 to positive power supply terminals. The set terminal 102' is coupled through capacitor 348 to the cathode of diode 349, the diode cathode being connected to ground through resistor 350. The anode of diode 349 is connected through resistor 351 to the junction of resistor 342 and the base terminal of transistor 341. A similar circuit couples reset-1 input 103' to the junction of resistor 343 and the base of transistor 340, and includes a coupling capacitor 351, a diode 352, and resistors 353 and 354. The reset-2 input terminal 104' is connected to the cathode of diode 359, the anode of diode 359 being connected to the base terminal of transistor 340.

In operation, a set pulse applied to terminal 102' is integrated by the RC circuit 348, 350. Diode 349 blocks the application of the positive peak of the integrated pulse from the base of transistor 341. On the trailing edge of the positive set pulse, however, the integration produces a negative peak which momentarily biases diode 349 for conduction, thereby clamping the base of transistor 341 through resistors 350 and 351 to ground potential and terminating its conduction. As a result, a positive potential is developed at the collector terminal of transistor 341 which is applied through resistor 343 to the base terminal of transistor 340 and renders the latetr conductive. Junction 101' at the collector terminal of transistor 340 is thereby clamped at ground potential, corresponding to the "1" state of flip-flop 100'. The ground potential at junction 101' is applied through resistor 342 to the base of transistor 341 to clamp the base at ground potential and maintain the transistor 341 non-conducting.

The key sync flip-flop 105' is shown in FIG. 6 and is identical in construction and operation to the answer sync flip-flop 100'. The set pulse applied to set terminal 102 corresponds to the condition $(Ks+\text{INTER.})$ being true, and thus comprises a positive pulse. As explained earlier, NOR gate 111' assures that the set pulse is initiated simultaneously with the leading edge of the earlier occurring one of corresponding interrogate and master sync pulses, and terminates with the trailing edge of the later occurring one. The positive set pulse therefore actuates the key sync flip-flop 105' to produce a ground level output pulse at output junction 106', corresponding to the "1" state of the flip-flop 105'.

As discussed earlier in relation to FIG. 2c, NOR gate 112 responds to the concurrence of the set, or "1" state of both flip-flops 100 and 105 to produce, through inverter 114 and delay circuit 115 the reset-1 pulses, and to produce, through inverter 113, the shift pulses. The corresponding NOR gate 112' is shown in FIG. 6. NOR gate 112' is identical in construction to NOR gate 111' of FIG. 7 and therefore is not described in detail. The output from answer sync flip-flop 100' at its output terminal 101' is applied through lead 360 to a first input of NOR gate 112'. The output from output junction 106' of flip-flop 105' is applied through lead 361 to a second input of NOR gate 112'. When each of the flip-flops 100' and 105' are set, these outputs are at ground potential, clamping the base of transistor 365 of NOR gate 112' to ground potential. As a result, transistor 365 ceases conduction and a positive potential pulse is produced at the output junction 366 connected to the collector terminal thereof. The positive potential pulse is applied to the output lead 367 connected to the output junction 366. Conversely, when either or both of the flip-flops 100' and 105' is not set, a positive signal is applied to one or the other or both of the inputs to NOR gate 112'. Transistor 365 therefore remains conducting and clamps the output lead 367 at ground potential.

Output lead 367 of NOR gate 112' is connected to the base terminal of transistor 370 of inverter 113'. The emitter terminal of transistor 370 is connected to ground, and the collector terminal is connected at output junction 372 through a load resistor to a positive power supply terminal. A positive pulse on line 367 renders transistor 370 conducting whereby its collector terminal is clamped at ground potential. Output lead 29' is connected to the output junction 372; the shift pulses produced thereon therefore comprise ground level pulses corresponding to the positive pulses applied to inverter 114 from NOR gate 112. The shift pulses are applied to the shift registers 30' through 34' of FIG. 5 to advance information registered therein through the successive stages. Thus, immediately following the trailing edge of the latter occurring set pulse which provides the concurrent setting of the key and answer sync flip-flops 100' and 105', information registered in the stages of the shift registers 30' to 34' is advanced.

The positive output pulses from NOR gate 112' also generate the reset-1 pulses applied to each of the flip-flops 100' and 105'. Ouput line 367 of NOR gate 112' of FIG. 6 also is connected to the input of inverter 114' which, in conventional fashion, responds to the positive pulses to produce negative or ground level pulses at its output junction 375. Junction 375 is connected through output lead 376 to the input terminal 377 of a delay network 115'.

Delay network 115' includes a first normally conducting transistor 380 and a second normally non-conducting transistor 381, each connected in a grounded emitter configuration with the collector terminals connected through resistors 382 and 383, respectively, to positive power supply terminals. The collector terminal of transistor 380 is connected at junction 384 through resistor 385 to the base terminal of transistor 381, the base terminal being connected through resistor 386 to a negative power supply terminal. The collector terminal of transistor 381 is coupled through capacitor 387 to junction 388, the latter being connected through resistor 389 to the base terminal of transistor 380 and through a resistor 390 to a positive power supply terminal. The base terminal of transistor 380 is further connected through resistor 391 and diode 392 to the input terminal 377.

In operation, transistor 380 is normally conducting and the collector terminal thereof is at ground potential, operating through resistor 385 to clamp the base of transistor 381 to ground potential and to render the latter non-conducting. The normally positive potential on lead 376 from inverter 114 back biases diode 392 and has no effect on the delay circuit 115'. However, upon the occurrence of a ground potential pulse on lead 376, diode 392 conducts and operates through resistor 391 to clamp the base of transistor 380 to ground, terminating its conduction. A positive potential signal is produced at the collector terminal of transistor 380, and thus at junction 384, which is applied through resistor 385 to the base of transistor 381, causing transistor 381 to conduct. The collector terminal of transistor 381 is thus clamped to ground potential, completing a charging circuit for resistor 390 and capacitor 387. By appropriate selection of the electrical values of capacitor 387 and resistor 390, capacitor 387 will charge in a desired time period to produce a sufficiently large positive potential at junction 388, and thus at the base of transistor 380 to render the latter conductive. Transistor 381 is thereby rendered non-conducting. For the purposes of the present circuit, the time period during which transistor 381 conducts is selected to be 5 ms.

The positive pulse produced at junction 384 and thus at output junction 103' during the 5 ms. interval in which transistor 380 is not conducting comprises the reset-1 pulse, corresponding to a true RESET-1 condition. The positive reset-1 pulses are applied through output lead 393 to the reset-1 input terminals 103' and 108' of flip-flops 100' (FIG. 9) and 105' (FIG. 6).

Referring in detail to the answer sync flip-flop 100', the positive reset pulse is applied from the reset-1 terminal 103' and through the circuit including an integrating circuit of coupling capacitor 351 and resistor 353, diode 352 and resistor 354 to the base terminal of the now conducting transistor 340. From the foregoing description of the setting operation for flip-flop 100', it will be apparent that the trailing edge of the very short duration reset-1 pulse will be effective to terminate conduction of transistor 340 and thus to renew conduction of transistor 341. The flip-flop 100' therefore is switched to its normal "0" state. The reset-1 pulse has the idenitcal effect on the key sync flip-flop 105'. Thus, where the flip-flops 100' and 105' are set simultaneously, or as to the later set flip-flop, where they are not set simultaneously, the "1" state is maintained for a period of only approximately 5 ms., after which both flip-flops 100' and 105' are returned to their "0" states.

It will be recalled from the discussion of FIG. 2c, that the answer and key flip-flops 100 and 105 are held in a non-responsive condition by reset-2 pulses applied to their respective reset-2 input terminals 104 and 109. With reference to FIG. 9, there are shown switches S1, S2, and S3 and diodes 125' and 130' corresponding to the same elements of FIG. 2c. Due to the reverse poling of diode 125', closure of switch S3 has no effect as to producing the reset-2 pulses. Concurrent closure of switches S1 and S2, however, grounds the cathode of diode 132' and thus line 131' connected to junction 132' at the anode of diode 130' is also at ground potential. Junction 132' is connected through lead 395 to the input of inverter 133' and through resistor 395a to a positive power supply terminal. The base of transistor 396 of inverter 133' is connected through a resistor to the junction of lead 395 and resistor 395a. A voltage divider network of resistors 400, 399, and 398 is connected in series between positive and negative power supply terminals. The collector terminal of transistor 396 is connected to the junction of resistors 399 and 400, and the output junction 397 of the inverter 133' is connected to the junction of resistors 397 and 398. Output lead 401 is connected to the output junction 397.

Transistor 396 is normally conducting whereby its collector terminal is normally at ground potential. Output junction 397 and output lead 401 therefore are normally clamped at ground potential. Closure of switches S1 and S2 clamps lead 395 to ground potential through diode 130' and terminates conduction of transistor 396. A positive potential signal thereupon is maintained by the voltage divider networks 398, 399, and 400 at the output junction 397 of inverter 133'.

Output junction 397 is connected through lead 401 to the reset-2 input terminal 104' of flip-flop 100' in FIG. 9 and to the reset-2 input terminal 109' of key synch flip-flop 105' in FIG. 6. Since the flip-flops 100' and 105' are identical in construction and operation, reference will be had only to flip-flop 100'. The positive signal on lead 401 during closure of switches S1 and S2 has no effect since it is blocked by the reversely poled diode 359. However, upon opening of either or both of switches S1 and S2, lead 401 is clamped at ground potential. Diode 359 is thereby poled for conduction and clamps the base of transistor 340 to ground potential. Transistor 340 is thereby clamped in a non-conducting condition, and the flip-flop 100' is held in its "0" state. By appropriate selection of circuit values, the reset-2 input maintains the "0" state of flip-flop 100' regardless of any extraneous set signals applied to the set terminal 102', and thus prevents erroneous setting of the flip-flop 100'.

In FIG. 9, the reset pulse on line 401 from inverter 133' is also applied to a reset input of alarm flip-flop 123'. Flip-flop 123' includes a normally non-conducting transistor 405 and a normally conducting transistor 406 connected at their collector terminals through resistors 407 and 408 respectively, to a positive power supply terminal, at their emitters to ground, and at their base terminals through resistors 409 and 410 to negative power supply terminals. The collector and base terminals of transistors 405 and 406 are interconnected through resistors 411 and 412. Since transistor 416 is normally conducting, its collector terminal is normally clamped at ground potential, thereby rendering transistor 405 normally non-conducting.

The alarm indicator 124' is controlled by alarm flip-flop 123' through lead 415 connected to the collector of transistor 416. The alarm indicator 124' includes a transistor 416; base terminal of transistor 416 is connected to lead 415, the collector terminal is connected through resistor 417 to a positive power supply terminal, and the emitter terminal is connected through a series circuit of resistor 418 and a warning device, such as lamp 419, to ground. The normally grounded condition of lead 415, in the normal "0" state of alarm flip-flop 123', maintains transistor 416 non-conductive, and thus the lamp 419 is not energized. Conversely, when the alarm flip-flop is set, or in its "1" state, transistor 406 ceases conduction, a positive potential is established at its collector terminal. The positive potential is applied through lead 415 to the base of transistor 416. Transistor 416 thereupon conducts and the lamp 419 is energized through the now conducting collector-emitter circuit of the transistor 416.

The setting of alarm flip-flop 123' requires the application of a negative or ground level signal to the input terminal 420 thereof. Diode 413 thereby is poled for conduction and clamps the base of transistor 416 to ground, rendering it non-conducting. A positive signal is then applied through lead 415 to the base of transistor 416, and results in energization of the lamp 419. Transistor 405 remains conducting until the alarm flip-flop is reset. The reset is effected by a ground level pulse on lead 407, produced by inverter 133' when the failure of synchronization has been corrected. The ground level reset pulse on lead 401 renders diode 414 conductive, and thereby clamps the base of transistor 405 to ground, terminating its conduction and causing transistor 406 to renew conduction.

The set pulse which sets the alarm flip-flop 123' to the "1" state for an alarm condition results from the receipt by either of the answer or key sync flip-flops 100' and 105' of two successive set pulses prior to that flip-flop being reset, and thus prior to the other flip-flop receiving the corresponding set pulse, as discussed previously. The logic circuits for determining this event of failure of synchronization comprise the NOR gates 120, 121, and 122 of FIG. 2c. The corresponding NOR gate 120' is shown in FIG. 6 and the NOR gates 121' and 122' are shown in FIG. 9 of the circuit schematic. The circuits are all identical in construction and operation to that of NOR gote 112', discussed previously. Therefore, no detailed description of their construction or operation is provided.

NOR gate 120' includes a transistor 430a, the emitter terminal of which is connected to ground, the collector terminal of which is connected through a load resistor to a positive power supply terminal and to the output lead 430 of the NOR gate 120'. The base terminal of transistor 430a is connected through a resistor to a negative power supply terminal for conventional biasing purposes and through a resistor matrix input circuit providing first and second inputs to the NOR gate 120'. Lead 360 from the output terminal 101' of the answer sync flip-flop 100' is connected to the first input terminal of the NOR gate 120'; a false condition and thus a ground potential pulse, is applied to line 360 when the answer sync flip-flop 100' is in its "1" or set state, and a true condition, and thus a positive potential signal, is normally maintained on lead 360 when the answer sync flip-flop 100' is in its "0" or unset state. Lead 327 is connected to the second input of NOR gate 120'; a false condition and thus a ground level pulse exsists on lead 327 when an answer sync pulse is produced, corresponding to the false condition $\overline{A}s$, and a true condition and thus a positive signal is normally maintained on the lead 327 when no answer sync pulse is produced and thus when condition $\overline{A}s$ is true. The output lead 430 of NOR gate 120' is thus normally clamped to ground potential through the collector-emitter circuit of the normally conducting transistor 430a and is at a positive potential when both of the inputs are false and thus both when the answer key flip-flop 100' has been set and simultaneously there is received a succeeding answer sync pulse.

NOR gate 121' includes a transistor 425 and NOR gate 122' includes a transistor 427, each of the transistors 425 and 427 being connected at the emitter terminals thereof to ground, at the collector terminals through a resistor to a positive power supply terminal and at the base terminals to a conventional base biasing circuit and to a conventional input resistor matrix circuit. A first input to the NOR gate 121' comprises a signal on input lead 431 from the output of the key sync flip-flop 105', representing whether the latter is in the "1" state or in the "0" state. A second input to the NOR gate 121' comprises a signal on lead 432 from the output of NOR gate 111', representing the condition ($\overline{K}s$) ($\overline{INTER.}$).

Output lead 426 is connected to the collector terminal of transistor 425 and through a resistor matrix of NOR gate 122' to the base terminal of transistor 427 thereof, providing a first input to NOR gate 122'. A second input to NOR gate 122' comprises the signals produced on output lead 430 from NOR gate 120'. Output lead 428 of NOR gate 122' is connected to the collector terminal of transistor 427 thereof and through a biasing circuit of resistors 429a and 429b and a coupling circuit including capacitor 429c to the input terminal 420 of the alarm flip-flop 123'.

In operation, a false condition exists on the lead 431 when the key sync flip-flop 105' is set, and a true condition exists thereon when the latter is not set. A true condition exists on line 432 when neither a master card sync puse nor an interrogate pulse is produced and a false condition exists thereon when either of these pulses is produced in response to sensing of the master card. The transistor 425 is normally conducting and thus the output lead 426 is normally clamped to ground potential through the collector-emitter circuit of transistor 425. As long as a true condition and thus a positive potential signal exists on either of the leads 431 and 432, the output lead 426 remains clamped to ground potential. However, when a false condition and thus a ground potential signal exists on each of the lines 431 and 432, the transistor 435 terminates conduction and a positive potential pulse is produced on the lead 426.

Transistor 427 of NOR gate 122' is normally non-conducting and thus a positive potential is normally maintained on the output lead 428. The output leads 426 and 430 are thus both normally at ground potential representing false conditions at both of the inputs to the NOR gate 122'. Transistor 427 therefore is normally not conducting. The series connected circuit of the collector load resistor 427a of transistor 427, and the resistors 429a and 429b between the positive and negative power supply terminals then determines the potential at the junction of resistors 429a and 429b. The potential at this junction is normally positive and is blocked by the reversely poled diode 413 and has no effect on the alarm flip-flop 123'. However, when either of the leads 426 and 430 is at a positive potential, transistor 427 conducts and the lead 428 is clamped to ground through the collector-emitter circuit of transistor 427. Grounding of lead 428 then completes a circuit to ground whereby diode 413 is poled for conduction and the alarm flip-flop 123' is thereupon set.

The condition that either of the leads 426 and 430 be at a positive potential corresponds to the condition that one or the other of the answer and key sync flip-flops 100 and 105, respectively, has been set and that the successive one of the respectively associated set pulses has been applied thereto prior to the application of the corresponding set pulse to the other of the flip-flops, as hereinbefore described. Thus, only when the out of synchronization condition exists does the NOR gate 122' produce a ground level pulse on the output lead 428 to set the alarm flip-flop 123'.

In relation to the logic diagram of FIG. 2c there was discussed the function of AND gate 126 and relay 128 in response to setting of alarm flip-flop 123 for discontinuing the machine operation in the event of a failure of synchronization. The ocrresponding AND gate 126' and relay 128' are shown in FIG. 9. The output terminal 440 of alarm flip-flop 123' is connected through lead 441 to a first input terminal 442 of AND gate 126'. Switch S3 is connected through lead 443 to a second input terminal 444 of AND gate 126'. AND gate 126' includes transistors 445 and 446. Transistor 445 is connected at its collector terminal through resistor 447 to a positive power supply terminal and at its emitter terminal to the base terminal of transistor 446. The base terminal of transistor 445 is connected through resistor 448 to the first input terminal 442. The base of transistor 446 is connected through resistor 449 to the emitter terminal thereof and thus also to the second input terminal 444 and the lead 443. The collector terminal of transistor 446 is connected through resistor 451 to the output terminal 450 of AND gate 126' and through the winding of relay 128' to a positive power supply terminal. Terminal 450 is also connected through switch S4 to ground. A conventional shunt path including a diode 452 is provided for the winding of relay 128'.

As explained in detail in relation to FIG. 2c, closure of switch S4 completes an energizing circuit for the winding of relay 128' to initiate the grading and marking operations of the machine. The subsequent closing of both switches S1 and S2 grounds the cathode of diode 125' and, as a result, provides a ground potential signal to the first input terminal 444 of AND gate 126', thus grounding the emitter terminal of transistor 446 and satisfying a first condition for enabling AND gate 126', thereby to provide continued energization of the winding of relay 128'. For AND gate 126' to maintain the energization of this winding, however, transistor 446 must be conducting, thereby to complete a circuit through its collector-emitter circuit and through either switch S3 or through the series circuit of diode 125' and switches S1 and S2, to ground. Further, a positive potential signal must be maintained at the base of transistor 446 for the latter to conduct; this, in turn, requires that transistor 445 be conducting. Transistor 445 is connected as an emitter follower and thus a positive potential signal must be maintained at the base terminal thereof for satisfying this condition. The output terminal 440 of alarm flip-flop 123' is at a positive potential when the alarm flip-flop 123' is in its "0" state. Thus, AND gate 126' is enabled and maintains the continued energization of the winding of relay 128'.

When an out of synchronization condition occurs and produces an alarm condition, a ground potential signal is developed at the output terminal 440 of alarm flip-flop 123' which terminates conduction of transistor 445 and, in turn, the conduction of transistor 446. The energizing circuit for the winding of relay 128' is thus no longer completed and the drive motor for the transport mechanisms is de-energized and the level of energizing current for the illumination means of the sensing stations is reduced.

The printing of the total correct and wrong counts for each test card is performed in response to closure of switch S4, under control of AND gate 134', also shown in FIG. 9. The output terminal 446 of alarm flip-flop 123' is also connected to a first input terminal 455 of AND gate 134'. Switch S4 is connected to a second input 456 of the AND gate 134'. Transistor 457 is connected through resistor 458 at its base terminal to the input terminal 455, at its collector terminal through resistor 462 to a positive power supply terminal and at its emitter terminal to junction 459 and through resistor 460 to ground. The AND gate 134' further includes a transistor 461 connected at its base terminal to the junction 459, at its collector terminal through printing solenoid 129 to a high potential power supply terminal, and at its emitter terminal to the second input terminal 456.

In operation, AND gate 134' provides energization of the winding of the print solenoid 130' upon closure of switch S5 when the test card has advanced to the appropriate position for print out of the total scores thereon, as discussed above. The energizing path for the winding includes the collector-emitter circuit of transistor 461. Junction 459 must therefore be at a positive potential to cause conduction of transistor 461, and thus transistor 457 must likewise be conducting. Transistor 457 operates as an emitter follower, and thus requires a positive signal as its base terminal, and thus at the input terminal 455 of AND gate 134', to be conducting. As discussed previously, a positive potential signal is maintained on the output line 441 of alarm flip-flop 123' under normal operation conditions. However, when a failure of synchronization occurs, the output line 441 is at ground potential, terminating conduction of transistor 457 and thus preventing print out of total scores.

SHIFT REGISTER SCHEMATIC—FIG. 11

In FIG. 11 there is shown the schematic of one of the plurality of identical three stage shift registers 30 through 34. The set terminal 500, comprising the signal input terminal of the shift register, is connected to the base terminal of input transistor 501. The collector terminal of transistor 501 is connected through resistor 502 to a positive power supply terminal and the emitter terminal is grounded. The output from transistor 501, at its collector terminal, is applied through resistor 503 to the base terminal of transistor 504, the base terminal also being connected through resistor 505 to a negative biasing power supply terminal 506. The collector terminal of transistor 504 is connected through resistor 507 to a positive power supply terminal and through a conventional coupling circuit of capacitor 508 and resistor 509 to the first stage of the shift register.

The first stage of the shift register comprises transistors 510 and 511, the second stage, transistors 530 and 531, and the third stage, transistors 550 and 551. Resistors 512 and 513, 532 and 533, and 552 and 553 connect the base terminals of the respectively associated transistors 510 and 511, 520 and 521, and 530 and 531, to the negative biasing power supply terminal 506. Similarly, resistors 514 and 515, 534 and 535, and 554 and 555 comprise load resistors and connect the collector terminals of their respectively associated transistors to the positive power supply terminal. Resistors 516 and 517, 536 and 537, and 556 and 557 interconnect the collector and base terminals of the opposite ones of the pairs of transistors 510 and 511, 530 and 531, and 550 and 551, respectively, and comprise conventional feedback arrangements for flip-flop type circuits.

The input signal to the first stage, comprising transistors 510 and 511, is applied through diode 518 and resistor 519 to the base terminal of transistor 511. This input signal comprises the inverted representation of the output of the photocell sensing circuit of the corresponding channel. Transistor 501 inverts the signal received from the photocell circuit, representing the condition $\overline{A}a^*$, for example, and applied at its base terminal.

Shift line 520 is connected through capacitor 521 to junction 522 at the cathode of diode 523, the anode thereof being connected through resistor 524 to the base of transistor 510. Junction 522 is connected to ground through resistor 525. As will be explained, the circuit including elements 521 through 525 provides for reset of the first stage upon the occurrence of each shift pulse on line 520. Shift line 520 further is connected through first and second shift circuits comprising capacitors 526 and 527 and resistors 528 and 529, respectively, to the collector terminals of transistors 510 and 511, respectively. The potential level at junctions 540 and 541 of the first and second shift circuits, respectively, depends upon the state of conduction of the corresponding transistors 510 and 511 and thus upon whether the first stage has been set by an input pulse generated in response to detection of an answer indicia in the answer column corresponding to the channel of the shift register.

The negative or ground level shift pulses on shift line 520 operate through the first and second shift circuits to advance the information registered in the first stage to the second stage of the shift register. As will be explained in more detail, a negative shift pulse causes the potential levels at junctions 540 and and 541 to be applied through first and second setting circuits including diodes 542 and 543 and resistors 544 and 545, respectively, to set the second stage in a manner corresponding to the state of the first stage, simultaneously with the reset of the first stage.

Shift line 520 is further connected through first and second shift circuits comprising capacitors 546 and 547 and resistors 548 and 549, respectively, to the collector terminals of transistors 530 and 531, respectively, of the second stage. Similarly to the first stage, the potential level at the junctions 560 and 561 at the interconnection of the resistors and capacitors of the first and second shift circuits of the second stage depends upon the state of the second stage. The occurrence of a shift pulse on shift line 520, simultaneously with the resetting of the first stage and the advancing of information to the second stage, causes the advancing of the information contained in the second stage to the third stage. This is effected through first and second setting circuits including diodes 562 and 563 and resistors 564 and 565, respectively, of the third stage connecting the junction 560 and 561 of the shift circuits of the second stage to the base terminals of transistors 551 and 550, respectively, of the third stage.

In the normal state of operation, prior to receipt of any set pulses, transistors 511, 531, and 551 are normally conducting, their corresponding collector terminals thereby being clamped to ground potential. With reference to FIG. 5, it will be apparent that a positive signal level is maintained at the set terminal 500 of transistor 501 whereby the latter is normally conducting and its collector terminal clamped to ground potential. As a result, transistor 504 is normally non-conducting and its collector terminal is at a positive potential. Diode 518 blocks the positive potential and thus the latter has no effect on the first stage of the shift register. However, upon receipt of a ground potential input pulse from transistor 504 in response to detection of an answer indicia in the column of the test card corresponding to the shift register, transistor 501 terminates conduction, its collector terminal is raised to a positive potential, and transistor 504 initiates conduction. The resultant ground level pulse at the collector terminal of transistor 504 enables conduction of diode 518 and clamps the base of terminal 511 to ground potential, terminating conduction of the latter. The collector terminal of transistor 511 thereupon increases to a positive potential which, through resistor 517 connected to the base of transistor 510, causes the latter to switch from its normally non-conducting state to a conducting state. The terminal of resistor 528 connected to the collector terminal of transistor 510 is thereby clamped to ground potential.

As explained previously, the shift pulses are generated upon the occurrence of the trailing edge of the simultaneously or latter occurring one of the pulses which set the answer and key sync flip-flops 100 and 105. Under the described condition in which the first stage of the shift register has been set, junction 540 of the first shift circuit is at a lower potential than junction 541 of the second shift circuit of the first stage. The negative shift pulse operates through capacitor 526 to enable conduction of diode 542 of the first setting circuit of the second stage, whereby the base terminal of transistor 531 is clamped to ground through the first setting circuit comprising resistor 544 and diode 542. Conversely, since transistor 511 is not conducting, junction 541 is at a higher, positive potential. Despite the coupling of the negative shift pulse through capacitor 527 to junction 541, the potential at junction 541 remains sufficiently positive to prevent conduction of the diode 543 of the second setting circuit. Thus, no effect on the conduction of transistor 530 is produced as a result of the shift pulse.

The termination of conduction of transistor 541, however, produces a positive potential at the collector terminal thereof which is coupled through resistor 537 to the base of transistor 530, causing the latter to initiate conduction. The state of the first stage has therefore been transferred to the second stage and the latter set in accordance therewith. In an identical manner, upon the occurrence of a subsequent shift pulse, the lower potential setting of junction 560 causes transistor 551 of the third stage to terminate conduction and the latter result causes transistor 550 to initiate conduction, thereby setting the third stage. The output terminals of the shift register at the collector terminals of transistors 550 and 551 correspond to the one and zero terminals of the shift register as shown in the logic diagram of FIG. 2a and in the circuit schematic of FIG. 5. The described condition of operation corresponds to $\overline{A}a$ at the set terminal 500 being false and thus represents that an indicia has been detected from column A; the output from the third stage of the shift register, after receipt of two subsequent shift pulses, corresponds to $\overline{A}a$ being false. The conduction of transistor 550 produces a ground level pulse at its collector terminal and this correctly provides a false or ground pulse at the "1" output terminal representing the false output condition $\overline{A}a$. Similarly, the collector terminal of transistor 557 is at a positive potential again correctly representing the truth of the condition $Aa$, i.e., that an answer indicia in column A has been detected, at the "0" output terminal of the shift register, at this same time.

The reset circuit, as described, operates upon each shift pulse to clamp the base of transistor 510 to ground and thus terminates conduction of the latter. As a result, upon receipt of the shift pulse next following an input pulse, the positive potential signal at the collector terminal of transistor 510 is applied through resistor 516 to the base of transistor 511 to return the latter to its normal state of conduction. It will be apparent that when transistor 511 is conducting, the terminal 541 of the second shift circuit is at a lower potential than the terminal 540 of the first shift circuit. A second shift pulse will then transfer this normal or reset state of the first stage to the second stage and establish the latter at a reset or normal state, and the third shift pulse will transfer the reset state of the second to the third stage.

The capabilty of setting only the first stage and then advancing the reset condition of the first stage to the second and third stages to effect their resetting, rather than resetting all stages simultaneously upon completion of grading of a given test card, is enabled through the novel configuration of the timing marks associated with the master and test cards. In particular, it will be seen that the three timing marks 11a, 11b, and 11c of the master card 10 to suffice to reset the first stage and advance the reset information of the first stage to clear sequentially the second and third stages prior to the generation of a first interrogate pulse for initiating the logic comparison of the correct answer information for problem 50 with the answer indicia detected from the test card 20 for problem 50. As a further analysis of this effect, it will be apparent that the timing mark 21a of the test card 20 cooperates with the timing mark 11a of the master card 10 to assure that at least the first stage of the shift register is cleared prior to the detection of answer indicia information, namely, the answer indicia information for problem 50 aligned with timing mark 21b of the test card 20, whereby the answer information will be correctly registered in the first stage.

POWER SUPPLY SYSTEM—FIG. 13

A supply of alternating current power at a conventional 117 volt level is provided to the power supply system of FIG. 13, illustratively through a plug 570. Fuses 571 and 572 connect the input through a matrix switch 573 to a primary winding 574 of a transformer 575. A secondary winding 576 of the transformer 575, which may be a step-down transformer, applies an alternating current potential of a reduced level to a DC power supply system 577 which may be of conventional design and which provides the requisite DC potential levels for the circuits of the system. A drive motor 578 and a fan motor 579 are connected in parallel with one another and in series with switch 27b across the input AC lines. Capacitor 580 is provided to reduce arcing between the contacts of switch 27b as the latter is opened and closed. Exhaust motor 581 is connected in circuit with a switch 582 and with the switch 27b across the input power supply lines. A shunt circuit including diode 583 and voltage divider resistors 584 and 585 and a capacitor 586 is connected across the input terminals of the exhaust motor 581. Taps 588 and 589 are provided on the secondary winding 576 and a tap 590 is provided at one end terminal of the secondary winding 576 for deriving a selected proportion of the alternating current potential developed in the winding 576. Elements 591 and 592 schematically represent the illumination means, such as lamps, for the master and test card sensing stations. The lamps 591 and 592 are connected in parallel to the tap 589 and through a series connected switching circuit. The switching circuit includes parallel switches 27b and 593 connected in common through diode 594 to the junction 590 and a diode 595 which connects the parallel circuit of lamps 591 and 592 directly to tap 588.

When plug 570 is connected to a suitable potential source of alternating current, and switch 573 is closed, the test card apparatus is energized to a standby condition. Since switch 27b is open, none of the motors are energized. The lamps 591 and 592 are energized by a relatively low, half-wave rectified voltage derived between the taps 588 and 589 of the secondary winding 576 and through the diode 595. Switch 593 comprises a test switch which may be manually actuated to complete a circuit from tap 589 and through the parallel lamps 591 and 592 and the diode 594 to energize the lamps 591 and 592 at a higher current level and thus at a higher illumination level. The lamps 591 and 592 are thereby energized with a second half-wave rectified current equal in amplitude to the current during the standby condition. This test facilitates determining that the lamps are providing adequate illumination for the card sensing stations of the apparatus. When switch 593 is opened, the lamps return to the standby, low illumination level condition.

Switches 27a and 27b represent contacts of the relay 27 described in relation to the logic circuit diagram of FIG. 2c and in relation to the circuit schematic of FIG. 9. As described earlier, closure of grade switch S4 energizes the winding of relay 28 (28'), the latter then closing the contacts 27b and 27a. The motors 578, 579, and 581 then are all energized, the drive motor 578 rotating the card carrying drum of the master card sensing station and actuating the transporting mechanism of the test card sensing station. As described previously, rotation of the drum carrying the master card past the loading position causes cams which rotate with the drum to close switches S1 and S2 shown in FIG. 2c, thereby continuing to energize the winding of relay 28 and contacts 27a and 27b remain closed.

Closure of switch 27a completes the high current energizing circuit for the lamps 591 and 592, as described with relation to test switch 593, whereby the apparatus is in the grading and marking mode of operation. Switch 582 is also operated by a cam rotating in common with the drum and is switched from the position indicated to the opposite contact position when the test card is advanced to position the area 22 of test card 20 (FIG. 1) under the printing elements of the printing counters 92 and 94 (FIG. 2b). When switch 582 is in its indicated position, a unidirectional charge is developed on capacitor 586 through the shunt circuit. Upon movement of switch 582 to its opposite position, this stored charge is discharged through the motor 581, instantaneously stopping its rotation whereby the test card remains stationary, permitting a clear and accurate printing operation of the printing counters 92 and 94. Switch 582 is operated shortly prior to the closure of switch S4 for energizing the print solenoid 129 (FIG. 2c) and is returned to its normal position shortly after switch S4 is opened and thus following the printing operation, thereby to assure that the card remains stationary for this short interval of time. The drive motor 578 continues rotation of the drum during the printing operation and thus the cam carried by it returns switch 582 to its normal position, the exhaust motor 581 thereby is again energized to exhaust the test card from the sensing and marking stations to a receiving bin.

MECHANICAL APPARATUS

FIG. 14 is a perspective view of a suitable housing and exposed operating controls and indication elements for the disclosed embodiment of the apparatus of the invention. A shroud or cover 600 is removably secured to a base 601. A bin or hopper 602 is provided for receiving a plurality of test cards 20 in a neatly stacked manner. An opening 603 provides convenient access to the hopper 602 for inserting or removing test cards 20. A cover plate 604 with a suitable handle 605 is positioned within the hopper to urge the test cards 20 downwardly to assist in the feed operation, to be described. Following grading and marking, the test cards exit from an exhaust opening 606 and are received within the hopper 602.

A hinged cover 607 may be raised to expose a portion of a drum surface on which the master card is mounted. When the master card is secured to the drum and received within the machine, the cover 607 may be closed to conceal the master card from view and to assure that no interference results from foreign materials entering into the drum region. A rectangular opening 608 is provided in the shroud 600 to expose a control panel 610 which preferably is mounted to the internal structure of the machine and not to the shroud 600.

The control panel 610 includes an on-off switch 611 for controlling the main power switch contacts 573 of the power supply system of FIG. 13. A grade button 612 for actuating the grade switch S4 of FIG. 2c is conveniently positioned adjacent the on-off switch control 611. Read-out counter displays 613 and 614 which display the total right and wrong answers for the entire group of test cards 20 and representing the display readout of correct and incorrect answer counters 93 and 95 are also provided on the panel 610. A corresponding pair of reset buttons 615 and 616 are provided for manual reset of the counters 93 and 95 and thus permit resetting the counters of display counters 613 and 614 to zero following completion of grading of any desired number of test cards. A jeweled crystal 617, labelled alarm, provides for visual display of a lamp-type alarm indicator 124 of FIG. 2c.

FIG. 15 comprises a novel holder and display device facilitating the qualitative evaluation of the frequency of error or, conversely, the frequency of correctness, in the answers provided to each problem of an examination for a group of test cards. The holder and display device 620 includes a base member 621 having an inclined surface 622 and a recess 623 adjacent the front, lower portion of the base 622. A transparent front panel 624 of plastic or other suitable material is received in the channel 623 and secured therein. If desired, a vertical end plate 625 may be secured to one end of the base and joined to the vertical front plate 624. The portion of the inclined surface 622a of the base 621 extending from the front surface of the vertical panel 624 to the front edge of the base 621 provides a convenient surface on which to provide a scale 626 of numbers 1 through 50 corresponding to the 50 rows of answer indication areas of a stack of test cards 20.

As clearly shown in FIG. 15, a plurality of test cards 20 are received on the inclined surface 622 of base 620 with the bottom edges thereof abutting the end wall 625 and the longitudinal edges having the marking region 23' abutting the front panel 624. Since the test cards 20' are of uniform size and configuration, stacking them neatly within the holder 620 automatically aligns the cards vertically and, due to the angle of inclination of the receiving surface 622 relative to the vertical front panel 624, automatically incrementally displaces the lateral edges of the stack of test cards 20. Thus, a small portion of the marking region of each card is exposed to view through the transparent, vertical front panel 624. As illustrated in FIG. 15, a portion of each of the plurality of error marks 24 contained on the plurality of test cards 20 is thereby rendered visible through the transparent front panel 624. Either by reference to the printed numbers on the uppermost test card 20, or, more conveniently, by reference to the scale 626 of corresponding, aligned numbers, each problem may be identified. A qualitative indication of the frequency of error in answering each such identified problem is readily provided by observation of the error marks 24. For example, only two error marks appear for problem 5 whereas a substantial number appear for problem 4. An instructor viewing the test cards as displayed in FIG. 15 readily observes that substantially all of the examinees successfully answered problem 5 correctly whereas they experienced considerable difficulty with problem 4. By referring to problem 4 itself, the examiner may then recognize an area of particular difficulty which should be reviewed with the examinees.

FIG. 16 is a cross-sectional view of the apparatus of the invention, taken along the section line 16—16 of FIG. 14. The description of the internal mechanism is limited to that necessary for a complete understanding of the invention. As noted, the test cards 20 are received in neatly stacked arrangement within the hopper 602 and held in flattened position by the feed weight 604. A transport mechanism 630 for the test cards 20 includes a sprocket-type chain 631 mounted on and driven by a pair of sprockets 632 and 633. As will be described, the powered drive may be applied to the sprocket 633 and the sprocket 632 may rotate as an idler by engagement with the chain 531 to maintain the latter in taunt position. Suitable guides for directing the chain 631 within defined paths of travel may also be provided.

The chain 631 carries a pair of claws 634 which successively engage individual test cards to advance them into the test card sensing and marking station 640. Each of the claws 634 includes a slightly inclined surface 635 and a notched, card engaging surface 636. The claws 634 extend through a recess 637a provided in a flat horizontal supporting platform 637, the uppermost edge of the inclined surface 635 being flush with the upper surface of the platform 637 and the card engaging portion 636 extending above the platform 637 by an amount equal approximately to the thickness of a single test card 20.

The test card sensing and marking station 640 includes the mechanical, electrical, and optical apparatus for performing the sensing and marking functions of the test card sensing station 25 of FIG. 2a, the marking station 90, and the print apparatus for the right and wrong answer counters 92 and 94 of FIG. 2b. A curved wall 641 having a substantially vertical section 641a and a rearwardly extending inclined section 641b terminating in a down-turned lip 641c is suitably secured to the internal frame of the apparatus. A guide block 642 is integrally secured to the lower edge of the vertical section 641a of wall 641, presenting a flush surface therewith to the bottom edges of the cards 20 positioned immediately adjacent thereto. The guide block 642 is spaced from the upper surface of a supporting platform 637 by an amount just slightly in excess of the thickness of a single test card 20. Thus, the card transport mechanism 630 advances but a single card into the card sensing and marking station 640 at a time, regardless of frictional engagement of successive ones of the superpositioned cards 20.

A trip switch 643, shown more fully hereafter in FIG. 19, is suitably mounted beneath the platform 637. Switch 643 is actuated to provide the function of switch S1 of FIG. 2c and includes contact element 644 which extends through a suitable aperture (not shown) in the platform 637 and is engaged by the leading edge of the test card entering the station 640. Switch 643, when actuated, satisfies a first condition for automatic and continuous operation of the mechanism.

FIG. 17 comprises a top view with the shroud removed to expose the internal elements of the apparatus, only those elements necessary to a full understanding of the functioning of the apparatus being shown and discussed. In FIG. 17, the hopper 602 is empty to disclose the supporting platform 637 and the channel 637a therein which permits the claw 634 carried by chain 631 to engage the bottom-most card. Referring concurrently to FIGS. 16 and 17, the test card sensing station includes a harness-type arrangement of fiberoptics elements or light conducting rods, which are joined together in an upper region into a composite rod 650. Bracket 651, positions the composite rod 650 with the light receiving ends of the fiber optics adjacent a lamp 652. The composite rod 650 extends arcuately downwardly from the bracket 651 and is separated into a plurality of separate and individual light rods 653 through 659, defining seven independent light conducting elements all transmitting illumination from the single light source 652 to a defined area of the test card sensing station through which a test card passes. More specifically, noting as above mentioned that the test card is advanced with the bottom edge leading through the test card sensing station, the light rod 653 is positioned in alignment with the column of timing marks 21 to illuminate this specific region. The light rods 654 and 656 through 659 illuminate regions aligned with the columns E through A, respectively. The equal spacing between light rods 653, 654, and 656 through 659 corresponds to the equal spacing of the columns of the timing marks 21 and the answer indication areas E through A, respectively. The light rod 655 disposed between the rods 654 and 656 scans a background region of the test card intermediate the columns D and E. The background area to be scanned is selected arbitrarily and provides compensation of the photocell sensitivity of the information sensing photocell channels, as described above.

Bracket 652 is mounted on the base 601 or to guide block 642 and includes vertical arms 652a supporting a horizontal extension 652b. Bracket 651 is secured to the horizontal extension 652b of bracket 652. Photocells 660 through 666 are positioned on the horizontal extension 652b of the bracket 642 in general alignment with the light rods 653 through 659, respectively, and respond to light reflected from the respectively corresponding marks, indication areas and background columns. The bifurcated configuration of the individual light rods is best understood from FIG. 16 in which there is shown only a single photocell 666 and a single, corresponding light conducting rod 659. The rod 659 is a single composite element of a great number of light fibers, the portion 659a thereof extending downwardly and through an aperture 642a in guide block 642 and terminating flush with a bottom surface of the guide block 642a, as indicated. The bottom surface of the light rod portion 659a is thereby positioned a very small distance from the surface of a test card passing thereunder. The bifurcation of the light rod 659 produces a first arm 659b, which, as indicated by dotted lines, is directed to communicate with the photocell 666. The second arm 659c curves in the described arcuate manner to join with the second arm of the other light rods 653 to 659 into the composite rod 650. Approximately one half of the light fibers of rod 659 are grouped to form each one of the arms 659c and 659b. Thus, the light received from the lamp 652 is directed through the arm 659c and, due to the inherent, mutual isolation characteristic of light fibers, through the portion 659a independently of the fibers common to portion 659a and arm 659b to the scanning region at the terminal end thereof. Light reflected from the test card is transmitted through the fibers common to the portion 659a and the first arm 659b to the photocell 666. Both the illumination of the test card in the scanning station and the sensing of light reflected from the test card is effected along the identical center line S—S, as indicated.

The marking apparatus portion of station 640 includes a plurality of solenoids 670 through 675, solenoids 670 through 674 corresponding to answer columns E through A for marking the correct answer indication area in the event that an incorrect answer has been provided for a given problem and solenoid 675 corresponding to the marking region 23 of the test card 20 for providing the edge mark 24 for that same problem. The solenoids 670 through 674 are shown in laterally displaced relation from their corresponding photocells 654 and 656 through 659 whereby the correct answer mark is positioned adjacent but not superposed on the correct answer indication area. If desired, the marking solenoids may be positioned to mark the answer indication areas either directly or in any manner desired. The center line M—M of actuation of the marking solenoids is indicated in FIG. 16. The scanning S—S and marking M—M center lines are physically separated along the longitudinal length of the cards, and thus interference with the respective operations to be performed thereat is avoided. Since the test card advances and is corrected and graded in a similar manner for successive problems, and not simultaneously for all problems, it is apparent that the physical displacement of the sensing and marking center lines requires a corresponding delay in the functions performed at these locations so that they relate to the same problem. Thus, the marking solenoids must be actuated at the appropriate, later time, to mark the same problem scanned a few time intervals earlier by the scanning station. This delay is achieved through the provision of the shift registers 30 through 34 of FIG. 2a, as previously described. The rate of the card transport is a direct function of the system operation and the shift pulses similarly are correlated with the rate of the test card motion, whereby very accurate alignment of the test card for the required operating conditions at the scanning and marking station is achieved.

A single marking solenoid comprising the error marking solenoid 675 may be seen in FIG. 16. The remaining solenoids may be identical in construction and therefore only the physical mounting of solenoid 675 and its associated operating elements is described. A bracket 676 which suitably may be mounted to the bracket 653 securely positions the solenoid 675 along the desired center line of actuation. A further bracket 677, also secured to the bracket 652, provides a connection of a spring 678 to return to its normal, inoperative position indicated, following actuation. A suitable marking tip 680 is provided on the other end of the plunger of solenoid 675 to affix a suitable mark to the test card.

The marking of the test card may be provided in any desired manner. In the illustrated embodiment, the mark comprises an ink mark printed on the card by the marking device of an actuated solenoid pressing an inked ribbon, such as a conventional typewriter ribbon, against the surface of the test card. Such a ribbon 685 is indicated best in FIG. 17 and may be alternately wound and rewound by the spools 686 and 687 and around pulley 688 by a suitable ratchet advance mechanism actuated by the drive motor of the apparatus. Such mechanisms are well known in the art and therefore are not described or shown. It is clear that the reach of the ribbon between rollers 687 and 688 is sufficient to permit ink marking of the test card by the marking devices of each of the solenoids 670 through 675.

The marking station further provides for print out of the total right and total wrong answer in the score area 22 of the test card 20. For this purpose there is provided a right answer counter 690 and a wrong answer counter 691 corresponding to the counters 92 and 94 of FIG. 2b positioned, in any adjacent relationship. The counts accumulated by the counters 690 and 691 are presented on printing wheels, only a single wheel 692 of counter 690 being seen in FIG. 16. Counters having print wheels of this type are commercially available and are well known in the art. The reach of inked ribbon 685 extending between rollers 687 and 688 passes between the print wheels, such as 692, and the surface of the card on which the accumulated count is to be printed, as suggested in FIG. 17 and as seen more clearly in FIG. 16.

In FIG. 16, a pressure plate 695 is positioned, illustratively by a bracket 696 to a wall of counter 690, to resiliently urge a test card 20 passing therebeneath against the portion of platform 637 which extends in a horizontal plane into the station 640 from the hopper 602. The first and second reaches of the ribbon 685 pass over apertures 696 and 697 in the pressure plate 695. If desired, a further apertured pressure plate 698 may hold the first reach of ribbon 685 in position on the pressure plate 695 and over the apertures 696 and 697. A resilient pad 700 is mounted by bracket 701 beneath the aperture 696 to facilitate the print out on the test card by the marking devices such as 680 of the marking solenoid. The print out from the right and wrong counters 690 and 691, illustratively from the print wheel 692, is effected by forcing the test card, from below, against the print wheel. For this purpose there is provided a print solenoid 705 corresponding to the print solenoid 129 of FIG. 2c and mounted to the apparatus frame by a suitable bracket 706. Plunger 707 of solenoid 705 carries a pressure pad 708. An aperture 709 provided in the platform 637 communicates with the aperture 697 of the pressure plate 695. When the print solenoid 705 is actuated, the plunger 707 moves vertically upwardly, the pressure pad 708 forcing the test card against the print wheel 692 with the inked ribbon 685 therebetween, thereby effecting the print out of the total right and total wrong counts in the area 22 of the test card 20.

As is clear from FIG. 16, exhaust wheel 710 has already engaged the test card 20 for exhausting it from the station 640 at the time that score area 22 of the test card 20 has advanced to the print out position associated with the printing wheels of the counters 690 and 691. As described earlier, the exhaust wheel 710 is stopped instantaneously at this time to arrest the test card motion and permit proper printing, following which the motor is again energized and exhaust wheel 710 completes the exhaust of the card. The arcuate wall 711 defining the arcuate exhaust path through which the test card 20 travels and against which the test card 20 is urged by exhaust wheel 710 provides a continuous surface with the platform 637, whereby the transport and passage of the card is at all times smooth and trouble free, assuring that cards do not jam or otherwise become lodged within the machine. The exhausted cards proceed through the exhaust exit 606, also shown in FIG. 14 and are received again within the hopper 602, as indicated by the dotted line representation of an exhausted card following the path of the arrows.

The master card sensing station 15', the drive and exhaust motors, and the cam timing apparatus are best understood from FIG. 17. The drum 720 is rotatably spaced in position by suitable brackets and bearings generally indicated at 721 and 722 which permit rotation of the drum about its axis. With reference to FIG. 1, the master card 10 includes apertures 12 and 13 disposed adjacent the bottom edge thereof and which are received over pins 723 and 724, respectively, for securing the card 10 to the drum 720. If desired, interlock tabs 725 and 726 may be provided which lock the marginal edges of the test card 20 in position and prevent inadvertent detachment of the card 20 from the drum 720. Referring concurrently to FIGS. 17 and 18, it will be apparent that by raising the hinged cover 607, to the dotted line position indicated, ready access may be had to the drum when the latter is in its load position for attaching the master card 10 thereto.

The scanning station for the master card includes a lamp 730, a collimating lens 731, and an apertured plate 732. As best seen in FIG. 17, the apertured plate 732 includes apertures 733 through 739 for producing corresponding collimated and well-defined light beams. The plurality of light beams are directed by prism 733 against the surface of the master card 10 on the drum 720. A non-reflecting plate 740 defines a very accurate edge 741 above which the light beams must pass to illuminate the card surface. The plate 740 also may be resiliently mounted to maintain the master card 10 in close engagement with the drum surface.

The elements 730 through 733 and 740 of the master card sensing station may all be suitably mounted on a mounting bracket 743 to maintain them in the position indicated. The bracket 743 includes a vertical portion 743a on which the housing for lamp 730 is mounted, a horizontal portion 743b secured to the frame 601, an inclined portion 743c and a downwardly turned portion 743d. Supports 742 secured to frame 602 maintain bracket 743 in position. Prism 733 is received within housing 745 secured by legs 744 to the portion 743c of bracket 743.

The plurality of light beams defined by the aperture plated 732 are incident on the longitudinal areas of the test card corresponding to the columns of answer indication areas A through E and the timing marks 11. The light beam defined by aperture 737 scans a background area of the card and particularly, for the position indicated, that area between the columns D and E.

Referring to FIGS. 18 and 19, a bracket 745 mounted to the inclined portion 743c of the mounting bracket 743 for the prism 733 has an angular extension 746 within which are mounted a plurality of photocells 750 through 756 aligned with the paths of light beams defined by the apertures 733 through 739 respectively of the aperture plate 732. The cross-hatched, rectangular areas underlying the photocells 750 through 756 represent the beams of light, as transmitted through the prism 733, of the corresponding channels. An apertured plate 757 mounted at the transmitting surface of the prism 733 and conforming with the contour thereof is best seen in FIG. 19 to define an elongated opening through which the plurality of individual light beams are directed to the surface of the master card. As indicated by dotted lines and arrows in FIG. 18, a beam of incident light is reflected from the master card and directed to a corresponding photocell, whereby the latter performs its intended sensing function.

Referring concurrently to FIGS. 17 and 20, a vertical mounting bracket 760 is suitably supported on the framework of the apparatus. Drive motor 578', corresponding to drive motor 578 of FIG. 13, is mounted by journal 761 on the bracket 760 and a drive shaft 762 extends through the journal 761 for rotation by the motor when the latter is energized. Conventional bearing structures within journal 761 are generally indicated, but not described, and provide free rotation of the drive shaft. A main drive gear 763 is mounted on the drive shaft 762 by collar 764. A cam plate 765 carrying cam pins 766 and 767 is fixedly mounted on the drive shaft 762 by collar 768. Cam pin 766 actuates contact arm 770 of switch S4, the cam plate 765 actuates switch arm 771 of switch S6, and cam pin 767 actuates switch arm 772 of switch S5. The actuation of these switches has been previously described in detail.

The main drive gear 763 also drives a gear 780 which is secured by a collar 781 to a shaft 782, the latter being rotably mounted by collar 783 to the bracket 760 and by a suitable further collar and bracket 784 to the frame of the machine. Sprocket 633 is secured to the shaft, 782, whereby the chain 631 is driven for effecting the card transport.

A reversing gear 785 is secured to a shaft journaled by collar 786 for rotation in the bracket 760 and driven by the gear 780 to drive, in turn, the gear 790. Gear 790 is fixedly secured by an integral collar 791 to a shaft 792 suitably journaled for rotation in the bracket 760. The shaft 792 is fixedly secured to drum 720 to drive it in rotation. A cam plate 795 carrying a cam pin 796 is also fixedly mounted on shaft 792 by an integral collar 797. The cam plate 795 actuates switch arm 798 of switch S2 and the cam pin 796 actuates switch arm 799 of switch S3.

The time of actuation and the function accomplished by actuation of the switches S2 through S6 has been described in detail heretofore. Briefly, however, these functions are the following. Switch S2 is actuated by its associated cam and cam follwer mechanisms when the drum 720 has advanced the master card to the master card sensing station, and satisfies the second condition for the initiation of test grading and marking. Switch S3 comprises the load position switch and is actuated to an open position each time the drum revolves through the load position, and is closed as the drum rotates through the entire non-load arcuate path. When the drum 720 has advanced to the load position and no further test cards are available in the hopper for grading and marking, switch S3 is actuated to an open position to revert the apparatus to a standby condition. Actuation of switch S4 energizes the print solenoid 705 to engage the test card against the printing wheels of the counters 690 and 692. Switch S6 is actuated prior to switch S4 to instantaneously stop the exhaust motor and thus to assure that movement of the test card has stopped prior to the closure of switch S4 and actuation of the print solenoid 705. Switch S5 is closed subsequently to all of the test grading and marking operations for a given test card and enables the application of oscillation signals to the counters 690 and 692, corresponding to the counters 92 and 94 of FIG. 2b, to reset them to zero prior to the grading and marking of a subsequent test card. As long as the remains test cards to be graded, and the apparatus is operating in proper synchronization, either switch S3 or switch S2 and the associated switch S1 (FIG. 2c) will be closed to maintain the continuous and automatic grading and marking operation of the apparatus.

SUMMARY

In summary, the test grading and marking apparatus of the invention is highly efficient and versatile in operation and does not require skilled operating personnel. The various techniques or programs in accordance with which the master card may be marked provide unique capabilities in the use of the apparatus. As described in detail above, two or more answer choices may be provided as correct responses whereby the application of an answer indicia corresponding to one or more of these correct responses on the test card will result in the problem being graded as correct. One or more problems may be omitted from the grading and marking operation through the simple expedient of not providing any answer indicia on the master card for those problems. Thus, problems which, subsequently to preparation of the examination, are determined to be unsatisfactory may be eliminated from the examination. Further, this technique permits reuse of a group of test cards where a given examination is to include less than the entire number of problems which the test card may accommodate. Further, the apparatus properly grades as incorrect any problem for which a plurality of answer indicia are applied in excess of the number of answer indicia representing correct responses. Thus, an examinee is discouraged from attempting to obtain a correct score by applying answer indicia to a plurality of, or even all answer indication areas for a problem for which he does not know the correct answer.

The correct answer marking of the correct answer indication area on the test card for any problem answered incorrectly is instructive to the examiner, and also serves to confirm that the problem thus marked was in fact answered incorrectly. If the correct answer mark is applied directly to the answer indication area, the examinee is discouraged from thereafter attempting to apply an answer indicia to that area and then suggesting that the apparatus malfunctioned in the grading and marking operation. The apparatus also provides for distinguishing omitted from incorrect responses on the test cards for count accumulation purposes while nevertheless performing the marking operation to mark the correct answer indication area or areas and to provide an error mark for that problem. Thus, weighted scoring for omitted as distinguished from incorrect responses may be provided. The provision of the error mark for both incorrect or omitted responses is desiable, since either response represents difficulty with the corresponding problem. It is apparent that the apparatus may be modified to apply a mark in the marking region indicating correct, rather than incorrect and omitted responses.

The provision of the error marks in the longitudinal marking regions of the test cards provides a unique capability of qualitatively determining the frequency of error in the responses to problems on the test cards of a given group, for example, a group of test cards used by a class of students in taking the same examination. The card holder for stacking and positioning the test cards is of simple construction and yet satisfies the necessary requirements of card positioning in a convenient and easy manner to facilitate the visual inspection thereof for the error frequency determination.

The mechanical elements of the apparatus of the invention are relatively simple in construction and low in cost, despite the numerous transport, sensing, timing, and marking functions required to be performed. The electrical circuits employ conventional elements and therefore are relatively low in cost. Further, the circuits are designed to perform a maximum number of functions, thereby to minimize the number and cost of the required circuits. The provision of a standby condition assures stability and long life of operation of the apparatus. Further, the apparatus performs the grading and marking of an entire group of test cards automatically, once the operation is initiated, and when that group is completed, automatically switches to the standby condition. The novel synchronization provisions assure that when a malfunction of the apparatus occurs, or when either a test or master card has been improperly prepared or damaged in some manner such that improper grading and marking might be caused, the apparatus switches automatically to an alarm condition and the grading and marking operations are terminated until the malfunction is corrected. The apparatus and circuits providing for synchronization control allow a wide range of less than exact synchronization while completely accurate grading and marking is performed. Further, in association with the synchronization control, the temporary storage and shift advancement of answer response information, in accordance with the format of the test and master cards, permits the physical displacement of test card sensing and marking stations, thereby to avoid interference between them in their respective operations.

It will be apparent to those skilled in the art that the test grading and marking apparatus of the invention may be utilized for various purposes other than strictly the grading and marking of test cards used with examinations including problems of the multiple choice type. Survey or opinion polls comprise an example of such other uses of the apparatus of the invention. In such a use, the correct answer marking and error marking of course are not required since an opinion or survey type question with multiple answers is not susceptible of having correct and incorrect answers. The preferences or selected categories may be indicated by response indicia on test cards in the manner described with regard to multiple choice questions of an examination type. A plurality of master cards are then prepared, each being programmed to select responses corresponding to a different category. The tabulation of results of the survey may then be effected by successively passing the test cards to which indicia have thus been applied through the test grading apparatus in conjunction with each of the plurality of master cards. The totalizing counters accumulate the number of responses represented by indicia on the test cards for each such category.

A further use of the apparatus of the invention may be that of selecting characteristics of a given matter as represented by appropriate answer indicia on a test card assigned to that matter, with a certain set of predetermined characteristics represented by indicia applied to a master card. For example, in placement services, each applicant may be assigned a test card and the characteristics of that applicant entered by the application of indicia to corresponding answer indication areas for each of a given number of categories, corresponding to the problem numbers on the test cards. A master card may then be prepared on which desired characteristics of applicants to be interviewed are similarly represented by indicia corresponding to the correct answer indicia of a master card. The plurality of test cards are then processed by the apparatus of the invention. Those cards for which the qualifications of the applicant, as represented by the indicia on the test card, satisfy all or any desired number of the established qualifications represented on the master card by indicia then will readily be apparent from the number printed on the test card as the total correct count accumulation.

These and other uses and alternative embodiments and modifications of the apparatus of the invention will readily be apparent to those skilled in the art, and thus it is intended by the appended claims to cover all such modifications and adaptations which fall within the true spirit and scope of the invention.

What is claimed is:

1. A method of grading and evaluating answer responses to problems of the multiple choice type wherein the answer responses to a plurality of problems are presented by indicia applied to test cards, each test card having a plurality of groups of answer indication areas, with the groups corresponding to the plurality of problems and with the areas of each group corresponding to the multiple choice answers for that problem, comprising:

effecting relative movement of each of a plurality of test cards in sequence, and a sensing and a marking station having a fixed distance therebetween equal at least to the distance between two successive groups of answer indication areas on the test cards to present each of said groups of answer indication areas of each test card at said sensing and marking stations for respectively associated sensing and marking time periods such that the marking time period for a given, previously sensed group of answer indication areas is initiated no sooner than the initiation of the sensing time period for a next successive group of answer indication areas, sensing each group of answer indication areas when presented at said sensing station to determine the answer responses represented by applied indicia for the corresponding problems, storing the answer responses for each problem detected by said sensing means from each test card individually and in sequence as each group of answer indication areas is presented at said sensing station, and producing each stored answer response as a continuous output during at least a portion of the marking time period in which the associated group of answer indication areas is presented at said marking station, providing the correct answer for each problem, corresponding to the answer response produced as a continuous output by said answer response storage means, during said portion of each of said respectively associated marking time periods, and comparing the answer response thus produced with the corresponding correct answer thus provided to determine whether each such answer response is correct or incorrect, rendering marking means of said marking station operable for marking the test card in the proximity of each group of answer indication areas during the respectively associated marking time periods, and controlling the operation of the marking means in accordance with the comparison determination for selectively marking the test card to distinguish correct and incorrect answer responses.

2. A method of grading and evaluating answer responses to problems of the multiple choice type wherein the answer responses to a plurality of problems are represented by indicia applied to test cads, each test card having a plurality of groups of answer indication areas, with the groups corresponding to the plurality of problems and the areas of each group corresponding to the multiple choice answers for that problem, comprising:

effecting relative movement of successive test cards and a sensing station at a rate defining a predetermined time period between the presentation at the sensing station of a given and each successive group of answer indication areas of a test card, sensing each group of answer indication areas as presented at said sensing station to determine the answer responses represented by applied indicia for the corresponding problems, effecting relative movement of said successive test cards and a marking station, in sequence after said sensing at said sensing station, and at a rate to present said given and successive groups of answer indication areas of each test card to said marking station an integral number of said time periods following the sensing thereof at said sensing station, storing the answer responses for each problem detected from each test card individually and in sequence for the said integral number of time periods, presenting each stored answer response as a continuous output during the last one of said integral number of time periods, providing the correct answer for each problem during the said presentation of the corresponding answer response as a continuous output, comparing the stored answer response with the correct answer response substantially simultaneously with the determination of the latter for each problem, rendering marking means of said marking station operable for marking the test card in the proximity of each group of answer indication areas during the respectively associated marking time period, and controlling the operation of the marking means in accordance with the comparison determination for selectively marking the test card to distinguish correct and incorrect answer responses.

3. A method of grading and evaluating answer responses to problems of the multiple choice type as recited in claim 1 wherein the step of controlling the operation of the marking means comprises:

actuating the marking means for marking each test card in the proximity of the answer indication area representing the correct response in each group of answer indication areas having an incorrect response for the corresponding problem, and inhibiting the operation of the marking means for each group of answer indication areas having the correct answer response for the corresponding problem.

4. A method of grading and evaluating answer responses to problems of the multiple choice type as recited in claim 2 wherein the step of controlling the operation of the marking means comprises:

actuating the marking means for marking each test card in the proximity of the answer indication area representing the correct response in each group of answer indication areas having an incorrect response for the corresponding problem, and inhibiting the operation of the marking means for each group of answer indication areas having the correct answer response for the corresponding problem.

5. A method of grading and evaluating answer responses to problems of the multiple choice type as recited in claim 2 wherein the correct answer information is supplied on a master card having a group of answer indication areas corresponding to the number of answer choices for each of the plurality of problems and to which areas indicia are applied to represent the correct answer responses to the problems, further comprising:

scanning the master card in timed relationship with the sequential scanning of each of the test cards, and sensing the indicia applied to the master card to determine the correct answer responses for each of the plurality of problems during the time periods in which the corresponding answer responses are presented as continuous outputs.

6. An apparatus for grading answer responses to problems of the multiple choice type wherein the answer responses to a plurality of problems are represented by indicia applied to test cards, the test cards having a group of answer indication areas corresponding to the number of possible answer responses for each problem, comprising:

a test card sensing station for sensing the indicia applied to each test card to determine the answer responses represented thereby for each problem, a marking station including marking means, said marking station being displaced from said sensing station by a distance at least as great as the distance between two successive groups of answer indication areas, means for effecting relative movement of each test card and said sensing and marking stations to present each of said groups of answer indication areas of each test card at said sensing and marking stations, in sequence, for predetermining sensing and marking time periods, respectively, wherein the initiation of the marking time period for a given group of answer indication areas occurs no earlier than the initiation of the sensing time period for the next successive group of answer indication areas, means for storing the answer responses detected by said sensing means from each test card for at least two successive groups of answer indication areas individually and in sequence as each group of answer indication areas is presented at said sensing station, and for producing each previously sensed and stored answer response of a given group of answer indication areas as a continuous output during at least a portion of the marking time period in which that given group of answer indication areas is presented at said marking station, correct answer storage means for the plurality of problems, said correct answer storage means providing the correct answer for the problem corresponding to the answer response produced by said answer response storage means during each of said marking time periods, comparison means for comparing the answer responses with the corresponding correct answers for each of the problems on each test card during the marking time period in which the associated group of answer indication areas of a test card is presented at said marking station to determine whether the answer response is correct or incorrect, and said marking station including means responsive to said comparison means for selectively controlling said marking means to mark the test card in the proximity of the successively presented groups of answer indication areas to distinguish correct and incorrect answer responses.

7. An apparatus as recited in claim 6 wherein:

said marking means of said marking station is energizable in response to said correct answer storage means for marking the test card in the proximity of the answer indication area representing the correct answer for the problem corresponding to the group of answer indication areas presented at the marking station, and said means of said marking station responsive to said comparison means is operable to inhibit said marking means when a correct answer response to the problem is indicated on the test card and when no correct answer is provided by said correct answer storage means for any given problem.

8. An apparatus as recited in claim 6 wherein the groups of answer indication areas for successive ones of the plurality of problems are displaced by predetermined distances on each test card, and wherein:

said marking and sensing stations are displaced along the direction of relative movement therewith of the test cards by a distance equal to a multiple of the said predetermined distances between the groups of answer indication areas, said answer response storage means includes a first stage responsive to said test card sensing station for sequentially storing the answer responses detected by the sensing station for the plurality of problems, and additional stages equal in number to said multiple of said predetermined distances, said stored information comprising the detected answer responses for a given and each successive problem being advanced from said first and through said additional stages in response to completion of detection by said test card sensing station of said given and successive problems, respectively, and the last of said successive stages producing the stored answer response as a continuous output during at least a portion of the marking time period in which the associated group of answer indication areas is presented at said marking station.

9. An apparatus for grading answer responses to problems of the multiple choice type wherein the answer responses to a plurality of problems are represented by indicia applied to test cards, the test cards having a group of answer indication areas corresponding to the number of possible answer responses for each problem, comprising:

a test card sensing station for sensing the indicia applied to each test card to determine the answer responses represented thereby for each problem, a marking station including marking means, transport means for effecting relative movement of each test card and said sensing and marking stations in sequence at a rate defining a predetermined time period between the presentation at the sensing station of a given and each successive group of answer indication areas of a given test card, said marking station being displaced from said sensing station along the direction of relative movement of the test cards therewith, and said test cards, and said marking station being moved relatively at a rate to present said given and successive groups of answer indication areas of each test card at said marking station an integral number of said time periods following the sensing thereof at said sensing station, means for storing each of the answer responses for the plurality of problems, detected by said sensing means from each test card, individually and in sequence for the said integral number of time periods and for producing each stored answer response as a continuous output during at least a portion of the last one of said integral number of time periods, respectively associated therewith, correct answer storage means for the plurality of problems, said correct answer storage means providing the corresponding correct answer for each of the answer responses produced as a continuous output by said answer response storage means during the respectively associated last one of said integral number of time periods, comparison means for comparing the answer responses with the corresponding correct answer for each of the problems on each test card during the respectively associated last one of said integral number of time periods, and said marking station including means responsive to said comparison means for selectively controlling said marking means to mark the test card in the proximity of the successively presented groups of answer indication areas to distinguish correct and incorrect answer responses.

10. An apparatus for grading answer responses to problems of the multiple choice type as recited in claim 9 wherein:

said answer response storage means comprises a plurality of shift registers respectively corresponding to the number of possible answer responses for each problem.

each of said shift registers includes a plurality of successive stages comprising a first stage responsive to respectively corresponding sensing means of said test card sensing station, and additional stages, the number of additional stages being equal to said integral number of time periods, each of said stages normally being in a first state and being set to a second state to store a detected answer response, said first stage being set in response to detection of an answer response by said respectively corresponding sensing means, means responsive to completion of sensing of the answer response for a given problem to set each of the additional stages in accordance with the state of the next preceding stage of each shift register and to reset the first stage of each shift register to the normal first state, and the last one of said stages of each of said shift registers being set to produce said continuous output representing the thus stored answer response during the last one of said integral number of time periods.

11. An apparatus as recited in claim 9 wherein:

said marking means of said marking station is energizable in response to said correct answer storage means for marking the test card in the proximity of the answer indication area respresenting the correct answer for the problem corresponding to the group of answer indication areas presented at the marking station, and said means of said marking station responsive to said comparison means is operable to inhibit said marking means when a correct answer response to the problem is indicated on the test card and when no correct answer is provided by said correct answer storage means for any given problem.

12. An apparatus as recited in claim 11 wherein the corresponding answer indication areas of the plurality of groups thereof on each test card are aligned in longitudinal columns and the answer indication areas of each group thereof are aligned in lateral rows and wherein:

said transport means transports said test cards in endwise fashion through said sensing station, said sensing station includes a plurality of independent sensing means for sensing respectively associated ones of the plurality of columns of answer indication areas of a test card transported through said sensing station and for simultaneously sensing the answer indication areas of each group thereof, said marking station includes a plurality of correct answer marking devices positioned for marking in the proximity of respectively associated ones of the columns of answer indication areas of a test card transported through said marking station and there is further provided, means for selectively energizing each of said correct answer marking devices in response to the correct answer storage means for marking the test card in the proximity of the answer indication area representing a correct answer response to each problem on the test card.

13. An apparatus as recited in claim 9 wherein said sensing station includes:

means for illuminating at least selected portions of a test card, a plurality of light sensitive devices responsive to illumination reflected from the surface of the test card for sensing respectively associated ones of the plurality of columns of answer indication areas of a test card transported through said sensing station and for simultaneously sensing the answer indication areas of each group thereof, an additional independent sensing means positioned to be aligned with a longitudinal region of said test card exclusive of answer indication areas of a test card transported through said sensing station to sense variations in the reflected illumination, and a compensation circuit responsive to said background sensing means to vary the sensitivity to reflected illumination of the light sensitive devices.

14. An apparatus as recited in claim 9 wherein a score area is provided on each test card, further comprising:

first and second counting means respectively operable in response to said comparison means to accumulate a count for each problem for which the answer response indicated on the test card is correct and to accumulate a count for each problem for which the answer response indicated on the test card is incorrect, means responsive to the completion of grading of the last problem on each test card to cause the count accumulations of said first and second printing counters to be printed in the print area of each test card and to reset the first and second counters prior to the grading of a subsequent test card.

15. An apparatus as recited in claim 14 wherein:

said first and second counters comprise printing counters and accumulate their respective counts on printing elements, and said means responsive to the completion of grading of the last problem on each test card comprises a device operable to force the score area of each test card against the printing elements of the printing counters.

16. An apparatus as recited in claim 14 wherein there is further provided:

exhaust means for transporting each test card from said marking station, and means responsive to the positioning of the score area of each test card for receiving the printing of the count accumulations of said first and second counting means to instantaneously and momentarily terminate the operation of said exhaust means and arrest the movement of the test card while the accumulated counts are printed on the test card.

17. An apparatus as recited in claim 12 wherein there is further provided:

first and second total counters operative in response to said comparing means to accumulate a count for each problem on each test card of an entire group of test cards for which correct and incorrect answer responses, respectively, are provided.

18. An apparatus as recited in claim 9 wherein correct answers are provided on a master card, each of the master and test cards having a plurality of answer indication area with the areas corresponding to the plurality of problems arranged laterally in groups and the areas of each group corresponding to the multiple choice answers for each problem aligned longitudinally, the correct answers and answer responses being represented by indicia applied to the answer indication areas of the master and test cards, respectively, wherein said means for storing each of the answer responses and for producing each stored answer response as a continuous output comprises:

a master card sensing station, master card transport means for transporting a master card successively through the master card sensing station in endwise fashion and in timed relationship to the transporting of each test card through the test card sensing station, said master card sensing station having a plurality of independent sensing means for sensing respectively associated ones of the columns of answer indication areas and for simultaneously sensing the answer indication areas of each group thereof in sequence on the master card to sense answer indicia representative of correct answers, said test card sensing station having a plurality of independent sensing means for sensing respectively associated ones of the columns of answer indication areas and for simultaneously sensing the answer indication areas of each group thereof in sequence to sense answer indicia representative of answer responses, and said test card marking station including a plurality of independent marking means respectively associated with the columns of answer indication areas and responsive to corresponding ones of said sensing means of said master card sensing station for marking each test card in the proximity of the answer indication area representing the correct answer response for each problem in accordance with the correct answer sensed by said sensing means of said master card sensing station from said master card.

19. An apparatus as recited in claim 18 wherein there is further provided:

logic means responsive to the master card sensing station and producing an interrogate pulse in response to the detection of a correct answer by said master card sensing station, and said comparing means being responsive to said logic means to produce, in response to each interrogate pulse, a first output representing the comparison result that the answer response is correct and a second output representing the comparison result that the answer response is incorrect.

20. An apparatus as recited in claim 9 wherein correct answers are provided on a master card, each of the master and test cards having a plurality of answer indication areas with the areas corresponding to the plurality of problems arranged laterally in groups and the areas of each group corresponding to the multiple choice answers for each problem aligned longitudinally, the correct answers and answer responses being represented by indicia applied to the answer indication areas of the master and test cards, respectively, and wherein each of said master and test cards includes a longitudinal column of timing marks positioned in predetermined aligned relationship with the lateral groups of answer indication areas and there is further provided:

timing marks sensing means in each of said master and test card sensing stations for sensing the columns of timing marks on the master and test cards, respectively, and producing master and test card sync pulses, respectively, in responses thereto, first and second bistable systems responsive to the timing mark sensing means of the master and test card sensing stations, respectively, said first and second bistable systems normally being in a first state and being set to a second state in response to receipt of each of said master and test card sync pulses, respectively, first logic means responsive to said first and second bistable systems to produce a shift pulse when said bistable systems are concurrently in a set state, said sensing station including a plurality of independent sensing means for sensing indicia in corresponding ones of said columns of answer indication areas, a plurality of shift registers comprising successive stages including an input and an output stage and responsive to respectively associated ones of said independent sensing means of said test card sensing station, each of said stages being normally in a first state and being set to a second state to store an answer response sensed by the associated independent sensing means, said shift registers further being responsive to said first logic means to simultaneously shift the state of each stage to the next succeeding stage and to clear the first stage in response to each shift pulse, and said comparing means being responsive to said last stage of each shift register to compare said answer responses thus stored in said last stage with the corresponding correct answer detected from the master card by the master card sensing station.

21. An apparatus as recited in claim 20 wherein there is further provided:

delay means responsive to said first logic means to produce a reset pulse in response to each shift pulse a predetermined delay time thereafter, and said bistable systems being responsive to said delay means to be reset to a normal state in response to each reset pulse produced thereby.

22. An apparatus as recited in claim 20 further comprising:

an alarm system comprising a further bistable system normally in a first state during operation of said apparatus in a range of permissible synchronization and being set to a second, alarm state upon an occurence of failure of synchronization of the transporting of the master and test cards through their respective sensing stations, and said alarm system being responsive to the outputs of said timing mark sensing means of said master and test card sensing stations and being set to an alarm state in response to the occurrence of two successive ones of the sync pulses produced by one of said master and test card sensing stations prior to receipt of the sync pulse from the other of the master and test card sensing stations corresponding to the first of the said two successive ones of the sync pulses.

23. An apparatus as recited in claim 22 wherein there is further provided:

logic means responsive to the master card sensing station and producing an interrogate pulse in response to the detection of a correct answer by said master card sensing station, second logic means responsive to said timing mark sensing means of said master card sensing station and to said first logic means to produce a set pulse in response to the occurrence of corresponding master card sync pulses and interrogate pulses for the concurrent and independent duration of each thereof, and said first bistable means being responsive to said second logic means to be set to said second state in response to each of said set pulses.

24. An apparatus as recited in claim 20 wherein:

said test card sensing and marking stations are displaced along the direction of the longitudinal transport of the test cards by an amount equal to a whole number multiple of the longitudinal spacing on each test card between the timing marks thereof, and the number of said successive stages of said shift registers in addition to the input stage thereof is equal to the said whole number multiple, whereby the answer responses stored in the last stages of the plurality of shift registers correspond to the group of answer indication areas currently presented at the test card marking station.

25. An apparatus for grading responses to problems of the multiple choice type wherein correct answers are provided on a master card and answer responses are provided on a test card to be graded, each of the master and test cards having a plurality of answer indication areas with the areas corresponding to the plurality of problems arranged laterally in groups and the areas corresponding to the multiple choice answers for a plurality of problems aligned longitudinally, the correct answers and answer responses being represented by indicia applied to the answer indication areas of the master and test cards, respectively, comprising:

a master card sensing station and a test card sensing station, test card transport means for transporting said test cards in sequence and in endwise fashion through said test card sensing station, master card transport means for transporting a master card successively through the master card sensing station in endwise fashion and in timed relationship to the transporting of each test card through the test card sensing station, each of said master card and test card sensing stations having a plurality of independent sensing means for sensing respectively associated ones of the plurality of columns of answer indication areas and arranged for simultaneously sensing the answer indication areas of each group, a test card marking station having a plurality of correct answer marking devices positioned to be aligned with corresponding columns of answer indication areas and selectively responsive to said master card sensing station for marking each test card in the proximity of the answer indication area representing the correct answer response for each problem in accordance with the correct answer sensed by said sensing means of said master card sensing station from said master card, said test card marking station being displaced along the direction of longitudinal transport of said test cards from said test card sensing station by a distance equal to a whole number multiple of the longitudinal spacing of successive answer indication area groups of the test cards, a plurality of shift registers respectively associated with said plurality of sensing means of said test card sensing station, each of said shift registers comprising a plurality of successive stages normally in a first state and set to a second state to store a detected answer response and including an input stage and additional stages, the additional stages being equal in number to said whole number multiple of the longitudinal spacing of the successive answer indication area groups of the test cards, said input stages being responsive to said respectively associated sensing means of said test card sensing station to be set to said second state in response to detection of an answer response thereby, said shift registers further being responsive to said sensing stations to simultaneously shift the state of each stage to the next succeeding stage and to clear the first stage of each shift register in response to completion of sensing of each group of answer indication areas, comparing means responsive to the last stage of each shift register and to the sensing means of said master card sensing station to compare said answer responses thus stored in said last stages thereof with the correct answers detected from the master card by the master card sensing station and corresponding to the problems related to the group of answer indication areas currently positioned at said marking station, and means responsive to said comparing means for inhibiting said marking means when a correct answer response to the problem is indicated on the test card.

26. An apparatus as recited in claim 25 wherein each of said master and test cards includes a longitudinal column of timing marks positioned in predetermined aligned relationship with the lateral groups of answer indication areas and there is further provided:

timing mark sensing means in each of said master and test card sensing stations for sensing the columns of timing marks on the master and test cards respectively and producing master and test card sync pulses, respectively, in response thereto, first and second bistable systems responsive to the timing mark sensing means of the master and test card sensing stations, respectively, said first and second bistable systems normally being in a first state and being set to a second state in response to receipt of each master and test card sync pulse, respectively, first logic means responsive to said first and second bistable system to produce a shift pulse when said bistable systems are concurrently in a set state, and said shift registers being responsive to said first logic means to simultaneously shift the state of each stage to the next succeeding stage and clear the first stage in response to each shift pulse.

27. An apparatus as recited in claim 26 wherein there is further provided:

delay means responsive to each shift pulse to produce a reset pulse, and said bistable systems being responsive to said delay means to be reset to a normal state in response to each reset pulse produced thereby.

28. An apparatus as recited in claim 27 further comprising:

an alarm system comprising a further bistable system normally in a first state during operation of said apparatus in a range of permissible synchronization and being set to a second, alarm state upon an occurrence of failure of synchronization of the transporting of the master and test cards through their respective sensing stations, and said alarm system being responsive to said first and second bistable systems and to said timing mark sensing means and being set to an alarm state in response to the setting of one of said bistable systems and the receipt thereby of a further sync pulse from the corresponding timing mark sensing means prior to said one of said bistable systems being reset to said normal state.

29. An apparatus as recited in claim 28 wherein there is further provided:

first, second, and third logic gates each having first and second inputs and an output, said first and second logic gates being connected at said first inputs thereof to said fiirst and second bistable systems, respectively, and at said second inputs thereof to said further sensing means of said master and test card sensing stations, respectively, each of said first and second logic gates producing an output only upon the occurrence of an input at each of the first and second inputs thereof and corresponding to the receipt of a sync pulse during the set state of the associated bistable system, said third logic gate being connected at its first and second inputs to the outputs of said first and second logic gates, respectively, and producing an output in response to either of said first and second logic gates producing an output, and said alarm system being responsive to said third logic gate to be set to the second, alarm state in response to an output from said third logic gate.

30. An apparatus as recited in claim 26 wherein there is further provided:

second logic means responsive to said timing mark sensing means of said master card sensing station and to said first logic means to produce a set pulse in response to the occurrence of a master card sync pulse and a corresponding interrogate pulse for the concurrent and independent duration of each thereof, and said first bistable means being responsive to said second logic means to be set in said second state in response to each of said set pulses.

31. An apparatus as recited in claim 25 wherein:

said master card transport means comprises a rotatable drum including mounting means for receiving a master card thereon when said drum is in a load position at a predetermined position of rotation thereof, said test card transport means is mechanically connected to said master card transport means for common actuation therewith, and there is further provided, motivating means for actuating said master and test card transport means.

32. An apparatus as recited in claim 31 wherein there is further provided:

a grade switch for initiating the energization of said motivating means to cause said transport means to transport the master and test cards through their respective sensing stations, a test card sensing switch which is normally open and which is responsive to the presence of a test card in the test card sensing station to be actuated to a closed position, first and second cam means mounted for fixed rotation with said drum and corresponding first and second switches mounted to be actuated by said first and second cam means at predetermined times, relative to the drum position of rotation, said first switch being actuated by said first cam to a closed position when the master card is transported into the master card sensing station and said second switch normally being closed and being actuated to an open position when said drum is in said load position, said first switch and said test card sensing switch being connected in a first circuit for maintaining energization of said motivating means when each thereof is actuated to a closed position and thus during the concurrent presence of both a master card and a test card in their respective sensing stations, said second switch being connected in a second circuit in parallel with said first circuit and maintaining energization of said motivating means when closed and thus when a master card is received in the master card sensing station, said test card sensing switch being opened and remaining open following the grading of the last one of a group of test cards to terminate energization of said motivating means and said second switch maintaining energization of said motivating means until said drum returns to said load position and thereupon opening and terminating the energization of said motivating means, whereby said drum remains at said load position.

33. An apparatus as recited in claim 32 wherein there is further provided:

first and second counting means responsive to said comparison means for accumulating a count for each problem for which the answer response is correct and for each problem for which the answer response is incorrect, respectively, said first and second counters accumulating said respective counts on printing means positioned at said marking station in alignment with said score area of a test card transported therethrough, means for engaging a test card against said printing means, third cam means mounted for fixed rotation with said drum, and a third switch mounted to be actuated by said third cam means at a time corresponding to the transporting of a test card through said marking station to position said score area for engagement against said printing means.

34. An apparatus as recited in claim 33 wherein there is further provided:

reset means for resetting said first and second counters following the printing of the accumulated counts thereof on each test card, fourth cam means mounted for fixed rotation with said drum and a corresponding fourth switch mounted to be actuated by said fourth cam means following actuation of said third switch by said third cam means, and said fourth switch being operable when actuated to actuate said reset means for reset of said first and second counters.

35. An apparatus as recited in claim 33 wherein there is further provided:

exhaust means for engaging a test card and removing the latter from the marking station, fifth cam means mounted for fixed rotation with said drum and a corresponding fifth switch mounted to be actuated by said fifth cam means for a period in excess of the period of actuation of said third switch and both preceding and following the actuation thereof, and said fifth switch, when actuated, terminating instantaneously the operation of said exhaust means to arrest the motion of the test card during the printing of the total count accumulations thereon and thereafter opening to permit continued exhausting of the test card.

References Cited

UNITED STATES PATENTS

| | | | |
|---|---|---|---|
| 20,463 | 8/1937 | Sveda et al. | 35—48.2 |
| 2,150,256 | 3/1939 | Warren | 35—48.2 |
| 2,936,532 | 5/1960 | Willey | 35—48.2 |
| 2,944,734 | 7/1960 | Martin | 35—48.2 |
| 3,176,415 | 4/1965 | Leathers | 35—48.2 |
| 3,267,258 | 8/1966 | Bene | 35—48.2 |
| 3,284,929 | 11/1966 | Azure | 35—48.2 |
| 3,324,576 | 6/1967 | Shaw et al. | 35—48.2 |
| 3,346,970 | 10/1967 | Charbonneaux et al. | 35—48.2 |
| 2,944,734 | 7/1960 | Martin | 235—61.7 |
| 2,959,768 | 11/1960 | White et al. | 340—149 |
| 3,299,254 | 1/1967 | Dobbins et al. | 235—61.7 |
| 3,315,377 | 4/1967 | Stillwell et al. | 35—48 |
| 3,324,576 | 6/1967 | Shaw et al. | 35—48 |

EUGENE R. CAPOZIO, Primary Examiner

W. W. NIELSEN, Assistant Examiner

U.S. Cl. X.R.

235—61.603